United States Patent
Morgan et al.

(10) Patent No.: US 9,699,530 B2
(45) Date of Patent: Jul. 4, 2017

(54) OPTICAL ARCHITECTURE AND CHANNEL PLAN EMPLOYING MULTI-FIBER CONFIGURATIONS FOR DATA CENTER NETWORK SWITCHING

(71) Applicant: PLEXXI INC., Nashua, NH (US)

(72) Inventors: Matthew William Morgan, Antrim, NH (US); Derek E. Spock, Boston, MA (US); David J. Husak, Windham, NH (US)

(73) Assignee: PLEXXI INC., Nashua, NH (US)

( * ) Notice: Subject to any disclaimer, the term of this patent is extended or adjusted under 35 U.S.C. 154(b) by 37 days.

(21) Appl. No.: 14/705,088

(22) Filed: May 6, 2015

(65) Prior Publication Data

US 2015/0237421 A1    Aug. 20, 2015

Related U.S. Application Data

(62) Division of application No. 13/528,501, filed on Jun. 20, 2012, now Pat. No. 9,065,582.
(Continued)

(51) Int. Cl.
*H04J 14/02* (2006.01)
*H04Q 11/00* (2006.01)
(Continued)

(52) U.S. Cl.
CPC ....... *H04Q 11/0005* (2013.01); *H04B 10/275* (2013.01); *H04J 14/0283* (2013.01);
(Continued)

(58) Field of Classification Search
CPC ....... H04L 12/28; H04L 12/18; H04L 45/745; H04L 49/351; H04Q 11/0005;
(Continued)

(56) References Cited

U.S. PATENT DOCUMENTS

| 4,947,389 A | 8/1990 | Eng et al. |
| 5,008,881 A | 4/1991 | Karol |

(Continued)

FOREIGN PATENT DOCUMENTS

| EP | 0620 694 | 4/1994 |
| EP | 2 429 122 | 3/2012 |

(Continued)

OTHER PUBLICATIONS

Kandula et al., Flyways to De-Congest Data Center Networks, Aug. 1, 2009.*

(Continued)

*Primary Examiner* — Jae Y Lee
*Assistant Examiner* — Aixa Guadalupe-Cruz
(74) *Attorney, Agent, or Firm* — Preti Flaherty Beliveau & Pachios LLP

(57) ABSTRACT

Data center network architectures, systems, and methods that can reduce the cost and complexity of data center networks. Such data center network architectures, systems, and methods employ physical optical ring network and multi-dimensional network topologies and optical nodes to efficiently allocate bandwidth within the data center networks, while reducing the physical interconnectivity requirements of the data center networks. The respective optical nodes can be configured to provide various switching topologies, including, but not limited to, chordal ring switching topologies and multi-dimensional chordal ring switching topologies.

19 Claims, 27 Drawing Sheets

Related U.S. Application Data

(60) Provisional application No. 61/498,931, filed on Jun. 20, 2011, provisional application No. 61/554,107, filed on Nov. 1, 2011.

(51) Int. Cl.
| | | |
|---|---|---|
| *H04L 12/931* | (2013.01) | |
| *H04L 12/18* | (2006.01) | |
| *H04L 12/741* | (2013.01) | |
| *H04L 5/14* | (2006.01) | |
| *H04B 10/275* | (2013.01) | |

(52) U.S. Cl.
CPC ............... *H04L 5/14* (2013.01); *H04L 12/18* (2013.01); *H04L 45/745* (2013.01); *H04L 49/351* (2013.01); *H04J 14/022* (2013.01); *H04J 14/0267* (2013.01); *H04Q 2011/0037* (2013.01)

(58) Field of Classification Search
CPC ....... H04B 10/27; H04B 10/275; H04J 14/00; H04J 14/0283; H04J 14/022; H04J 14/0267

See application file for complete search history.

(56) References Cited

U.S. PATENT DOCUMENTS

| | | |
|---|---|---|
| 5,095,381 A | 3/1992 | Karol |
| 5,576,875 A | 11/1996 | Chawki et al. |
| 6,084,694 A | 7/2000 | Milton et al. |
| 6,192,173 B1 | 2/2001 | Solheim et al. |
| 6,233,074 B1 | 5/2001 | Lahat et al. |
| 6,411,412 B1 | 6/2002 | Jiang et al. |
| 6,452,703 B1 | 9/2002 | Kim et al. |
| 6,493,118 B1 | 12/2002 | Kartalopoulos |
| 6,519,059 B1 | 2/2003 | Doerr et al. |
| 6,570,685 B1 | 5/2003 | Fujita et al. |
| 6,647,428 B1 | 11/2003 | Bannai et al. |
| 6,711,324 B1 | 3/2004 | Zang et al. |
| 6,771,907 B1 | 8/2004 | Yamazaki et al. |
| 6,785,472 B1 | 8/2004 | Adams et al. |
| 6,999,681 B2 | 2/2006 | Gruber et al. |
| 7,130,500 B2 | 10/2006 | Wachsman et al. |
| 7,254,138 B2 | 8/2007 | Sandstrom |
| 7,254,336 B2 | 8/2007 | Harney et al. |
| 7,333,511 B2 | 2/2008 | Sandstrom |
| 7,421,197 B2 | 9/2008 | Palacharia et al. |
| 7,477,844 B2 | 1/2009 | Gumaste et al. |
| 7,522,837 B2 | 4/2009 | Tanobe et al. |
| 7,606,500 B2 | 10/2009 | Hofmeister |
| 7,643,751 B2 | 1/2010 | Sone et al. |
| 7,743,127 B2 | 6/2010 | Santos et al. |
| 7,792,428 B2 | 9/2010 | Akiyama et al. |
| 7,925,165 B2 | 4/2011 | Cavazzoni et al. |
| 7,983,560 B2 | 7/2011 | Maki et al. |
| 7,986,713 B2 | 7/2011 | Sandstrom |
| 8,027,585 B2 | 9/2011 | Yokoyama |
| 8,111,995 B2 | 2/2012 | Wisseman |
| 8,126,330 B2 | 2/2012 | Wisseman |
| 2002/0048066 A1 | 4/2002 | Antoniades et al. |
| 2002/0131118 A1 | 9/2002 | Chiaroni et al. |
| 2003/0043855 A1 | 3/2003 | Yamamoto et al. |
| 2003/0046127 A1 | 3/2003 | Crowe et al. |
| 2003/0059154 A1 | 3/2003 | Sato |
| 2004/0105364 A1 | 6/2004 | Chow et al. |
| 2004/0131064 A1 | 7/2004 | Burwell et al. |
| 2004/0141746 A1 | 7/2004 | Oberg |
| 2004/0165891 A1 | 8/2004 | Kopelovitz et al. |
| 2004/0228631 A1 | 11/2004 | Mantin et al. |
| 2004/0252688 A1* | 12/2004 | May .................. H04L 12/42 370/389 |
| 2005/0031348 A1 | 2/2005 | Choi et al. |
| 2005/0044195 A1 | 2/2005 | Westfall |
| 2005/0185959 A1 | 8/2005 | Kinoshita et al. |
| 2006/0123477 A1 | 6/2006 | Raghavan et al. |
| 2006/0210274 A1 | 9/2006 | Lichtman et al. |
| 2006/0228112 A1 | 10/2006 | Palacharla et al. |
| 2006/0275035 A1 | 12/2006 | Way |
| 2008/0062891 A1 | 3/2008 | Van der Merwe et al. |
| 2008/0144511 A1 | 6/2008 | Marcondes et al. |
| 2008/0273875 A1 | 11/2008 | Sone et al. |
| 2009/0092064 A1 | 4/2009 | Fan et al. |
| 2009/0138577 A1 | 5/2009 | Casado et al. |
| 2009/0219817 A1 | 9/2009 | Carley |
| 2009/0268605 A1 | 10/2009 | Campbell et al. |
| 2009/0296719 A1 | 12/2009 | Maier et al. |
| 2009/0328133 A1 | 12/2009 | Strassner et al. |
| 2010/0014518 A1 | 1/2010 | Duncan et al. |
| 2010/0115101 A1 | 5/2010 | Lain et al. |
| 2010/0121972 A1 | 5/2010 | Samuels et al. |
| 2010/0284691 A1 | 11/2010 | Zottmann |
| 2010/0290786 A1 | 11/2010 | Abbott |
| 2011/0090892 A1 | 4/2011 | Cooke |

FOREIGN PATENT DOCUMENTS

| | | | |
|---|---|---|---|
| IT | WO 2010086019 A1 * | 8/2010 | .......... H04J 14/0204 |
| WO | WO 2008/073636 | 6/2008 | |
| WO | WO 2008/116309 | 10/2008 | |
| WO | WO 2009/042919 | 4/2009 | |
| WO | WO 2009/096793 | 8/2009 | |
| WO | WO 2009/151847 | 12/2009 | |
| WO | WO 2010/133114 | 11/2010 | |
| WO | WO 2010/138937 | 12/2010 | |

OTHER PUBLICATIONS

Sudevalayam, Sujesha et al., "Affinity-aware Modeling of CPU Usage for Provisioning Virtualized Applications," 2011 IEEE 4th International Conference on Cloud Computing, Jul. 4, 2011, pp. 139-146, XP031934583.

A Torus-Based 4-Way Fault-Tolerant Backbone Network Architecture for Avionic WDM LANs; The Department of Electrical and Computer Engineering, University of Florida; Dexiang Wang and Janise Y. McNair; Optical Society of America; Mar. 31, 2011.

P2i-Torus: A Hybrid Architecture for Direct Interconnection; Department of Computer Science and Technology, Tsinghua University; Chao Zhang and Menghan Li; IEEE; Dec. 24-26, 2011.

Making High Bandwidth But Low Revenue Per Bit Network Applications Profitable; Optimum Communications; Jan. 15, 2010.

A Policy-aware Switching Layer for Data Centers; Electrical Engineering and Computer Sciences, University of California at Berkeley; Dilip Antony Joseph, Arsalan Tavakoli and Ion Stoica; Jun. 24, 2008.

Optimum Communications Services: Finally a way out of the zero-sum game?; TechnologyInside on the web; Oct. 20, 2008.

Flattened Butterfly: A Cost-Efficient Topology for High-Radix Networks; John Kim, William J. Daily, Computer Systems Laboratory; Dennis Abts, Cray Inc.; Jun. 9-13, 2007.

Impact of Adaptive Layer 1 for Packet Switching Network Cost and QoS; TRLabs Next Generation Internet Workshop; Mark Sandstrom; Optimum Communications; Nov. 9, 2007.

A Proposal of Hierarchical Chordal Ring Network Topology for WDM Networks; Tomoya Kitani, Nobuo Funabiki and Teruo Higashino; IEEE; 2004.

Zhu et al., "Seven core multicore fiber transmissions for passive optical network," 2010, Optics Express, vol. 18 Issue 11, pp. 11117-11122.

"Scalable Photonic Interconnection Network with Multiple-Layer Configuration for Warehouse-Scale Networks", Sakano et al., Optical Society of America, Aug. 2011.

"Hybrid Optical WDM Networks Utilizing Optical Waveband and Electrical Wavelength Cross-connects", Le et al., Optical Society of America, 2011.

"WDM-Based Local Lighwave Networks Part II: Multihop Systems", Biswanath Mukherjee, IEEE, Jul. 1992.

(56) References Cited

OTHER PUBLICATIONS

High Performance Datacenter Networks; Architectures, Algorithms, and Opportunities; Dennis Abts and John Kim; 2011; 115 Pages.
H.J.H.N. Kenter, S.M. Heemstra De Groot, WDM and SDM in Future Optical Networks, Tele-Informatics and Open Systems Group, Department of Computer Science, University of Twente, The Netherlands.
"Optical Cross Connect Based on WDM and Space-Division Multiplexing," Y.D. Jin et al., IEEE Photonics Technology Letters, Nov. 1995.

* cited by examiner

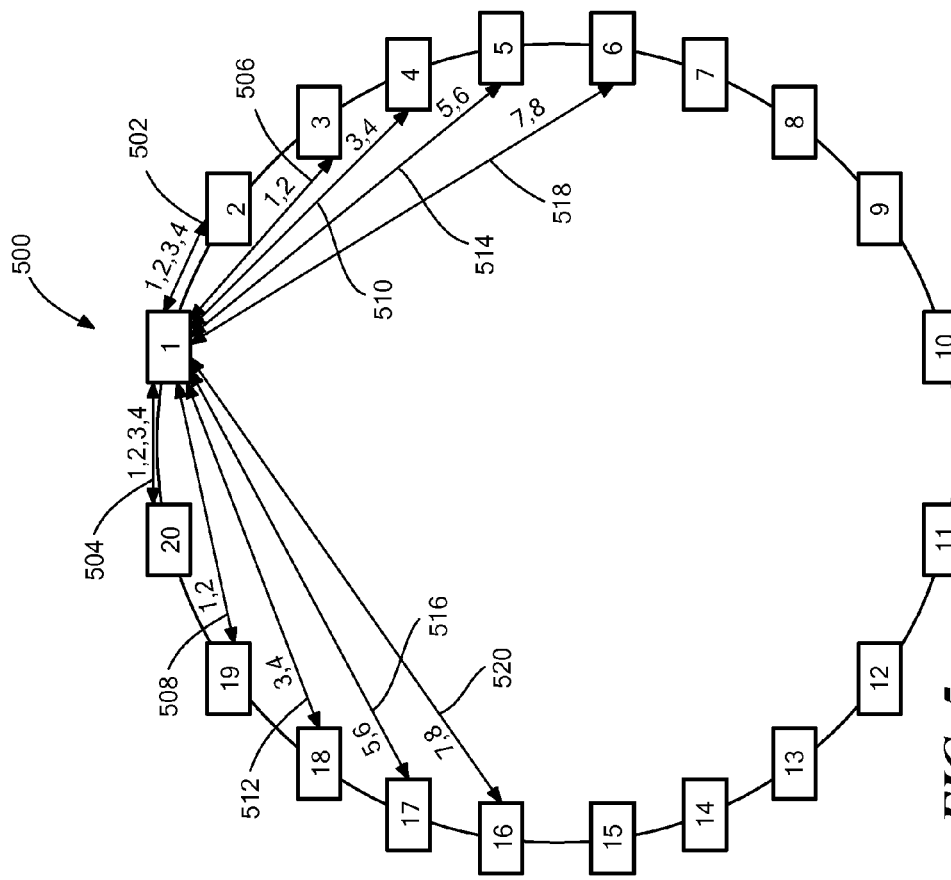
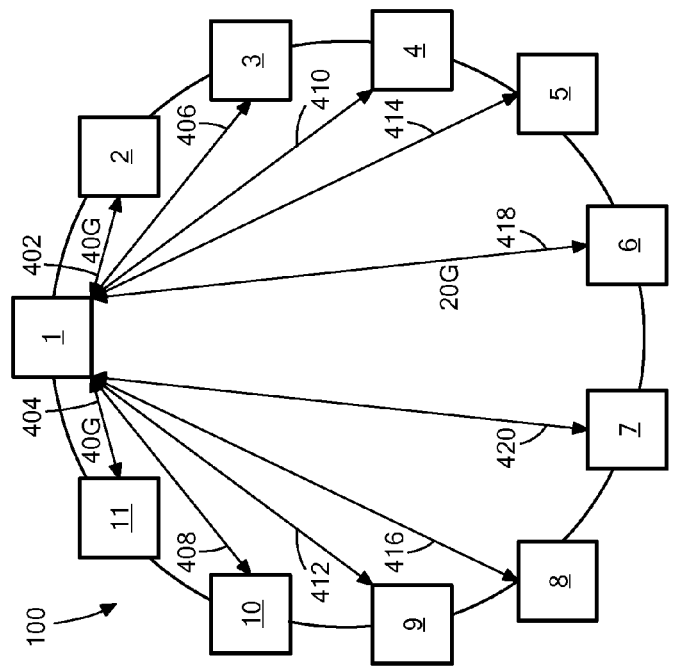
FIG. 5
FIG. 4

OPTICAL ARCHITECTURE AND CHANNEL PLAN EMPLOYING MULTI-FIBER CONFIGURATIONS FOR DATA CENTER NETWORK SWITCHING

CROSS REFERENCE TO RELATED APPLICATIONS

This application claims benefit of the priority of U.S. Provisional Patent Application No. 61/498,931 filed Jun. 20, 2011 entitled DATA CENTER NETWORK SWITCHING, and U.S. Provisional Patent Application No. 61/554,107 filed Nov. 1, 2011 entitled DATA CENTER NETWORK SWITCHING.

FIELD OF THE INVENTION

The present application relates generally to data communications systems, and more specifically to optical data center networks, including the interconnection of data center servers, top-of-rack switches, and aggregation switches using reduced cost coarse wavelength division multiplexing (CWDM) transceivers, thereby enabling high switch interconnectivity with easier fiber cabling.

BACKGROUND OF THE INVENTION

In recent years, university, government, business, and financial service entities, among others, have increasingly relied upon data center networks that incorporate racks of server computers ("servers") to implement application programs ("applications") for supporting their specific operational requirements, including, but not limited to, data base management applications, document and file sharing applications, searching applications, gaming applications, and financial trading applications. As such, data center networks are generally expanding in terms of the number of servers incorporated therein, as well as the networking equipment needed to interconnect the servers for accommodating the data transfer requirements of the applications that the servers are called upon to implement.

Conventional data center networks typically have hierarchical architectures, in which each server co-located in a particular rack is connected via one or more Ethernet connections to a top-of-rack Ethernet switch (the "top-of-rack switch"). A plurality of such top-of-rack switches form what is generally referred to as the "access layer", which is the lowest level of the hierarchical network architecture. The next higher level of the hierarchy is generally referred to as the "aggregation layer", which can include a plurality of Ethernet switches (the "aggregation switch(es)") and/or Internet protocol (IP) routers. Each top-of-rack switch in the access layer can be connected to one or more aggregation switches and/or IP routers in the aggregation layer. The highest level of the hierarchy is generally referred to as the "core layer", which includes a plurality of IP routers (the "core switches") that can be configured to provide ingress/egress points for the data center network. Each aggregation switch and/or IP router in the aggregation layer can be connected to one or more core switches in the core layer, which, in turn, can be interconnected to one another. In such conventional data center networks, the interconnections between the racks of servers, the top-of-rack switches in the access layer, the aggregation switches/IP routers in the aggregation layer, and the core switches in the core layer, are typically implemented using point-to-point Ethernet links.

Although the conventional data center networks described above have been employed to satisfy the operational requirements of many university, government, business, and financial service entities, such conventional data center networks have several drawbacks. For example, data communications between servers that are not co-located within the same rack may experience excessive delay (also referred to herein as "latency") within the data center network, due in no small part to the multitude of switches and/or routers that the data may be required to traverse as it propagates up, down, and/or across the hierarchical architecture of the network. Data communications between such servers may also experience latency within the respective switches and/or routers of the data center network due to excessive node and/or link utilization. Further, because multiple paths may be employed to deliver broadcast and/or multicast data to different destinations within the data center network, such broadcast and/or multicast data may experience excessive latency skew. Such latency and/or latency skew may be exacerbated as the size of the data center network and/or its load increases. The hierarchical architecture of the data center network also generally suffers from increasingly complex, but essentially fixed, fiber cabling requirements as the numbers of switches, routers, layers, and their interconnections are increased to handle the expansion of the data center network.

It would therefore be desirable to have data center network architectures, systems, and methods that avoid at least some of the drawbacks of the conventional data center networks described above.

BRIEF SUMMARY OF THE INVENTION

In accordance with the present application, data center network architectures, systems, and methods are disclosed that can reduce the cost and complexity of data center networks. Such data center network architectures, systems, and methods employ optical nodes utilizing hybrid spatial division multiplexing (SDM)/wavelength division multiplexing (WDM) shifting channel plans on paired optical ports, which can be connected in a variety of physical cabled network topologies, including, but not limited to, physical rings and physical 2-dimensional and higher dimensional toruses. The combination of a selected physical topology and a selected hybrid SDM/WDM shifting channel plan produces a switching topology with increased interconnection density and reduced diameter and link utilization, resulting in reduced latency and latency skew. The optical nodes can include multicast/broadcast capable circuit switches, such as electrical cross-point or electrical crossbar switches, to increase the functionality of the optical nodes and the network in which the optical nodes are deployed, allowing capacity to be shifted and switch hop counts to be reduced based on network traffic, application requirements, and/or deployment requirements. The network may be employed as a replacement for a multitude of top-of-rack switches in the access layer, thereby reducing the network requirements of the aggregation layer and the core layer. Alternatively, the network may be employed as a replacement for a multitude of aggregation switches and/or core switches, thereby reducing the network requirements on the aggregation layer, the core layer, and the access layer.

In one aspect, each optical node includes a packet switch, such as an Ethernet switch or an IP router. The packet switch has a plurality of downlink ports and a plurality of uplink ports. The packet switch can be communicably coupled, by one or more of the downlink ports, through a user connection port on the optical node, to one or more externally connected devices, such as servers, external switches, external routers, or any other suitable computing or computer related devices, through one or more downlinks. Each optical node can include several types of user connection ports supporting various speeds, protocols, and/or physical formats, including, but not limited to, 10 Gb/s Ethernet ports and QSFP ports supporting 40 Gb/s Ethernet. The packet switch of one such optical node can be communicably coupled, by one or more of the uplink ports, to the packet switch of another such optical node through one or more uplinks. The packet switches of the optical nodes and their interconnection through the uplinks form what is referred to herein as a "switching topology". It is noted that in such a switching topology, the packet switches can be interconnected by multiple uplinks.

In another aspect, each optical node further includes a plurality of optical transmitters and a plurality of optical receivers (collectively, the "transceivers") connected to its uplink ports. Each optical node can also include at least one circuit switch, such as a cross-point switch, a cross-bar switch, or a more functional switch having the ability to switch time slots of the signals on its inputs to time slots of the signals on its outputs. The transceivers are operative to provide electrical signals to the circuit switch, which, in turn, is operative to provide a multitude of connections to the packet switch, thereby allowing the switching topology to be reconfigured. In an exemplary aspect, the circuit switch is operative to multicast and/or broadcast a signal from its input to one, some, or all of its outputs. It is noted that the switching topology that results when (1) there is no circuit switch, or (2) the circuit switch is set to connect each of the optical node's transceivers to the optical node's packet switch uplink ports, is referred to herein as the "base switching topology". The base switching topology can be distinguished from the resultant switching topology, which results from reconfiguring the circuit switch.

In a further aspect, some or all of the user connection ports of each optical node are connected to the optical node's circuit switch, and the format of uplink transmission is selected to match the format of downlink transmission, thereby enabling the reconfiguration of a user connection port from one that internally connects to the optical node's packet switch to one that internally connects to one of the optical node's transceivers (referred to herein as "direct attach"). A direct attach is used to provide a direct attach link between two externally connected devices on different optical nodes, or between one externally connected device of an optical node and the packet switch of another optical node. For example, a QSFP user connection port may provide a signal that is be converted into four (4) 10 GbE connections to one (1) to four (4) packet switches of other optical nodes, by separating out its four (4) 10 GbE component signals, and individually connecting the signals by the circuit switch to four (4) transceivers, which can establish connections to four (4) other transceivers at up to four (4) other optical nodes whose signals are connected, possibly through their circuit switches, to one or more other internal packet switches or external devices using such direct attach.

Further, a subset of the four (4) 10 GbE component signals may be provided for direct attach links, and the remainder of the 10 GbE component signals may be provided for downlink transmission, by suitably connecting the 10 GbE component signals to the transceivers or the packet switch, respectively. It is noted that, at any given optical node, there may be more transceivers than uplink ports, depending upon the hardware configuration of the optical node, and whether or not any user connection ports are configured to be direct attach, thereby enabling terminated optical signals to be connected by the circuit switch without disrupting any of the optical node's uplinks.

In still another aspect, each optical node further includes a plurality of multi-fiber interfaces referred to herein as "optical ports". The number of optical ports in an optical node is indicative of the degree of that optical node. For example, an optical node of degree-2 includes two paired optical ports referred to herein as the "East" port and the "West" port. Further, an optical node of degree-4 includes two paired optical ports referred to herein as the East port and the West port, and two additional paired optical ports referred to herein as the "North" port and the "South" port. Such optical nodes can be physically interconnected through their optical ports by a multitude of optical fibers, which may be implemented using individual fiber cables or a plurality of multi-fiber cables, each with two or more fibers. In an exemplary aspect, the fibers interconnecting two optical nodes can be contained within a single multi-fiber cable with single multi-fiber connectors connecting to the optical ports of the respective optical nodes. The physical topology can be represented by a graph of nodes, in which the nodes of the graph correspond to the optical nodes, and edges between the nodes of the graph indicate the optical node connections on one or more optical fibers. It is noted that the optical ports may be distinct, or physically identical and assigned a name during or after installation. For example, when the ports are physically identical, optical nodes of degree-2 on an optical ring network may be operative to discover their neighboring optical nodes on the network, and to globally decide which of their optical ports are to be designated as the East ports and the West ports.

It is further noted that the switching topology may be different from the physical topology because some or all of the optical nodes may utilize optical bypass, or may switch wavelengths through one or more circuit switches after optical-to-electrical conversion, followed by electrical-to-optical conversion on the same or different wavelength. For example, the physical topology may be an optical multi-fiber ring and the switching topology may be a chordal ring, or the physical topology may be a 2-dimensional torus and the switching topology may a 2-dimensional chordal ring.

In yet another aspect, an optical node can have pairs of optical ports that have internal optical paths, enabling all-optical bypass on a multitude of wavelengths between paired optical ports. The SDM/WDM optical routing between the paired optical ports is referred to herein as a "channel plan", which specifies which wavelengths are to be terminated (e.g., dropped to an optical receiver, or added from an optical transmitter) on which fibers, and which wavelengths are to be optically routed from which input fiber to which output fiber through the optical node. For an optical node of degree-2, the East port and the West port are paired optical ports. For an optical node of degree-4, the East port and the West port are paired optical ports, and the North port and the South port are paired optical ports. In general, for an optical node with ports P1, P2, P3, . . . , ports P1 and P2 are paired optical ports, ports P3 and P4 are paired optical ports, etc. For purposes of discussion, if two optical ports P1 and P2 are paired optical ports, then it is assumed that the channel plan in the direction from optical port P1 to optical port P2 is the same as the channel plan in the direction from optical port P2 to optical port P1. It is noted that paired optical ports implementing the same channel plan in each direction may or may not be physically identical, depending on how the fibers are to be connected, as well as the positions of the outbound and inbound fibers. It is further noted that different paired optical ports can support different channel plans. In addition, one of the wavelengths in the SDM/WDM channel plan may be allocated to optical supervisory control (OSC), or the OSC may be handled in a separate manner.

In a further aspect, at least two paired optical ports P1 and P2 of an optical node can employ what is referred to herein as a single wavelength "SDM shifting channel plan" in each direction. In the direction from optical port P1 to optical port P2, an exemplary SDM shifting channel plan can be specified as follows. The inbound fibers of optical port P1 are divided into a plurality of inbound chordal groups, and the outbound fibers of optical port P2 are divided into an identical set of outbound chordal groups, in which each inbound chordal group G is matched to an outbound chordal group G'. For each inbound chordal group G of optical port P1, the fibers 1, 2, 3, . . . $r_G$ are numbered, in which "$r_G$" corresponds to the number of fibers in the inbound chordal group G. For each outbound chordal group G' of optical port P2, the fibers 1, 2, 3, . . . $r_{G'}$ are numbered, in which "$r_{G'}$" corresponds to the number of fibers in the outbound chordal group G'. Because the inbound chordal group G is matched to the outbound chordal group G', $r_{G'}$ is equal to $r_G$. Fiber "f" of the inbound chordal group G is internally routed to fiber "f−1" of the outbound chordal group G' for f equal to 2, 3, . . . $r_G$. The wavelength on fiber "1" of the inbound chordal group G is dropped by connecting it to one of the optical node's receivers. Further, the wavelength on fiber "$r_{G'}$" of the outbound chordal group G' is added by connecting it to one of the optical node's transmitters. The exemplary SDM shifting channel plan in the direction from optical port P2 to optical port P1 can be specified in a similar fashion. In an exemplary aspect, an optical node of degree-2 can include two paired optical ports, in which each optical port includes a single connectorized twelve (12) fiber cable divided into four (4) chordal groups, namely, a first input chordal group of one (1) fiber, a first output chordal group of one (1) fiber, a second input chordal group of five (5) fibers, and a second output chordal group of five (5) fibers.

In another aspect, at least two paired optical ports P1 and P2 of an optical node can employ what is referred to herein as a hybrid "SDM/WDM shifting channel plan" in each direction. In the direction from optical port P1 to optical port P2, an exemplary SDM/WDM shifting channel plan can be specified as follows. The inbound fibers of the optical port P1 are divided into a plurality of inbound chordal groups, and the outbound fibers of the optical port P2 are divided into a set of identical outbound chordal groups. Each inbound chordal group G of the optical port P1 is matched to an outbound chordal group G' of the optical port P2, with the same number of fibers in each chordal group. For each inbound chordal group G and its matching outbound chordal group G', the following steps are performed:

(1) the inbound fibers 1, 2, 3, . . . r are numbered, in which "r" is the number of fibers of the inbound chordal group G;

(2) the outbound fibers 1, 2, 3, . . . r are numbered, in which "r" is the number of fibers of the outbound chordal group G', such that when the optical port P1 is connected to the optical port P2 of another optical node, the first output fiber of the outbound chordal group G' is connected to the first input fiber of the inbound chordal group G, the second output fiber of the outbound chordal group G' is connected to the second input fiber of the inbound chordal group G, etc.;

(3) a possibly empty set of wavelengths $w_f$ is dropped from input fiber f of the inbound chordal group G for f=1, 2, . . . r;

(4) a possibly empty set of wavelengths $w'_{f'}$ is added to output fiber f' of the outbound chordal group G' for f'=1, 2, . . . r; and (5) all wavelengths not in $w_f$ or $w'_{f-1}$ are routed from input fiber f of the inbound chordal group G to output fiber f'=f−1 of the outbound chordal group G', in which the number of times a wavelength w is added on an output fiber f'=1, . . . r of the outbound chordal group G' equals the number of times that the same wavelength w is dropped on an input fiber f of the inbound chordal group G. The adding and dropping of wavelengths are done in sequence such that if the wavelength w is added at the output fiber f', then it is dropped on the input fiber f≤f' before it can possibly be added again to another output fiber f''<f'. The exemplary SDM/WDM shifting channel plan in the direction from optical port P2 to optical port P1 can be specified in a similar fashion.

The SDM/WDM shifting channel plan allows the same wavelength w to be reused multiple times in a chordal group so long as each time after it is added onto an output fiber k of an output chordal group, the wavelength is extracted from the matching input chordal group on an equal or lower numbered input fiber j before being added again within the same output chordal group on an output fiber m<k. If a wavelength w is added on the output fiber k and next dropped on the input fiber j≤k, and if optical nodes implementing identical channel plans are cabled in a path or ring of sufficient length, then w will carry an optical connection that optically bypasses k−j optical nodes, producing a chord of length k−j+1. Adding and dropping wavelengths may be accomplished with the use of optical add/drop multiplexers, filters, or any other suitable optical devices and/or techniques. Such devices can be placed in different positions within the optical node, or integrated in common modules in various ways, to accomplish the above-described functionality.

With further regard to the SDM/WDM shifting channel plan, one or more chordal groups can employ the technique of injecting wavelengths only on their topmost outbound fiber, and dropping these wavelengths exactly once at one or more of the input fibers. One or more chordal groups can also employ the technique of injecting wavelengths exactly once at one or more of their output fibers, and dropping all wavelengths at their bottommost fiber.

In addition, one or more chordal groups can employ the technique of injecting, on their topmost fiber, a wavelength from among the plurality of all of the wavelengths in the channel plan, dropping that wavelength on one of their input fibers k, adding that same wavelength back on their output fiber k−1, and extracting the same wavelength on their bottommost fiber.

In still another aspect, inbound and outbound chordal groups that carry the input and output portions of a duplex communication link of a transceiver can be contained within the same cable, which is advantageous for cable wiring and fault tolerance. The positions of the inbound fibers in one optical port correspond to the positions of the outbound fibers in the paired optical port, allowing the paired optical ports to be interconnected with a multi-fiber cable. For example, each optical port can connect to a single multi-fiber cable using a single multi-fiber connector. Further, the paired optical ports can implement a common channel plan. The inbound and output fibers can also be contained in separate fiber cables, each possibly contained in multi-fiber bundles and connectorized with multi-fiber connectors, with paired optical ports being physically identical, allowing the optical ports to be interconnected by connecting outbound cables to inbound cables of a paired optical port.

In a further aspect, an optical node can include optical ports that do not have a corresponding optical port pair. For example, an optical node can have a West port, but no East port. In this case, the West port of such an optical node functions as a terminal port. All wavelengths on all input fibers of that terminal port are terminated by transceivers through the use of optical multiplexers, optical de-multiplexers, or any other suitable optical devices and/or techniques. For example, an optical node of degree-1 can terminate each optical fiber on its sole optical port. Further, an optical node of degree-3 can have a West port and an East port that are paired optical ports, and a South port that is a terminal port for terminating all of the wavelengths on all of the fibers of a South port/North port channel plan.

A plurality of optical nodes implementing various channel plans can be connected in an optical network such that optical ports are connected through a paired optical port to other optical ports that share the same channel plan. For example, optical nodes, all of degree-2, can be logically laid out in a ring, and each optical node can be connected to its two neighboring optical nodes by a plurality of fibers, connecting the East port of the optical node to the West port of one of its neighboring optical nodes, and connecting the West port of the optical node to the East port of its other neighboring optical node. In an exemplary aspect, each type of optical port, e.g., the West port or the East port, is keyed to allow physical connection to its East or West port pair on another optical node. In another exemplary aspect, there is no physical distinction between the East and West ports. In a further exemplary aspect, each optical node is configured to implement a common East/West SDM/WDM shifting channel plan and an identical West/East SDM/WDM shifting channel plan, and the switching topology is a chordal ring network having a reduced fiber and/or wavelength count, allowing the use of less costly optical transceivers and add/drop multiplexers.

For optical nodes that include a circuit switch, the chords of the chordal ring network can be reconfigured by effectively attaching two or more chords to produce a chord of increased length.

In one aspect, a chordal ring network with N optical nodes, numbered n=0, 1, 2, ... N−1, has chords of lengths $r_1, r_2, \ldots r_C$, such that the switch in optical node n is connected to the switch in its neighboring optical nodes $n+r_c$ (mod N) and $n-r_c$ (mod N) with a multiplicity of $s_c \geq 1$ chords (c=1 ... C), each chord representing an uplink.

The switching topology for such a chordal ring network can be denoted as $R_N(r_1^{s_1}; r_2^{s_2}; r_3^{s_3}; \ldots; r_C^{s_C})$. For example, "$R_N(1^{s_1})$" represents the switching topology of a chordal ring network with N optical nodes, each optical node being connected to its two neighboring optical nodes by $s_1$ chords. Further, "$R_N(1^2;3)$" represents the switching topology of a chordal ring network, in which neighboring optical nodes are connected by two (2) chords, and optical nodes with two (2) intermediate optical nodes between them are connected by one (1) chord. Moreover, "$R_N(1^4; 2^2; 3^2; 4^2; 5^2)$" represents the switching topology of a chordal ring network with four (4) chords between neighboring optical nodes, two (2) chords between optical nodes separated by one (1) other optical node, two (2) chords between optical nodes separated by two (2) other optical nodes, two (2) chords between optical nodes separated by three (3) other optical nodes, and two (2) chords between optical nodes separated by four (4) other optical nodes.

In another aspect, a plurality of optical nodes of degree-2 are physically connected in a ring, and the channel plan is selected such that the switching topology is denoted as $R_N(1^{s_1}; 2^{s_2}; 3^{s_3}; \ldots; (N/2)^{s_c})$ for N even, and $R_N(1^{s_1}; 2^{s_2}; 3^{s_3}; \ldots; ((N-1)/2)^{s_c})$ for N odd, providing a full mesh with at least one chord (uplink) between each pair of optical nodes. For example, "$R_{11}(1^4; 2^2; 3^2; 4^2; 5^2;)$" represents a full mesh switching topology for eleven (11) optical nodes, in which neighboring optical nodes are connected by four (4) chords, and non-neighboring optical nodes are connected by two (2) chords. Further, "$R_{12}(1^4; 2^2; 3^2; 4^2; 5^2; 6^2)$") represents a full mesh switching topology for twelve (12) optical nodes, in which neighboring optical nodes, and optical nodes halfway around the ring separated by five (5) optical nodes between them, are connected by four (4) chords, and all other pairs of optical nodes are connected by two (2) chords.

The SDM shifting channel plan requires $F=2\Sigma_{c=1}^{C} s_c * r_c$ fibers between physically adjacent optical nodes to create a full mesh switching topology. For example, the switching topology denoted as $R_{11}(1^4; 2^2; 3^2; 4^2; 5^2)$ provides a full mesh on eleven (11) optical nodes, and requires a total of sixty-four (64) fibers between every optical node in the physical ring. Using the SDM/WDM shifting channel plan, the switching topology $R_{11}(1^4; 2^2; 3^2; 4^2; 5^2)$ can be implemented using twelve (12) fibers between optical nodes, using six (6) distinct wavelengths, by forming two (2) chordal groups per direction, in which the first chordal group in each direction includes a single fiber carrying the four (4) chords on wavelengths w1, w2, w3, and w4, and the second chordal group in each direction includes five (5) fibers carrying the remaining chords. Wavelengths w1, w2, w3, and w4 are added to output fiber "5" of the chordal group, wavelengths w5 and w6 are added to output fiber "4" of the chordal group, wavelengths w1 and w2 are dropped on input fiber "4" and added on output fiber "3", wavelengths w1, w2, w3, w4, w5, and w6 are dropped on input fiber "1" so that wavelengths w1 and w2 implement two (2) chords of length 2 and 3, wavelengths 3 and 4 implement chords of length 5, and wavelengths w5 and w6 implement two (2) chords of length 4. Alternatively, the switching topology $R_{11}(1^4; 2^2; 3^2; 4^2; 5^2)$ can be implemented using twelve (12) fibers between optical nodes, using eight (8) distinct wavelengths, by forming two (2) chordal groups per direction, in which the first chordal group in each direction includes a single fiber carrying the four (4) ring chords on wavelengths w1, w2, w3, and w4, and the second chordal group in each direction includes five (5) fibers carrying the remaining chords. Wavelengths w1, w2, w3, w4, w5, w6, w7, and w8 are added to output fiber "5" of the chordal group in each direction, wavelengths w1 and w2 are dropped on input fiber "4", w3 and w4 are dropped on input fiber "3", w5 and w6 are dropped on input fiber "2", and w7 and w8 are dropped on input fiber "1".

Accordingly, there are a multitude of possible SDM/WDM shifting channel plans for the same chordal ring topology, some of which may provide advantages in terms of optical loss, the availability of optical components, etc., whereas the SDM shifting channel plan is uniquely determined by the selected chordal ring topology. For example, the switching topology denoted as $R_{11}(1; 2; 3; 4; 5)$ requires thirty (30) fibers using the SDM shifting channel plan. Further, the switching topology $R_{11}(1; 2; 3; 4; 5)$ requires ten (10) fibers between neighboring optical nodes and three (3) distinct wavelengths using the SDM/WDM shifting channel plan, by forming chordal groups of size five (5) in each direction, adding the $1^{st}$, $2^{nd}$, and $3^{rd}$ wavelengths on output fiber "5" in each direction, dropping the $2^{nd}$ wavelength at output fiber "4", adding the $2^{nd}$ wavelength at output fiber "3", dropping the $3^{rd}$ wavelength at output fiber "2", adding the $3^{rd}$ wavelength at output fiber "2", and dropping the $1^{st}$, $2^{nd}$, and $3^{rd}$ wavelengths at input fiber "1". It is noted that, if the full mesh were implemented directly with a pair of fibers between each pair of optical nodes, instead of being implemented in a physical ring using multi-fiber cables, then a full mesh for eleven (11) optical nodes would require a total of 11*10=110 fibers, which is the same number of fibers that would be required using the SDM/WDM shifting channel plan, whereas using the SDM shifting channel plan would require a total of 330 fibers.

In a further aspect, the channel plan can be selected such that every optical node in the ring is connected by at least one chord to every other optical node in the ring, thereby producing a full mesh switching topology. It is noted that the circuit switches included in the optical nodes may be employed to connect a multitude of chords for producing the full mesh switching topology. For example, a full mesh can be achieved with twelve (12) optical nodes by using a SDM/WDM shifting channel plan with six (6) wavelengths and twelve (12) fibers between neighboring optical nodes to implement the switching topology $R_{12}(1^4; 2^2; 3^2; 4^2; 5^2)$ (which is not a full mesh), and using the circuit switches to join some chords of length 1 and 5 to implement the full mesh switching topology $R_{12}(1^3; 2^2; 3^2; 4^2; 5^1; 6^1)$.

In other aspects, optical nodes of degree-2 and optical nodes of degree-1 can be connected to form a physical path topology, in which the optical nodes of degree-1 are the endpoints of the physical path topology, and the switching topology is a chordal path topology. Further, a q-dimensional torus physical topology can be formed using optical nodes of degree-2q, in which the optical nodes in each dimension are connected in a physical ring, thereby forming multi-dimensional chordal ring switching topologies. Data communications between optical nodes that are not within the same dimension can be routed through one or more packet switches and/or one or more circuit switches to create one or more inter-dimensional uplinks. For example, a 2-dimensional torus physical topology can be formed using optical nodes of degree-4 logically laid out in a grid with each optical node connected to its four (4) neighboring optical nodes through its East, West, North, and South ports with a multitude of fibers. In such a grid, the first and last optical nodes in a row are regarded as being neighboring optical nodes, and the first and last optical nodes in a column are likewise regarded as being neighboring optical nodes. For example, the columns of the grid can represent neighboring racks in a data center network. The rows of the grid support the East/West channel plan, and the columns of the grid support the North/South channel plan. Data communications between optical nodes that are not within the same row or column can be electrically routed through one or more packet switches and/or one or more circuit switches to create one or more uplinks between the optical nodes. It is noted that the channel plans can be selected to form a full mesh in each row and column of the grid used to form the torus network.

It is further noted that optical ports that are not paired may implement different channel plans, and therefore may or may not be able to connect to one another, depending on the specifics of the selected channel plans. In such a case, for example, the East/West ports of an optical node of degree-4 can form a ring using a first subset of optical nodes of degree-2 having a common East/West channel plan, and the North/South ports of the optical node of degree-4 can form a ring using a second subset of optical nodes of degree-2 having the same or different East/West channel plan, in which the North/South channel plan of the optical node of degree-4 matches the East/West channel plan of the second subset of optical nodes of degree-2.

In another aspect, optical nodes of degree-4, or optical nodes of any other suitable degree, can be connected to one another to implement other switching topologies. For example, the optical ports of such optical nodes can be connected to paired optical ports of other such optical nodes, creating switching topologies that can include overlapping chordal rings and/or paths, in which one or more of the optical nodes can exist in more than one chordal ring and/or path.

In still another aspect, low latency and low latency skew multicasting and broadcasting can be achieved by configuring the circuit switches of a plurality of optical nodes to establish duplex uplinks from a source or origin packet switch to a set of primary destination packet switches, using a plurality of the source packet switch's uplink ports and simplex connections from the same source packet switch and uplink ports to a plurality of secondary packet switches, with one or more circuit switches establishing a simplex multicast or broadcast connection from one of its input ports to a plurality of its output ports, thereby enabling data multicasting and broadcasting from a server connected to the source packet switch to a plurality of servers connected to the same packet switch and/or different packet switches. In an exemplary aspect, the transmitting uplink ports on the secondary set of destination packet switches are muted. In another exemplary aspect, the transmitting uplink ports on the secondary set of destination packet switches are not muted, but data transmission is disabled by the circuit switches connected to the secondary transmitting uplink ports. In still another exemplary aspect, the transmitting uplink ports on one or more of the secondary packet switches are enabled and employed in separate multicast or broadcast communications. In a further aspect, the plurality of optical nodes are on an optical ring network, one of the destination packet switches is the source packet switch, and an outbound signal from an uplink of the source packet switch is either looped back at that switch's circuit switch onto its receiver uplink port, or routed through the network, for example, by routing the outbound signal around the ring so that it connects back on the source packet switch uplink port, thereby establishing the duplex connection. For example, in a physical ring network, a duplex connection can be established from the source packet switch to itself (using two uplink ports connected through the network), and the outbound signal can be dropped at a plurality of intermediate packet switches to establish multicast or broadcast simplex communications from the source packet switch to the destination packet switches.

By employing a passive shift strategy for the fibers at each optical node, combined with a fixed and passive wavelength add/drop scheme, 2-dimensional as well as higher dimensional chordal ring networks can be constructed using a reduced number of communications channels (e.g., fibers, wavelengths, time slots). The optical nodes can be configured to be substantially identical to one another. Further, each optical node can be configured to include a circuit switch to enable dynamic configuration of network chords for tailoring the network topology to the network traffic, reducing the network diameter, and/or increasing the density of the network topology. Each optical node can also include an electrical Ethernet packet switch to enable a fully integrated, layer 0/1/2/3 configurable, switching network with reduced fiber interconnection complexity, WDM hardware requirements, circuit switch size, packet switch size, and processing requirements. Higher degree physical topologies as well as alternate topologies can also be employed. In addition, the multi-fiber bundles can be keyed to reduce fiber cabling errors.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIGS. 3b-3c are schematic diagrams of the optical MUX/DMUX module implemented on the optical node of FIG. 3a;

FIG. 4 is a block diagram of the optical ring network of FIG. 1, illustrating the mesh connectivity that can be achieved when the respective optical nodes are configured in accordance with the optical node of FIG. 2;

FIG. 5 is a block diagram of an exemplary optical chordal ring network that includes a plurality of optical nodes configured in accordance with the optical node of FIG. 2;

FIG. 6 is a schematic diagram of an exemplary switch module that can be implemented on the optical node of FIG. 3a;

FIG. 9b is a block diagram of an exemplary optical node of degree-4 included in the optical torus network of FIG. 9a;

FIG. 13b is a schematic diagram of the optical MUX/DMUX module of FIG. 3b implemented in conjunction with the multi-core optical fiber of FIG. 13a;

FIG. 14a is a block diagram of an exemplary cross-point switch and packet switch that can be included in the switch module implemented on the optical node of FIG. 3a;

FIG. 14b is a block diagram of an exemplary alternative embodiment of the cross-point switch and packet switch of FIG. 14a;

FIG. 14c is a block diagram of a further exemplary alternative embodiment of the cross-point switch and packet switch of FIG. 14a; and FIG. 15 is a schematic diagram of alternative embodiments of the exemplary switch module, and the exemplary optical MUX/DMUX module, of FIG. 3a.

DETAILED DESCRIPTION OF THE INVENTION

The disclosures of U.S. Provisional Patent Application No. 61/498,931 filed Jun. 20, 2011 entitled DATA CENTER NETWORK SWITCHING, U.S. Provisional Patent Application No. 61/554,107 filed Nov. 1, 2011 entitled DATA CENTER NETWORK SWITCHING, and U.S. patent application Ser. No. 13/528,211 filed Jun. 20, 2012 entitled OPTICAL JUNCTION NODES FOR USE IN DATA CENTER NETWORKS, are incorporated herein by reference in their entirety.

Data center network architectures, systems, and methods are disclosed that can reduce the cost and complexity of data center networks. Such data center network architectures, systems, and methods employ physical optical ring network topologies and optical nodes utilizing hybrid spatial division multiplexing (SDM)/wavelength division multiplexing (WDM) shifting channel plans on paired optical ports, which can be connected in a variety of physical cabled network topologies, including, but not limited to, physical rings and physical 2-dimensional and higher dimensional toruses to efficiently allocate bandwidth within data center networks, while reducing the physical interconnectivity requirements of the data center networks.

Figure 1:
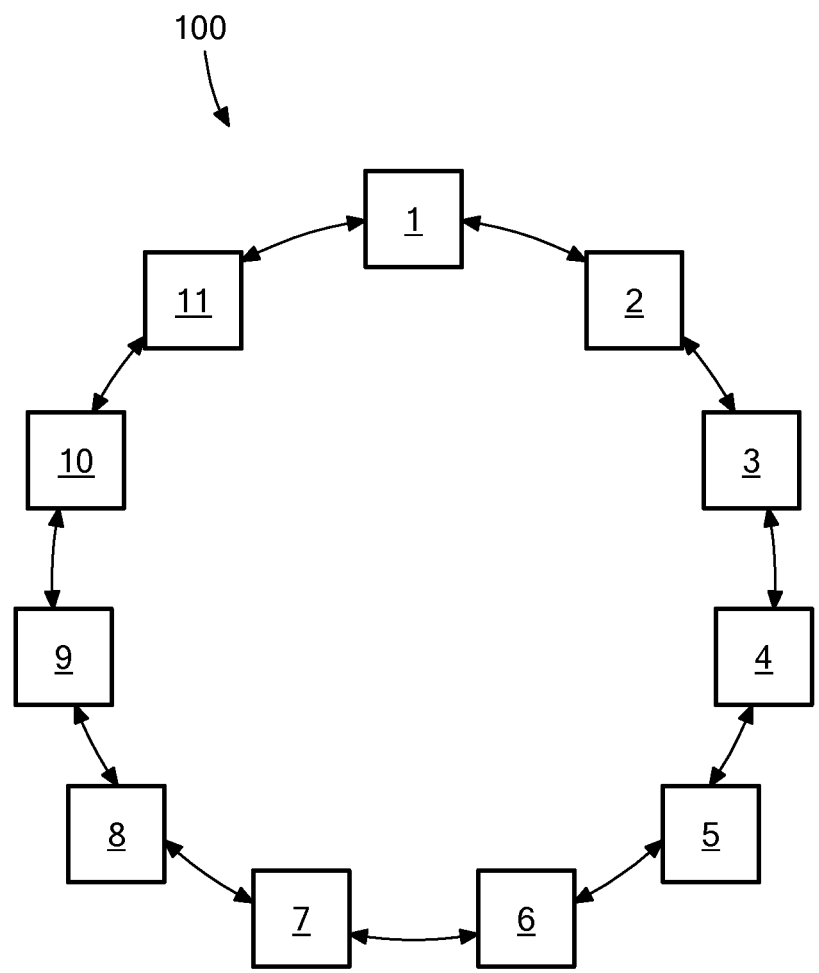
FIG. 1 is a block diagram of an exemplary optical ring network that includes a plurality of optical nodes of degree-2, configured in accordance with the present application.

FIG. 1 depicts an illustrative embodiment of an exemplary optical ring network 100 that includes a plurality of optical nodes 1 through 11, in accordance with the present application. It is noted that the optical ring network 100 depicted in FIG. 1 includes eleven (11) optical nodes 1-11 for purposes of illustration, and that any other suitable number of optical nodes may be included in the optical ring network 100. As employed herein, the term "optical node" refers to a primary network node providing packet communication services to its externally connected devices. Each of the plurality of optical nodes 1-11 can be communicably coupled, through one or more of the user connection ports, to one or more external computerized devices, such as one or more server computers ("servers"; see, e.g., server(s) 203 of FIG. 2) for running one or more application programs ("applications"), for storing data, etc. Such servers can operate either alone or in association with one or more other servers, which can be communicably coupled to the same optical node, or separate optical node(s), through one or more of the uplink ports. For example, the packet switches within the plurality of optical nodes 1-11 and the respective server(s) coupled thereto can communicate through the various uplink/downlink ports using a 10 Gb Ethernet protocol, or any other suitable protocol. Each of optical nodes 1-11 can employ optical wavelength division multiplexing (WDM), dense wavelength division multiplexing (DWDM), or coarse wavelength division multiplexing (CWDM). Further, links interconnecting the respective optical nodes 1-11 on the optical ring network 100 can be implemented using a single optical fiber pair configuration, or multi-fiber pair configurations including, e.g., one or more multi-fiber ribbon cables (e.g., MTP® multi-fiber ribbon cables).

Figure 2:
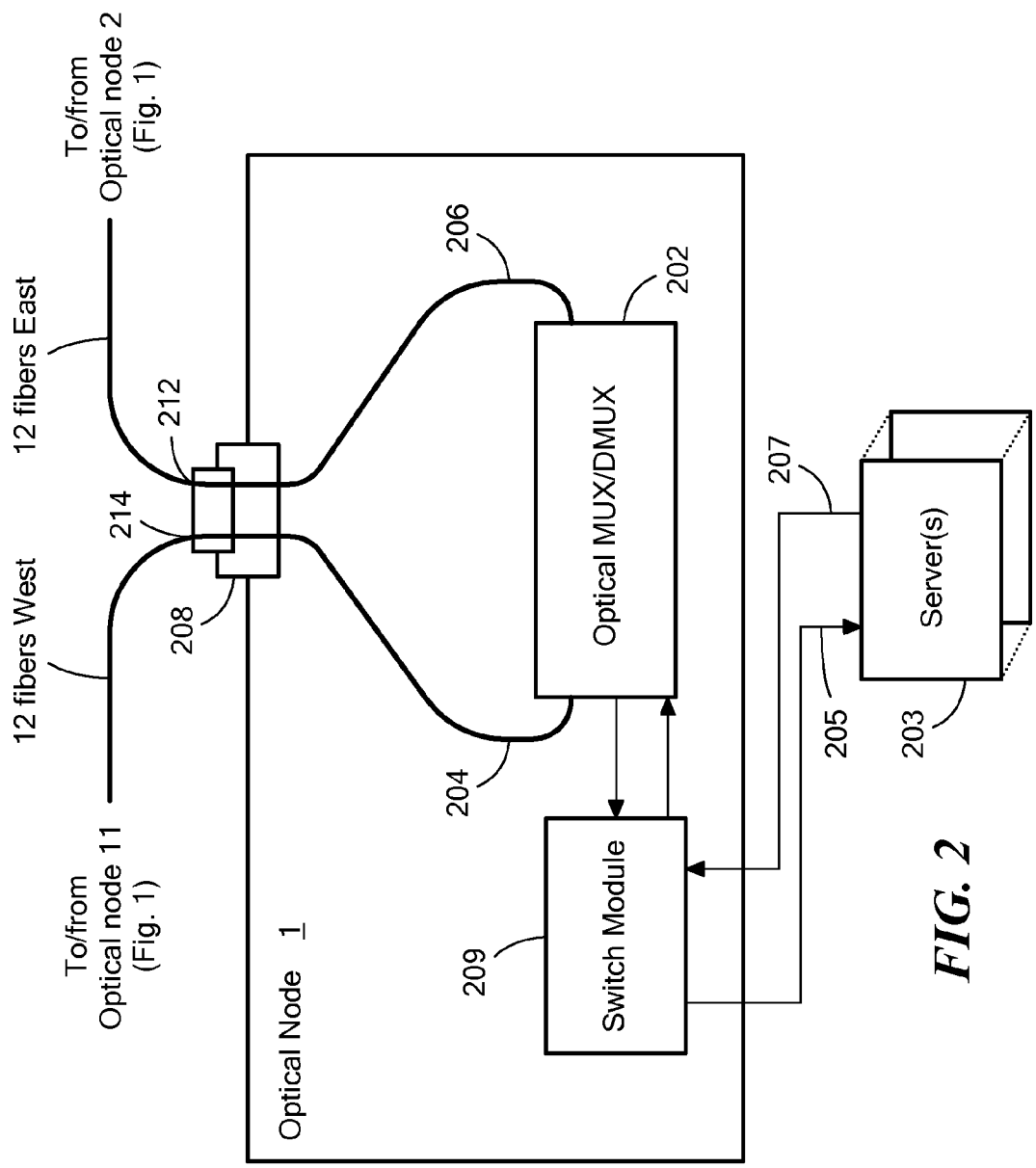
FIG. 2 is a block diagram of an exemplary optical node of degree-2 included in the optical ring network of FIG. 1.

FIG. 2 depicts an exemplary configuration of optical node 1 on the optical ring network 100 (see FIG. 1). It is noted that the other optical nodes 2-11 on the optical ring network 100 can have a configuration like that of optical node 1. As shown in FIG. 2, optical node 1 is an optical node of degree-2 that includes two paired optical ports 212, 214 referred to herein as the "East" port 212 and the "West" port 214. Optical node 1 also includes an optical MUX/DMUX module 202, a switch module 209, and an optical backplane with a twenty-four (24) fiber connector 208, such as an HBMT™ connector or any other suitable connector. Optical node 1 further includes a first bundle 206 of 12 optical fibers connected between the optical MUX/DMUX module 202 and the connector 208 in the East ("clockwise") direction along the optical ring network 100 (e.g., from optical node 1 toward optical node 2; see FIG. 1), and a second bundle 204 of 12 optical fibers connected between the optical MUX/DMUX module 202 and the connector 208 in the West ("counter clockwise") direction along the optical ring network 100 (e.g., from optical node 1 toward optical node 11; see FIG. 1). It is noted that such optical MUXs (multi-plexers) can include, but are not limited to, thin film filters, arrayed waveguide routers, fused biconic tapers, waveguides, and optical multiplexers with multi-port add capability. Further, such optical DMUXs (de-multiplexers) can include, but are not limited to, thin film filters, arrayed waveguide routers, fused biconic tapers, waveguides, and optical de-multiplexers with multi-port drop capability.

Using the optical MUX/DMUX module 202 included in optical node 1 (see FIG. 2), a plurality of wavelength channel numbers can be mapped into actual physical wavelength numbers based on a predetermined channel plan, such as an ITU (International Telecommunications Union) optical CWDM channel plan (see, e.g., Table I), or any other suitable channel plan. With reference to an exemplary ITU optical CWDM channel plan (see Table I), a total of eight (8) wavelength channels 1 through 8 can support a single product code for the optical MUX/DMUX module 202. It is noted that any other suitable number of wavelength channels can be employed to support any other suitable product code(s) for the optical MUX/DMUX module 202.

TABLE I

Channel Plan Mapped into ITU CWDM Wavelength

| Channel # | ITU CWDM (nm) |
|---|---|
| 1 | 1271 |
| 2 | 1291 |
| 3 | 1311 |
| 4 | 1331 |
| 5 | 1351 |

TABLE I-continued

Channel Plan Mapped into ITU CWDM Wavelength

| Channel # | ITU CWDM (nm) |
|---|---|
| 6 | 1371 |
| 7 | 1391 |
| 8 | 1411 |

As further shown in FIG. 2, the switch module 209 included in optical node 1 is coupled between the optical MUX/DMUX module 202 and the server(s) 203. Optical node 1 and the server(s) 203 can therefore be communicably coupled to one another by one or more bidirectional links 205, 207, each of which is operatively connected between the switch module 209 and the server(s) 203.

Figure 3A:
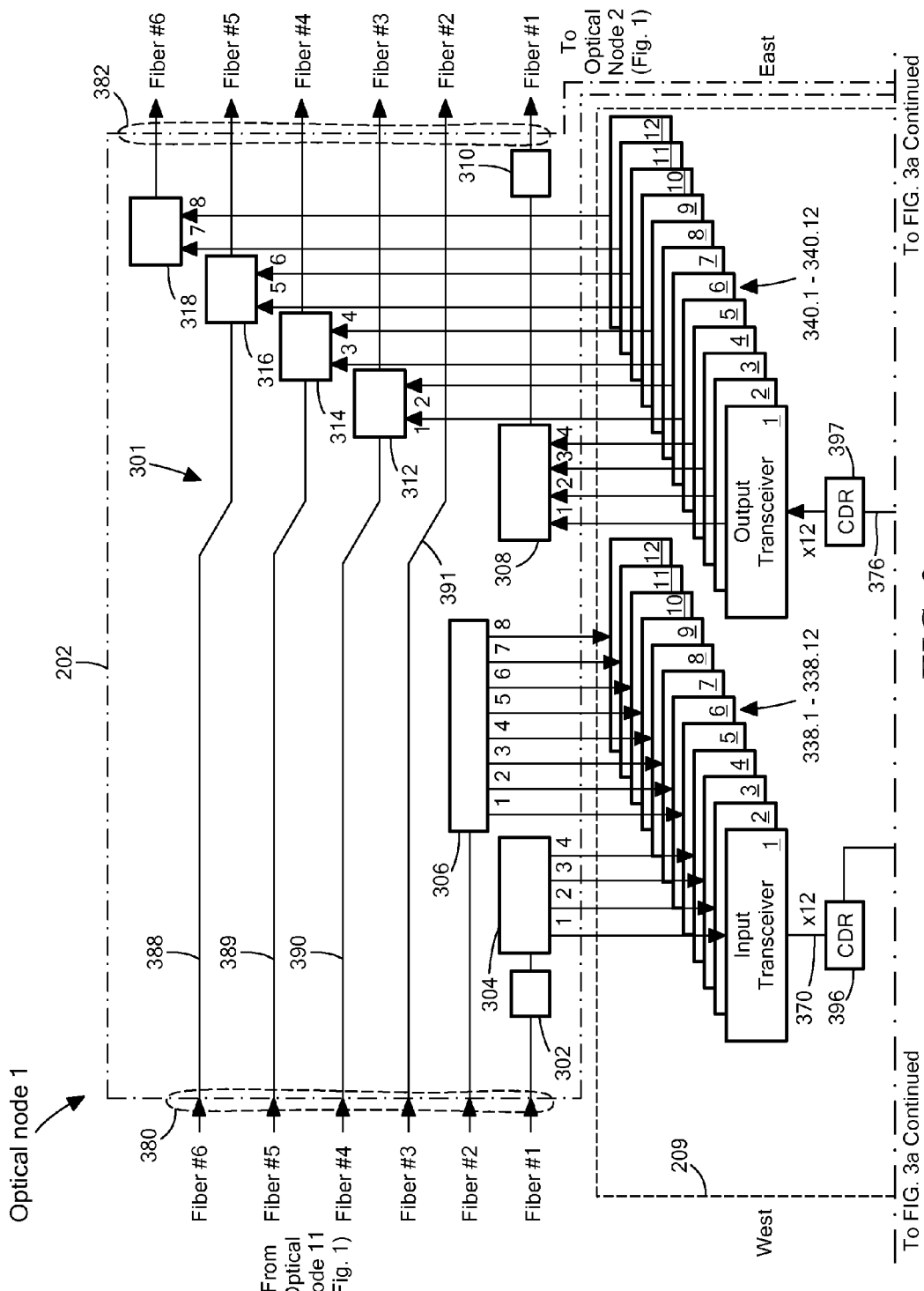
FIG. 3a is a schematic diagram of an exemplary switch module, and an exemplary optical MUX/DMUX module, included in the optical node of FIG. 2.
Figure 3A:
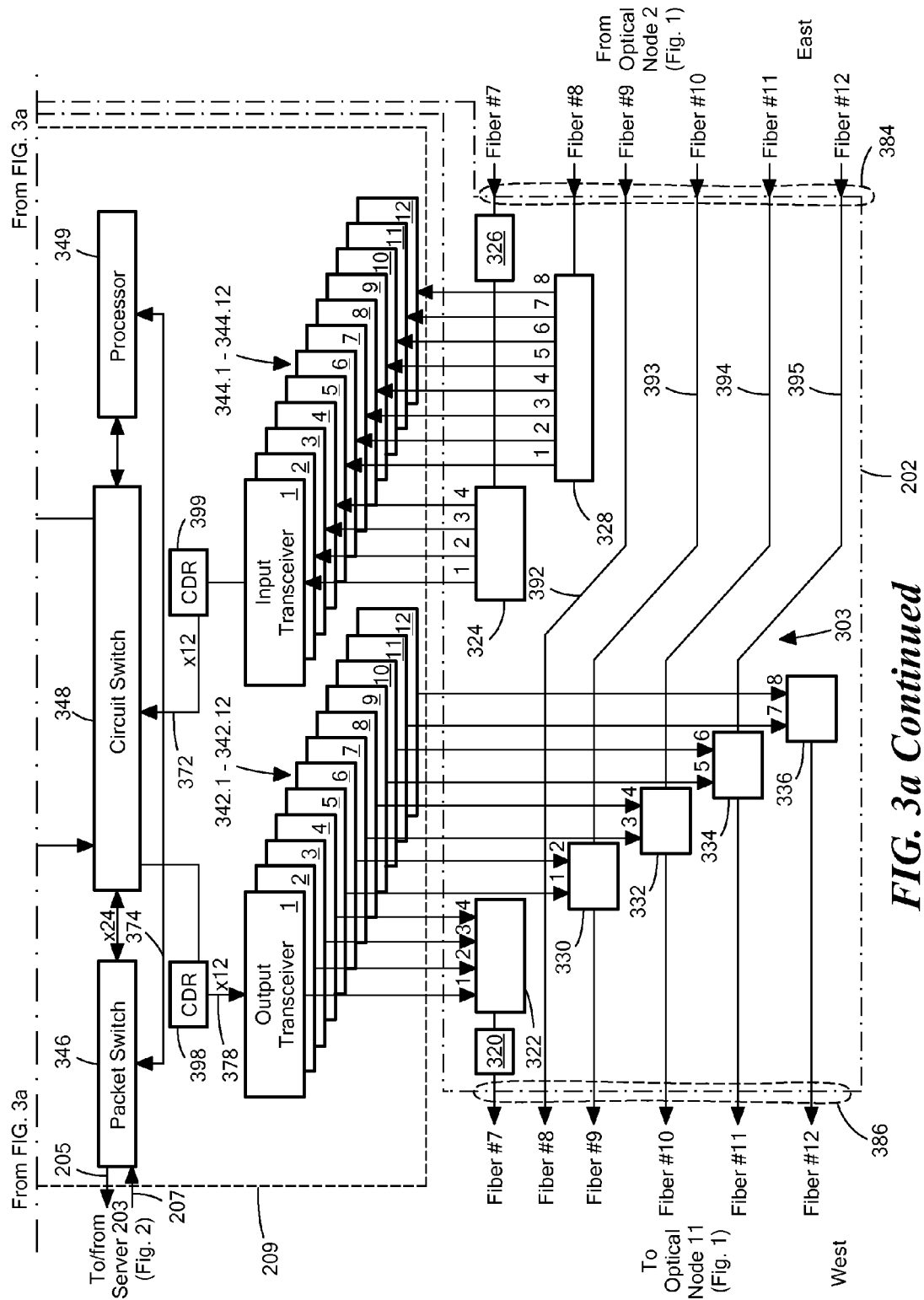

FIG. 3a depicts a detailed view of optical node 1, including the optical MUX/DMUX module 202 and the switch module 209. As shown in FIG. 3a, the optical MUX/DMUX module 202 includes a pair of optical filter configurations 301, 303 that can be used to implement a predetermined channel plan, such as the exemplary ITU optical CWDM channel plan of Table I, or any other suitable channel plan. As described herein, the optical filter configurations 301, 303 are configured to implement what is referred to herein as a hybrid SDM/WDM shifting channel plan. It is noted that the other optical nodes 2-11 on the optical ring network 100 (see FIG. 1) can include optical filter configurations like those of optical node 1. The optical filter configuration 301 includes a plurality of inputs (generally indicated by reference numeral 380) operatively connected to optical fibers #1 through #6 in the West (counter clockwise) direction along the optical ring network 100, and a plurality of outputs (generally indicated by reference numeral 382) operatively connected to optical fibers #1 through #6 in the East (clockwise) direction along the optical ring network 100. Likewise, the optical filter configuration 303 includes a plurality of inputs (generally indicated by reference numeral 384) operatively connected to optical fibers #7 through #12 in the East (clockwise) direction along the optical ring network 100, and a plurality of outputs (generally indicated by reference numeral 386) operatively connected to optical fibers #7 through #12 in the West (counter clockwise) direction along the optical ring network 100. The plurality of inputs 384 and the plurality of outputs 382 are included in the East port 212 (see FIG. 2) of optical node 1, and the plurality of inputs 380 and the plurality of outputs 386 are included in the West port 214 (see FIG. 2) of optical node 1. For example, optical fibers #1 through #12 can be implemented using one or more multi-fiber ribbon cables. It is noted that such multi-fiber ribbon cables are described herein as including twelve (12) optical fibers for purposes of illustration, and that any other suitable number of optical fibers within such multi-fiber ribbon cables may be employed.

With reference to optical node 1 (see FIG. 3a), the plurality of inputs 380 of the optical filter configuration 301 are operative to receive optical signals carried by the respective optical fibers #1-#6 from optical node 11 (see FIG. 1), and the plurality of outputs 382 of the optical filter configuration 301 are operative to send optical signals on the respective optical fibers #1-#6 to optical node 2 (see FIG. 1). In the East (clockwise) direction along the optical ring network 100 (see FIG. 1), optical node 1 is therefore communicably coupled to optical node 11 by the plurality of inputs 380, which are in a predetermined sequence corresponding to the fibers #1 through #6. Further, optical node 1 is communicably coupled, in the East (clockwise) direction along the optical ring network 100, to optical node 2 by the plurality of outputs 382, which are also in the predetermined sequence corresponding to the fibers #1 through #6. The optical filter configuration 301 further includes a plurality of optical connection paths disposed between the respective inputs and outputs 380, 382, such as optical connection paths 388, 389, 390, 391, which are configured to implement the predetermined SDM/WDM shifting channel plan.

For example, with reference to the optical filter configuration 301 (see FIG. 3a), each of the plurality of inputs 380, as well as each of the plurality of outputs 382, have specific positions in the predetermined sequence corresponding to optical fibers #1 through #6. To implement the predetermined SDM/WDM shifting channel plan, at least some of the plurality of optical connection paths are configured to communicably couple a respective input with a respective output, such that the specific positions of the respective input and the respective output differ by at least one position in the predetermined sequence. For example, the optical connection path 388 is configured to communicably couple the output that has a position in the predetermined sequence corresponding to the fiber #5 (on the East side), with the input that has a position in the predetermined sequence corresponding to the fiber #6 (on the West side). Further, the optical connection path 389 is configured to communicably couple the output that has a position in the predetermined sequence corresponding to the fiber #4 (on the East side) with the input that has a position in the predetermined sequence corresponding to the fiber #5 (on the West side). Moreover, the optical connection path 390 is configured to communicably couple the output that has a position in the predetermined sequence corresponding to the fiber #3 (on the East side) with the input that has a position in the predetermined sequence corresponding to the fiber #4 (on the West side). In addition, the optical connection path 391 is configured to communicably couple the output that has a position in the predetermined sequence corresponding to the fiber #2 (on the East side) with the input that has a position in the predetermined sequence corresponding to the fiber #3 (on the West side).

The plurality of inputs 384 of the optical filter configuration 303 (see FIG. 3a) are operative to receive optical signals carried by the respective optical fibers #7 through #12 from optical node 2 (see FIG. 1), and the plurality of outputs 386 of the optical filter configuration 303 (see FIG. 3a) are operative to send optical signals on the respective optical fibers #7 through #12 to optical node 11 (see FIG. 1). In the West (counter clockwise) direction along the optical ring network 100, optical node 1 is therefore communicably coupled to optical node 2 by the plurality of inputs 384, which are in a predetermined sequence corresponding to the fibers #7 through #12. Further, optical node 1 is communicably coupled, in the West (counter clockwise) direction along the optical ring network 100, to optical node 11 by the plurality of outputs 386, which are also in the predetermined sequence corresponding to the fibers #7 through #12. The optical filter configuration 303 further includes a plurality of optical connection paths disposed between the respective inputs 384 and the respective outputs 386, including optical connection paths 392, 393, 394, 395, which are also configured to implement the predetermined SDM/WDM shifting channel plan.

With reference to the optical filter configuration 303 (see FIG. 3a), each of the plurality of inputs 384, as well as each of the plurality of outputs 386, have specific positions in the predetermined sequence corresponding to optical fibers #7 through #12. To further implement the predetermined SDM/WDM shifting channel plan, at least some of the plurality of optical connection paths disposed between the respective inputs and outputs 384, 386 are configured to communicably couple a respective input with a respective output, such that the specific positions of the respective input and the respective output differ by at least one position in the predetermined sequence. For example, the optical connection path 392 is configured to communicably couple the output that has a position in the predetermined sequence corresponding to the fiber #8 (on the West side) with the input that has a position in the predetermined sequence corresponding to the fiber #9 (on the East side). Further, the optical connection path 393 is configured to communicably couple the output that has a position in the predetermined sequence corresponding to the fiber #9 (on the West side) with the input that has a position in the predetermined sequence corresponding to the fiber #10 (on the East side). Moreover, the optical connection path 394 is configured to communicably couple the output that has a position in the predetermined sequence corresponding to the fiber #10 (on the West side) with the input that has a position in the predetermined sequence corresponding to the fiber #11 (on the East side). In addition, the optical connection path 395 is configured to communicably couple the output that has a position in the predetermined sequence corresponding to the fiber #11 (on the West side) with the input that has a position in the predetermined sequence corresponding to the fiber #12 (on the East side).

As shown in FIG. 3a, the switch module 209 includes a packet switch 346, which can be implemented using electronic packet switch technology. For example, the packet switch 346 can be implemented as an Ethernet packet switch, an Internet protocol (IP) packet router, or any other suitable switch. The switch module 209 further includes a circuit switch 348 disposed between the packet switch 346 and the plurality of optical connection paths of the respective optical filter configurations 301, 303. For example, the circuit switch 348 can be implemented as a cross-bar switch, a cross-point switch, or any other suitable switch. The circuit switch 348 can receive, in electrical form, one or more signals sourced from one or more of the inputs 380, 384, and can provide one or more of the signals for subsequent forwarding as optical signals to one or more of the outputs 382, 386. Such optical signals can each be associated with a layer-1 (L1) lightpath extending at least partially through optical node 1. The switch module 209 further includes a processor 349 for local control and/or configuration of the packet switch 346 and/or the circuit switch 348. For example, the processor 349 can receive instructions for such control and/or configuration of the packet switch 346 and/or the circuit switch 348 from an external central processor over one or more optical supervisory control (OSC) channels (e.g., an OSC channel corresponding to an optical DMUX filter ("drop module") 302 and an optical MUX filter ("add module") 310, and/or an OSC channel corresponding to a drop module 326 and an add module 320; see FIG. 3a), which are discussed further below. The processor 349 can also be configured to receive such instructions via a network management port. The switch module 209 also includes a plurality of input transceivers 338.1-338.12 and a plurality of output transceivers 340.1-340.12 disposed between the circuit switch 348 and the optical filter configuration 301, as well as a plurality of input transceivers 344.1-344.12 and a plurality of output transceivers 342.1-342.12 disposed between the circuit switch 348 and the optical filter configuration 303. It is noted that clock and data recovery (CDR) may be implemented, as required and/or as desired, either as an integrated part of the circuit switch 348, or external to the circuit switch 348, such as at locations corresponding to CDR circuits 396, 397, 398, 399 (see FIG. 3a). As further shown in FIG. 3a, the optical filter configuration 301 includes a plurality of optical DMUX filters ("drop modules") 304, 306, and a plurality of optical MUX filters ("add modules") 308, 312, 314, 316, 318. The plurality of optical connection paths of the optical filter configuration 301, including the optical connection paths 388-391, can be configured to implement one or more wavelength channels, such as WDM wavelength channels. Moreover, each of the drop modules 304, 306 is operative to separate one or more optical signals, such as WDM wavelength channel signals allocated to one or more predetermined WDM wavelength channels, from an optical signal carried by a respective optical connection path within the optical filter configuration 301. In addition, each of the add modules 308, 312, 314, 316, 318 is operative to add one or more optical signals, such as WDM wavelength channel signals allocated to one or more predetermined WDM wavelength channels, to a respective optical connection path within the optical filter configuration 301.

Like the optical filter configuration 301, the optical filter configuration 303 includes a plurality of optical DMUX filters ("drop modules") 324, 328, and a plurality of optical MUX filters ("add modules") 320, 322, 330, 332, 334, 336. The plurality of optical connection paths of the optical filter configuration 303, including the optical connection paths 392-395, can be configured to implement one or more wavelength channels, such as WDM wavelength channels. Moreover, each of the drop modules 324, 328 is operative to separate one or more optical signals, such as WDM wavelength channel signals allocated to one or more predetermined WDM wavelength channels, from an optical signal carried by a respective optical connection path within the optical filter configuration 303. In addition, each of the add modules 320, 322, 330, 332, 334, 336 is operative to add one or more optical signals, such as WDM wavelength channel signals allocated to one or more predetermined WDM wavelength channels, to a respective optical connection path within the optical filter configuration 303.

The plurality of input transceivers 338.1-338.12 are operative to perform optical-to-electrical (O-E) conversion of the wavelength channel signals separated from the respective optical connection paths of the optical filter configuration 301, and the plurality of output transceivers 340.1-340.12 are operative to perform electrical-to-optical (E-O) conversion of the wavelength channel signals to be added to the optical connection paths of the optical filter configuration 301. Likewise, the plurality of input transceivers 344.1-344.12 are operative to perform optical-to-electrical (O-E) conversion of the wavelength channel signals separated from the respective optical connection paths of the optical filter configuration 303, and the plurality of output transceivers 342.1-342.12 are operative to perform electrical-to-optical (E-O) conversion of the wavelength channel signals to be added to the optical connection paths of the optical filter configuration 303. The circuit switch 348 is operative to receive, in electrical form from one or more of the input transceivers 338.1-338.12, 344.1-344.12 over connection paths 370 and/or connection paths 372, one or more wavelength channel signals separated from one or more of the optical connection paths within the optical filter configuration 301 and/or the optical filter configuration 303. The circuit switch 348 is further operative to selectively provide one or more of the wavelength channel signals to the packet switch 346 over connection paths 374, and/or to selectively provide, over connection paths 376 and/or connection paths 378, one or more of the wavelength channel signals to one or more of the output transceivers 340.1-340.12, 342.1-342.12. Such wavelength channel signals are, in turn, provided by the output transceivers 340.1-340.12, 342.1-342.12 in optical form to one or more of the add modules 308, 312, 314, 316, 318, 320, 322, 330, 332, 334, 336, for subsequent addition to one or more of the optical connection paths within the optical filter configuration 301 and/or the optical filter configuration 303. It is understood that the input transceivers, e.g., the input transceivers 338.1-338.12, 344.1-344.12, may be integrated into a single device. Likewise, the output transceivers, e.g., the output transceivers 340.1-340.12, 342.1-342.12, may be integrated into a single device.

Figure 3B:
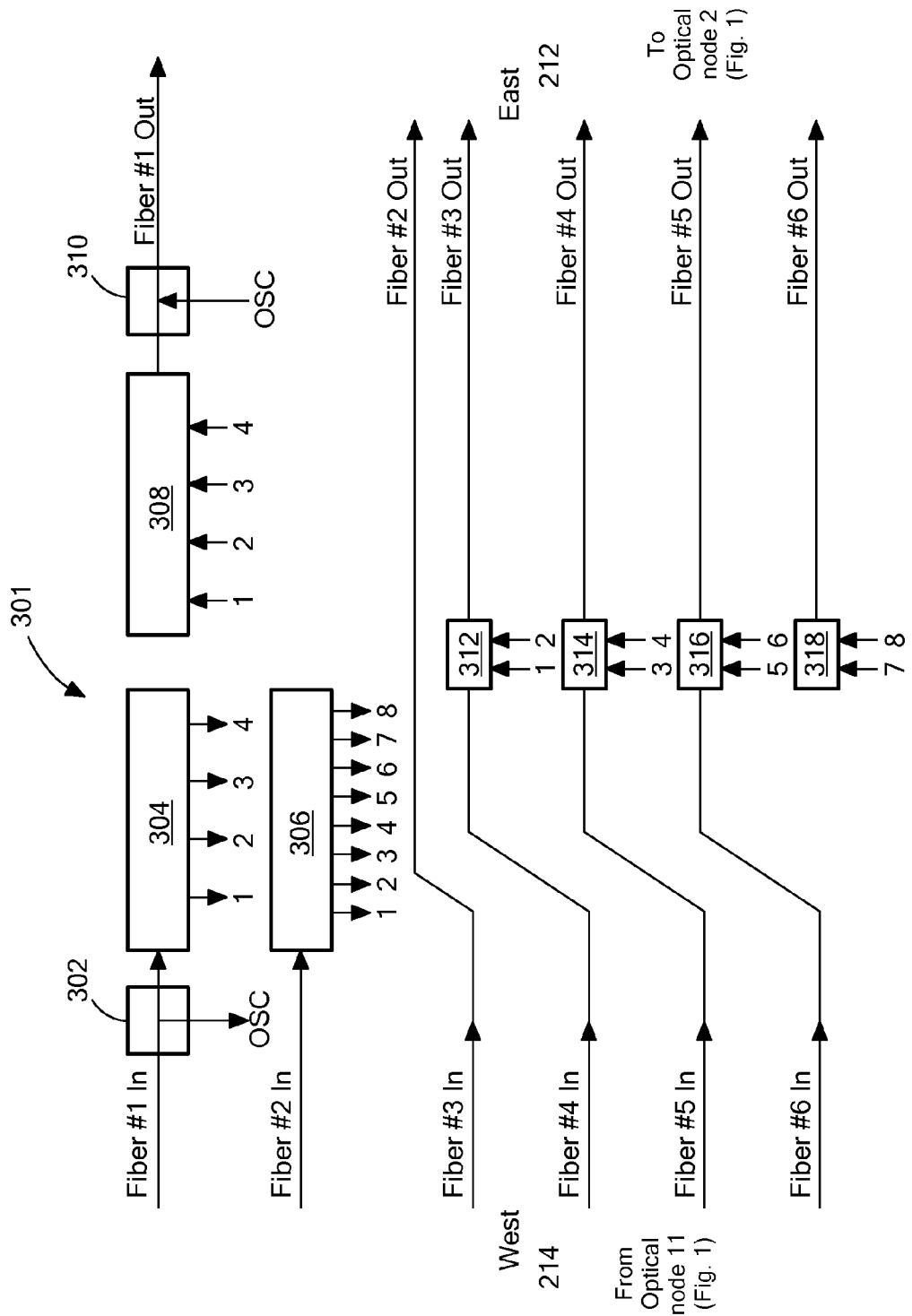
Figure 3C:
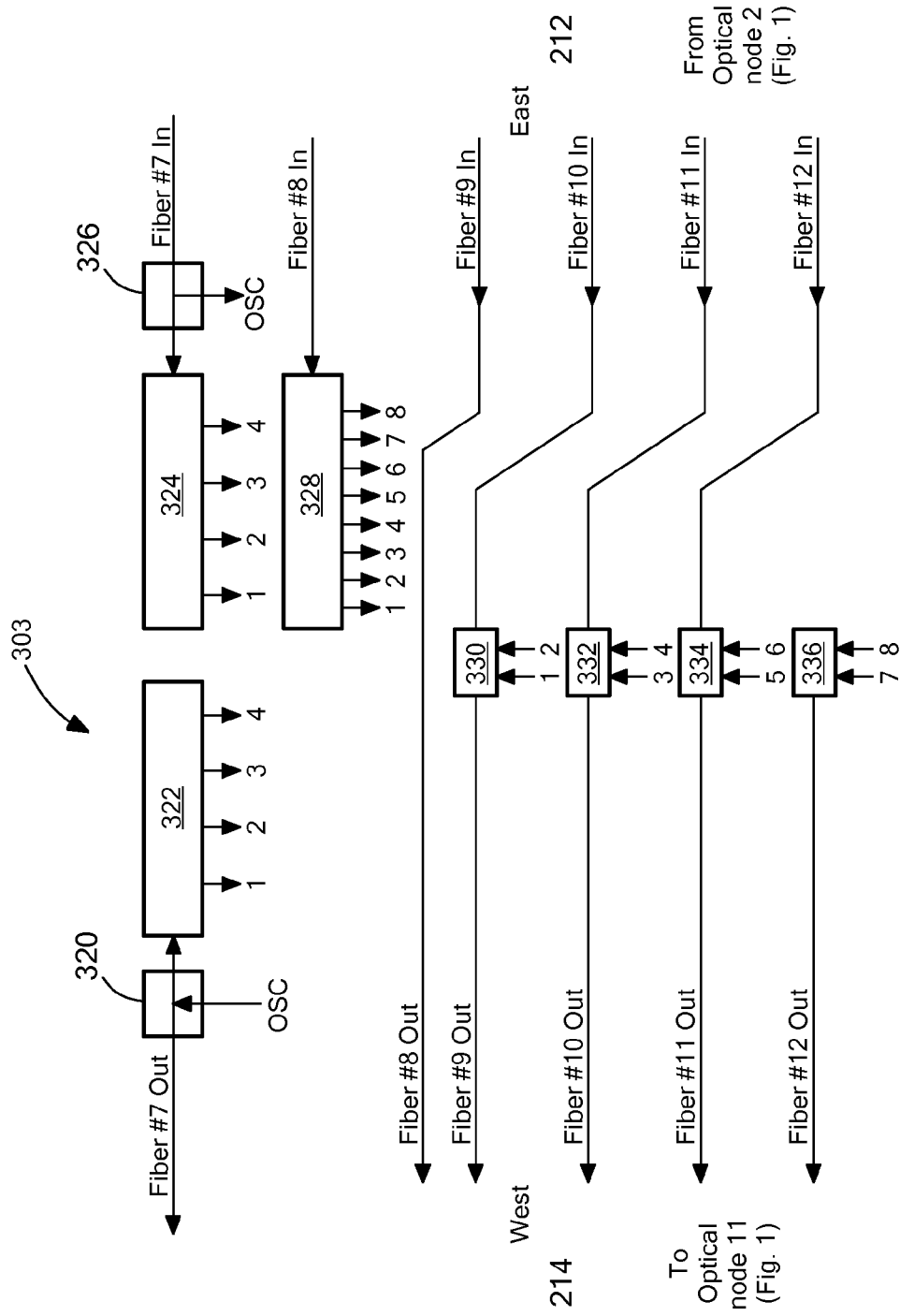

FIGS. 3b and 3c depict detailed views of the optical filter configurations 301, 303, respectively, included in the optical MUX/DMUX module 202 (see FIGS. 2, 3a). FIGS. 3b-3c depict how the twenty-four (24) single or multi-mode fibers (e.g., "fiber #1 (in)" through "fiber #12 (in)", and "fiber #1 (out)" through "fiber #12 (out)"; see FIGS. 3b, 3c) from one or more multi-fiber ribbon cables can be routed within the respective optical filter configurations 301, 303 for connection to the plurality of add modules 308, 312, 314, 316, 318, 320, 322, 330, 332, 334, 336, and the plurality of drop modules 304, 306, 324, 328. FIG. 3b depicts the optical filter configuration 301 for connecting optical node 1 between optical node 11 and optical node 2 on the optical ring network 100 (see FIG. 1) to allow optical signal transmission in the "West In"/"East Out" direction. FIG. 3c depicts the optical filter configuration 303 for connecting optical node 1 between optical node 11 and optical node 2 on the optical ring network 100 (see FIG. 1) to allow optical signal transmission in the "East In"/"West Out" direction.

More specifically, FIGS. 3b and 3c depict an SDM/WDM shifting channel plan that employs twelve (12) fibers between optical nodes, using eight (8) distinct wavelengths indicated by reference numerals 1, 2, 3, 4, 5, 6, 7, 8. Two chordal groups can be formed in the inbound direction on the West port 214 (see also FIG. 2), and two chordal groups can be formed in the outbound direction on the East port 212 (see also FIG. 2). For example, a first chordal group in the inbound direction on the West port 214 can include a single fiber, namely, fiber #1 (in) (see FIG. 3b), and a matching first chordal group in the outbound direction on the East port 212 can likewise include a single fiber, namely, fiber #1 (out) (see FIG. 3b). Further, a second chordal group in the inbound direction on the West port 214 can include five (5) fibers, namely, fiber #2 (in), fiber #3 (in), fiber #4 (in), fiber #5 (in), and fiber #6 (in) (see FIG. 3b), and a matching second chordal group in the outbound direction on the East port 212 can likewise include five (5) fibers, namely, fiber #2 (out), fiber #3 (out), fiber #4 (out), fiber #5 (out), and fiber #6 (out) (see FIG. 3b). Similarly, a first chordal group in the inbound direction on the East port 212 can include a single fiber, namely, fiber #7 (in) (see FIG. 3c), and a matching first chordal group in the outbound direction on the West port 214 can likewise include a single fiber, namely, fiber #7 (out) (see FIG. 3c). Further, a second chordal group in the inbound direction on the East port 212 can include five (5) fibers, namely, fiber #8 (in), fiber #9 (in), fiber #10 (in), fiber #11 (in), and fiber #12 (in) (see FIG. 3c), and a matching second chordal group in the outbound direction on the West port 214 can likewise include five (5) fibers, namely, fiber #8 (out), fiber #9 (out), fiber #10 (out), fiber #11 (out), and fiber #12 (out) (see FIG. 3c).

As shown in FIG. 3b, fiber #1 (in) can be used in conjunction with fiber #1 (out) to implement an optical supervisory control (OSC) channel corresponding to the drop module 302 and the add module 310. Fiber #1 (in) and fiber #1 (out) (see FIG. 3b) can also be used in conjunction with the drop module 304 (such as a 4-channel DMUX filter) and the add module 308 (such as a 4-channel MUX filter), respectively, to implement one (1) hop connection(s) for wavelength channels 1, 2, 3, 4 (see FIG. 3b).

Likewise, as shown in FIG. 3c, fiber #7 (in) can be used in conjunction with fiber #7 (out) to implement an OSC channel corresponding to the drop module 326 and the add module 320. Fiber #7 (in) and fiber #7 (out) (see FIG. 3c) can also be used in conjunction with the drop module 324 (such as a 4-channel DMUX filter) and the add module 322 (such as a 4-channel MUX filter), respectively, to implement the one (1) hop connection(s) for the wavelength channels 1, 2, 3, 4 (see FIG. 3c).

In addition, fiber #2 (in) (see FIG. 3b) can be used in conjunction with the drop module 306 (such as an 8-channel DMUX filter) to implement one (1) hop connection(s) for wavelength channels 1, 2, 3, 4, 5, 6, 7, 8, and fiber #8 (in) (see FIG. 3c) can be used in conjunction with the drop module 328 (such as an 8-channel DMUX filter) to implement the one (1) hop connection(s) for the wavelength channels 1, 2, 3, 4, 5, 6, 7, 8. The remaining fibers can be routed within the respective optical filter configurations 301, 303, as follows:

(1) fiber can be routed from position #3 (i.e., fiber #3 (in)) to position #2 (i.e., fiber #2 (out)) of the multi-fiber ribbon cable (see FIG. 3b);

(2) fiber can be routed from position #4 (i.e., fiber #4 (in)) to position #3 (i.e., fiber #3 (out)) of the multi-fiber ribbon cable through the add module 312 (such as a 2-channel MUX filter) for use with the wavelength channels 1, 2 (see FIG. 3b);

(3) fiber can be routed from position #5 (i.e., fiber #5 (in)) to position #4 (i.e., fiber #4 (out)) of the multi-fiber ribbon cable through the add module 314 (such as a 2-channel MUX filter) for use with the wavelength channels 3, 4 (see FIG. 3b);

(4) fiber can be routed from position #6 (i.e., fiber #6 (in)) to position #5 (i.e., fiber #5 (out)) of the multi-fiber ribbon cable through the add module 316 (such as a 2-channel MUX filter) for use with the wavelength channels 5, 6 (see FIG. 3b);

(5) fiber can be routed from position #6 (i.e., fiber #6 (out)) of the multi-fiber ribbon cable to the add module 318 (such as a 2-channel MUX filter) for use with the wavelength channels 7, 8 (see FIG. 3b);

(6) fiber can be routed from position #9 (i.e., fiber #9 (in)) to position #8 (i.e., fiber #8 (out)) of the multi-fiber ribbon cable (see FIG. 3c);

(7) fiber can be routed from position #10 (i.e., fiber #10 (in)) to position #9 (i.e., fiber #9 (out)) of the multi-fiber ribbon cable through the add module 330 (such as a 2-channel MUX filter) for use with the wavelength channels 1, 2 (see FIG. 3c);

(8) fiber can be routed from position #11 (i.e., fiber #11 (in)) to position #10 (i.e., fiber #10 (out)) of the multi-fiber ribbon cable through the add module 332 (such as a 2-channel MUX filter) for use with the wavelength channels 3, 4 (see FIG. 3c);

(9) fiber can be routed from position #12 (i.e., fiber #12 (in)) to position #11 (i.e., fiber #11 (out)) of the multi-fiber ribbon cable through the add module 334 (such as a 2-channel MUX filter) for use with the wavelength channels 5, 6 (see FIG. 3c); and

(10) fiber can be routed from position #12 (i.e., fiber #12 (out)) of the multi-fiber ribbon cable to the add module 336 (such as a 2-channel MUX filter) for use with the wavelength channels 7, 8 (see FIG. 3c).

With reference to the first chordal group including fiber #1 (in) on the West port 214 (see FIG. 3b), the matching first chordal group including fiber #1 (out) on the East port 212 (see FIG. 3b), and optical node 1 (see FIG. 4), the drop module 304 effectively drops the inbound connection of chord 404 (see FIG. 4) from optical node 11 on wavelengths 1, 2, 3, 4, and the drop module 302 drops the inbound connection of the optical supervisory channel (OSC). Further, the add module 308 adds the outbound connection of chord 402 destined for optical node 2 on wavelengths 1, 2, 3, 4, and the add module 310 adds the outbound connection of the optical supervisory channel (OSC). With reference to the second chordal group including fiber #2 (in), fiber #3 (in), fiber #4 (in), fiber #5 (in), and fiber #6 (in) on the West port 214 (see FIG. 3b), and the matching second chordal group including fiber #2 (out), fiber #3 (out), fiber #4 (out), fiber #5 (out), and fiber #6 (out) on the East port 212 (see FIG. 3b), the add module 318 adds wavelengths 7, 8 to fiber #6 (out), and the add module 316 adds wavelengths 5, 6 to fiber #5 (out) and all other wavelengths are routed from fiber #6 (in) to fiber #5 (out). Further, the add module 314 adds wavelengths 3, 4 to fiber #4 (out) and all other wavelengths are routed from fiber #5 (in) to fiber #4 (out), and the add module 312 adds wavelengths 1, 2 to fiber #3 (out) and all other wavelengths are routed from fiber #4 (in) to fiber #3 (out). Moreover, although no wavelengths are added to fiber #2 (out), all wavelengths are routed from fiber #3 (in) to fiber #2 (out). Fiber #2 (in) is terminated by the drop module 306, which drops wavelengths 1, 2, 3, 4, 5, 6, 7, 8.

With reference to the first chordal group including fiber #7 (in) on the East port 212 (see FIG. 3c), the matching first chordal group including fiber #7 (out) on the West port 214 (see FIG. 3c), and optical node 1 (see FIG. 4), the drop module 324 effectively drops the inbound connection of chord 402 (see FIG. 4) from optical node 2 on wavelengths 1, 2, 3, 4, and the drop module 326 drops the inbound connection of the optical supervisory channel (OSC). Further, the add module 322 adds the outbound connection of chord 404 destined for optical node 11 on wavelengths 1, 2, 3, 4, and the add module 320 adds the outbound connection of the optical supervisory channel (OSC). With reference to the second chordal group including fiber #8 (in), fiber #9 (in), fiber #10 (in), fiber #11 (in), and fiber #12 (in) on the East port 212 (see FIG. 3c), and the matching second chordal group including fiber #8 (out), fiber #9 (out), fiber #10 (out), fiber #11 (out), and fiber #12 (out) on the West port 214 (see FIG. 3c), the add module 336 adds wavelengths 7, 8 to fiber #12 (out), and the add module 334 adds wavelengths 5, 6 to fiber #11 (out) and all other wavelengths are routed from fiber #12 (in) to fiber #11 (out). Further, the add module 332 adds wavelengths 3, 4 to fiber #10 (out) and all other wavelengths are routed from fiber #11 (in) to fiber #10 (out), and the add module 330 adds wavelengths 1, 2 to fiber #9 (out) and all other wavelengths are routed from fiber #10 (in) to fiber #9 (out). Moreover, although no wavelengths are added to fiber #8 (out), all wavelengths are routed from fiber #9 (in) to fiber #8 (out). Fiber #8 (in) is terminated by the drop module 328, which drops wavelengths 1, 2, 3, 4, 5, 6, 7, 8.

It is noted that, in the optical filter configurations 301, 303, the respective MUX and DMUX filters can be implemented as active or passive components. It is further noted that fiber #1 (in) and the drop module 304 can be used in conjunction with fiber #1 (out) and the add module 308 to implement a connection path through at least the circuit switch 348 (see FIG. 3a) for the OSC channel corresponding to the drop module 302 and the add module 310. Similarly, fiber #7 (in) and the drop module 324 can be used in conjunction with fiber #7 (out) and the add module 322 to implement a connection path through at least the circuit switch 348 (see FIG. 3a) for the OSC channel corresponding to the drop module 326 and the add module 320. By implementing such connection paths for the OSC channels through the circuit switch 348, the OSC channels can be maintained as operational, even in the event of an optical node failure, by proper steering of signals on the respective OSC channels, by the circuit switch 348, to bypass the failed optical node.

FIG. 4 depicts the optical ring network 100 including optical nodes 1 through 11 (see also FIG. 1), illustrating the switching topology that can be obtained when the respective optical nodes are configured in accordance with optical node 1 (see FIG. 2), which includes the optical filter configurations 301, 303 (see FIGS. 3a, 3b, 3c). As shown in FIG. 4, the switching topology of the optical ring network 100 is a chordal ring. As described above with reference to optical node 1, each of optical nodes 1-11 can be connected to its neighboring optical node on the optical ring network 100 in the East (clockwise) and West (counter clockwise) directions using one or more multi-fiber ribbon cables. It is noted that FIG. 4 depicts the switching topology between optical node 1 and the respective optical nodes 2-11 only, for clarity of illustration. It should be understood, however, that the switching topology between each of optical nodes 2-11, and the remaining optical nodes on the optical ring network 100, can be like the switching topology illustrated in FIG. 4 for optical node 1. It is further noted that such multi-fiber ribbon cables are described herein as including twelve (12) optical fibers (e.g., fibers #1-#6, see FIG. 3b; and, fibers #7-#12, see FIG. 3c) for purposes of illustration, and that any other suitable number of optical fibers within such multi-fiber ribbon cables may be employed.

With reference to FIG. 4, a predetermined number of wavelengths, such as the eight (8) wavelengths 1, 2, 3, 4, 5, 6, 7, 8, can be employed, in which the respective wavelengths may correspond to WDM channels, CWDM channels, or DWDM channels. Further, each wavelength channel can provide a 10 Gb/s optical connection between respective optical nodes, or any other suitable optical connection. With reference to FIGS. 3b and 3c, four (4) wavelength channels, namely, the wavelength channels corresponding to wavelengths 1, 2, 3, 4, are provided for use between each optical node 1-11 and its neighboring optical node on the optical ring network 100 illustrated herein, and therefore a 40 Gb/s optical connection is provided between the neighboring optical nodes. For example, with regard to optical node 1, the wavelength channels corresponding to wavelengths 1, 2, 3, 4 separated by the drop module 324 from an optical signal received over fiber #7 (in) (see FIG. 3b), and added by the add module 308 to the optical signal provided for transmission over fiber #1 (out) (see FIG. 3b), can be employed to provide a 40 Gb/s optical connection 402 between optical node 1 and optical node 2 on fiber #1. Likewise, the wavelength channels corresponding to wavelengths 1, 2, 3, 4 separated by the drop module 304 from an optical signal received over fiber #1 (in) (see FIG. 3c), and added by the add module 322 to the optical signal provided for transmission over fiber #7 (out) (see FIG. 3c), can be employed to provide a 40 Gb/s optical connection 404 between optical node 1 and optical node 11 on fiber #7.

With further regard to optical node 1, a pair of wavelength channels, namely, the wavelength channels corresponding to wavelengths 1, 2 added by the add module 312 to the optical connection path 390 (see FIG. 3a) between fiber #4 (in) and fiber #3 (out) (see FIG. 3b), can be employed to provide a 20 Gb/s logical connection over a chord 406 between optical node 1 and optical node 3. Similarly, the pair of wavelength channels corresponding to wavelengths 1, 2 added by the add module 330 to the optical connection path 393 (see FIG. 3a) between fiber #10 (in) and fiber #9 (out) (see FIG. 3c) can be employed to provide a 20 Gb/s logical connection over chords 408 between optical node 1 and optical node 10. Likewise, a pair of wavelength channels, namely, the wavelength channels corresponding to wavelengths 3, 4 added by the add module 314 to the optical connection path 389 (see FIG. 3a) between fiber #5 (in) and fiber #4 (out) (see FIG. 3b), can be employed to provide a 20 Gb/s logical connection over chords 410 between optical node 1 and optical node 4. Similarly, the pair of wavelength channels corresponding to wavelengths 3, 4 added by the add module 332 to the optical connection path 394 (see FIG. 3a) between fiber #11 (in) and fiber #10 (out) (see FIG. 3c) can be employed to provide a 20 Gb/s logical connection over chords 412 between optical node 1 and optical node 9. Further, a pair of wavelength channels, namely, the wavelength channels corresponding to wavelengths 5, 6 added by the add module 316 to the optical connection path 388 (see FIG. 3a) between fiber #6 (in) and fiber #5 (out) (see FIG. 3b), can be employed to provide a 20 Gb/s logical connection over chords 414 between optical node 1 and optical node 5. Similarly, the pair of wavelength channels corresponding to wavelengths 5, 6 added by the add module 334 to the optical connection path 395 (see FIG. 3a) between fiber #12 (in) and fiber #11 (out) (see FIG. 3c) can be employed to provide a 20 Gb/s logical connection over chords 416 between optical node 1 and optical node 8. Moreover, a pair of wavelength channels, namely, the wavelength channels corresponding to wavelengths 7, 8 added by the add module 318 to an optical signal provided to fiber #6 (out) (see FIG. 3b), can be employed to provide a 20 Gb/s logical connection over chords 418 between optical node 1 and optical node 6. Similarly, the pair of wavelength channels corresponding to wavelengths 7, 8 added by the add module 336 to an optical signal provided to fiber #12 (out) (see FIG. 3b) can be employed to provide a 20 Gb/s logical connection over chords 420 between optical node 1 and optical node 7.

Because the optical filter configuration 301 (see FIG. 3b) is configured to communicably couple fibers #3-#6 (in) to fibers #2-#5 (out), respectively, selected pairs of the wavelength channels 1-8 can traverse the respective fibers through one or more of optical nodes 2-6 in the East (clockwise) direction along the optical ring network 100, until they reach fiber #2 (in) connected to the drop module 306 within the optical node to which a 20 Gb/s logical connection, or any other suitable logical connection, in the East direction from optical node 1 is desired. The drop module 306 can then provide the selected pairs of wavelength channels for ultimate receipt at the circuit switch 348 (see FIG. 3a) for subsequent processing. Likewise, because the optical filter configuration 303 (see FIG. 3c) is configured to communicably couple fibers #9-#12 (in) with fibers #8-#11 (out), respectively, selected pairs of the wavelength channels 1-8 can traverse the respective fibers through one or more of optical nodes 7-11 in the West (counter clockwise) direction along the optical ring network 100, until they reach fiber #8 (in) connected to the drop module 328 within the optical node to which a 20 Gb/s logical connection, or any other suitable logical connection, in the West direction from optical node 1 is desired. The drop module 328 can then provide the selected pairs of wavelength channels for ultimate receipt at the circuit switch 348 (see FIG. 3a) for subsequent forwarding. It should be understood that such logical connections in the East/West directions from each of optical nodes 2-11 on the optical ring network 100 can be established in an analogous fashion.

It is noted that the SDM/WDM shifting channel plan illustrated in FIGS. 3b-3c allows the same wavelength w to be reused multiple times in a chordal group so long as each time after it is added onto an output fiber k of an output chordal group, the wavelength is extracted from the matching input chordal group on an equal or lower numbered input fiber j before being added again within the same output chordal group on an output fiber m<k. If a wavelength w is added on the output fiber k and next dropped on the input fiber j≤k, and if optical nodes implementing identical channel plans are cabled in a path or ring of sufficient length, then w will carry an optical connection that optically bypasses k−j optical nodes, producing a chord of length k−j+1. For example, with reference to FIG. 3b, wavelengths 7, 8 are added to fiber #6 (out), which is the fifth fiber of the outbound chordal group including fiber #2 (out), fiber #3 (out), fiber #4 (out), fiber #5 (out), and fiber #6 (out). Wavelengths 7, 8 are dropped on fiber #2 (in), which is the first fiber of the matching inbound chordal group including fiber #2 (in), fiber #3 (in), fiber #4 (in), fiber #5 (in), and fiber #6 (in). Accordingly, if optical nodes implementing an identical channel plan are connected in a path or ring of sufficient length, then wavelengths 7, 8 can carry an optical connection that optically bypasses four other optical nodes, producing a chord of length 5.

It is further noted that a chordal ring network with N optical nodes, numbered n=0, 1, 2, . . . N−1, can have chords of lengths $r_1, r_2, \ldots r_C$, such that each optical node n is connected to its neighboring optical nodes $n+r_c$ (mod N) and $n-r_c$ (mod N) with a multiplicity of $s_c \geq 1$ chords (c=1 . . . C), each chord representing an uplink. The switching topology for such a chordal ring network can be denoted as $R_N(r_1^{s_1}; r_2^{s_2}; r_3^{s_3}; \ldots; r_C^{s_C})$. The SDM/WDM shifting channel plan illustrated in FIGS. 3b-3c can be used to implement a switching topology denoted as $R_{11}(1^4; 2^2; 3^2; 4^2; 5^{2;})$. In general, an SDM/WDM shifting channel plan in accordance with FIGS. 3b-3c can implement a switching topology denoted as $R_N(1^4; 2^2; 3^2; 4^2; 5^2;)$ for any N, in which, for N<6, some or all of the chords may terminate or pass through their source optical nodes, and, for N>11, a regular chordal ring can be created that is not full mesh.

FIG. 5 depicts an illustrative embodiment of an exemplary optical chordal ring network 500 that includes a plurality of optical nodes 1 through 20, each configured in accordance with optical node 1 (see FIGS. 2, 3a, 3b, 3c). Each of optical nodes 1-20 can be connected to its neighboring optical node on the optical chordal ring network 500 (see FIG. 5) in the East (clockwise) and West (counter clockwise) directions using one or more multi-fiber ribbon cables. It is noted that FIG. 5 depicts the switching topology between optical node 1 and the respective optical nodes 2-6 and 16-20 only, for clarity of illustration. It should be understood, however, that the switching topology between each of optical nodes 2-20, and the remaining optical nodes on the optical chordal ring network 500, can be like the switching topology illustrated in FIG. 5 for optical node 1.

With reference to FIG. 5, a predetermined number of wavelengths, such as the eight (8) wavelengths 1, 2, 3, 4, 5, 6, 7, 8, can be employed, in which the respective wavelengths may correspond to WDM channels, CWDM channels, or DWDM channels. Further, each wavelength channel can provide a 10 Gb/s optical connection between respective optical nodes, or any other suitable optical connection. Four (4) wavelength channels, namely, the wavelength channels corresponding to wavelengths 1, 2, 3, 4, are provided for use between each optical node 1-20 and its neighboring optical node on the optical chordal ring network 500, and therefore a 40 Gb/s optical connection is provided between the neighboring optical nodes. For example, with regard to optical node 1, the wavelength channels corresponding to wavelengths 1, 2, 3, 4 can be employed to provide a 40 Gb/s optical connection 502 between optical node 1 and optical node 2, and a 40 Gb/s optical connection 504 between optical node 1 and optical node 20. With further regard to optical node 1, two (2) wavelength channels, namely, wavelength channels corresponding to wavelengths 1, 2, can be employed to provide a 20 Gb/s logical connection over chords 506 between optical node 1 and optical node 3, and a 20 Gb/s logical connection over chords 508 between optical node 1 and optical node 19; two (2) wavelength channels, namely, wavelength channels corresponding to wavelengths 3, 4, can be employed to provide a 20 Gb/s logical connection over chords 510 between optical node 1 and optical node 4, and a 20 Gb/s logical connection over chords 512 between optical node 1 and optical node 18; two (2) wavelength channels, namely, wavelength channels corresponding to wavelengths 5, 6, can be employed to provide a 20 Gb/s logical connection over chords 514 between optical node 1 and optical node 5, and a 20 Gb/s logical connection over chords 516 between optical node 1 and optical node 17; and, two (2) wavelength channels, namely, wavelength channels corresponding to wavelengths 7, 8, can be employed to provide a 20 Gb/s logical connection over chords 518 between optical node 1 and optical node 6, and a 20 Gb/s logical connection over chords 520 between optical node 1 and optical node 16.

Figure 6:
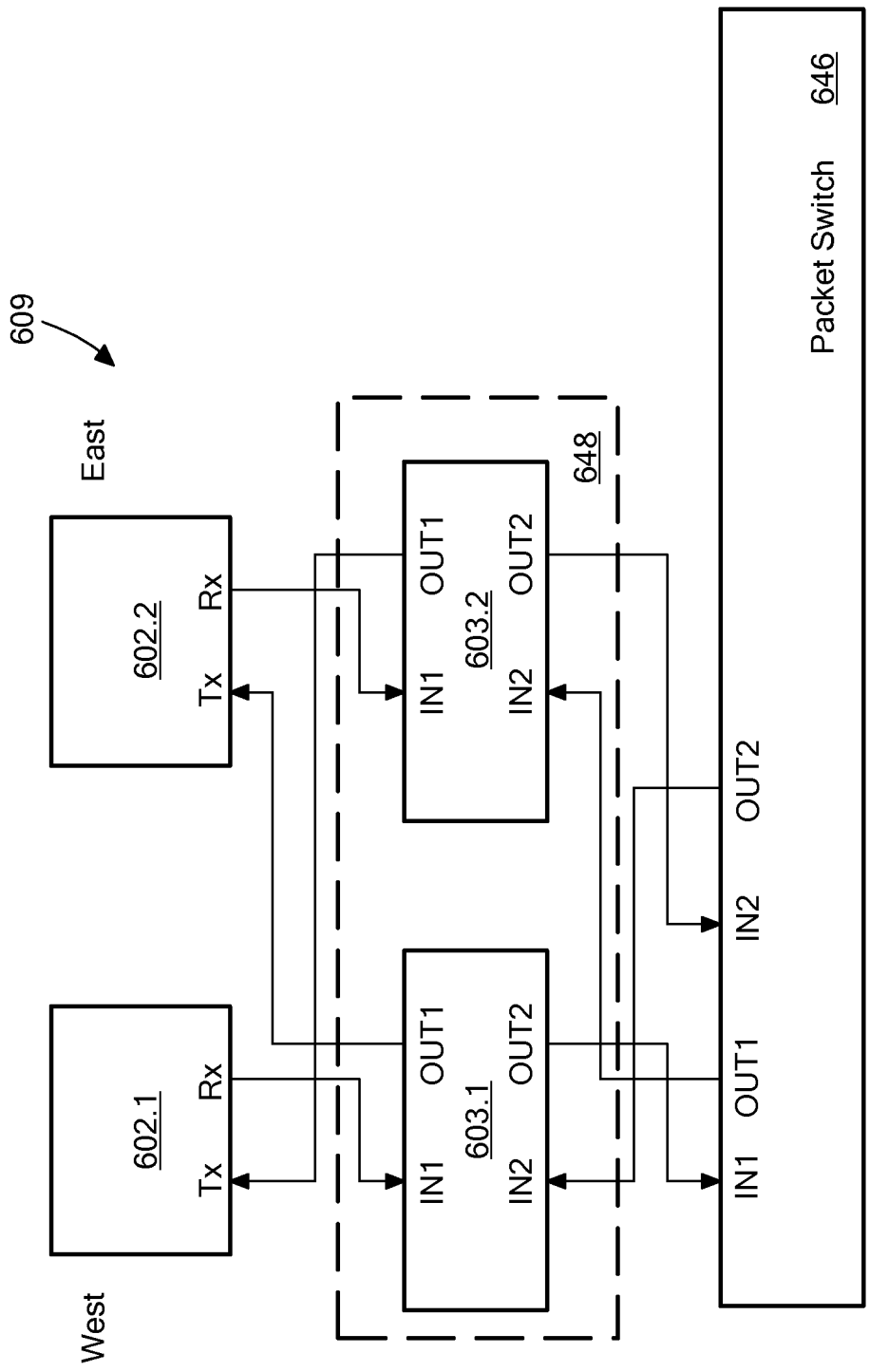

FIG. 6 depicts an exemplary simplified switch module 609 that can be used to illustrate how an optical node, such as optical node 1 (see FIGS. 2, 3a), can be configured to support low latency multicast and/or broadcast data channels. As shown in FIG. 6, the switch module 609 includes a packet switch 646, a plurality of input/output transceivers 602.1-602.2, and circuit switches 648 disposed between the packet switch 646 and the plurality of input/output transceivers 602.1-602.2. For example, the input/output transceiver 602.1 (such as an XFP or SFP+ transceiver) can be communicably connected to one or more optical connection paths in the West (counter clockwise) direction along an optical ring network. Further, the input/output transceiver 602.2 (such as an XFP or SFP+ transceiver) can be communicably connected to one or more optical connection paths in the East (clockwise) direction along the optical ring network. The circuit switches 648 include a pair of circuit switches 603.1, 603.2. It is noted that clock and data recovery (CDR) may be implemented, as required and/or as desired, either as an integrated part of the circuit switches 603.1, 603.2, or externally.

With reference to FIG. 6, the circuit switches 603.1, 603.2 are each configured with integrated CDR capability. As shown in FIG. 6, a "receive" (Rx) output of the input/output transceiver 602.1 is connected to an IN1 input of the circuit switch 603.1, and an Rx output of the input/output transceiver 602.2 is connected to an IN1 input of the circuit switch 603.2. Further, an OUT1 output of the circuit switch 603.1 is connected to a "transmit" (Tx) input of the input/output transceiver 602.2, and an OUT1 output of the circuit switch 603.2 is connected to a Tx input of the input/output transceiver 602.1. Moreover, an OUT2 output of the circuit switch 603.1 is connected to an IN1 input of the packet switch 646, and an OUT2 output of the circuit switch 603.2 is connected to an IN2 input of the packet switch 646. In addition, an OUT1 output of the packet switch 646 is connected to an IN2 input of the circuit switch 603.2, and an OUT2 output of the packet switch 646 is connected to an IN2 input of the circuit switch 603.1.

To receive an optical signal on a broadcast data channel from the West direction along an optical ring network, the input/output transceiver 602.1 can receive the optical signal, convert the optical signal to electrical form, and send the electrical signal through its Rx output to the IN1 input of the circuit switch 603.1. The circuit switch 603.1, in turn, can send the electrical signal through its OUT2 output to the IN1 input of the packet switch 646, and through its OUT1 output to the Tx input of the input/output transceiver 602.2. The input/output transceiver 602.2 can then convert the electrical signal back to optical form, and relay the optical signal to a downstream node, in the East (clockwise) direction along the optical ring network, with low latency.

Similarly, to receive an optical signal on a broadcast data channel from the East direction along an optical ring network, the input/output transceiver 602.2 can receive the optical signal, convert the optical signal to electrical form, and send the electrical signal through its Rx output to the IN1 input of the circuit switch 603.2. The circuit switch 603.2, in turn, can send the electrical signal through its OUT2 output to the IN2 input of the packet switch 646, and through its OUT1 output to the Tx input of the input/output transceiver 602.1. The input/output transceiver 602.1 can then convert the electrical signal back to optical form, and relay the optical signal to a downstream node, in the West (counter clockwise) direction along the optical ring network, with low latency.

To receive an optical signal on a multicast data channel from the West direction along an optical ring network, the input/output transceiver 602.1 can receive the optical signal, convert the optical signal to electrical form, and send the electrical signal through its Rx output to the IN1 input of the circuit switch 603.1. The circuit switch 603.1, in turn, can send the electrical signal through its OUT2 output to the IN1 input of the packet switch 646, as required to achieve the desired multicast functionality. The circuit switch 603.1 can also send the electrical signal through its OUT1 output to the Tx input of the input/output transceiver 602.2. The input/output transceiver 602.2 can then convert the electrical signal back to optical form, and relay the optical signal to a downstream node, in the East (clockwise) direction along the optical ring network, with low latency. It is noted that the switch module 609 can be employed to receive an optical signal on a multicast data channel from the East direction along the optical ring network in an analogous fashion.

It is further noted that low latency multicast/broadcast functionality can be crucial in certain applications/services, such as medical applications and financial services applications. Such low latency multicast/broadcast functionality can be achieved by configuring circuit switches of a plurality of optical nodes to establish a single duplex connection from a source or origin Ethernet switch to a primary destination Ethernet switch or the source Ethernet switch itself, using a plurality of the source Ethernet switch's uplink ports and simplex connections from the same source Ethernet switch and uplink ports to a plurality of secondary Ethernet switches uplink ports, with one or more circuit switches establishing a simplex multicast or broadcast connection from one or more of its input ports to a plurality of its output ports, thereby enabling data multicasting and broadcasting from a server or servers connected to the source Ethernet switch to a plurality of servers connected to the same Ethernet switch and/or different Ethernet switches. In one embodiment, transmitting uplink ports on the secondary set of destination Ethernet switches are muted. In another embodiment, the transmitting uplink ports on the secondary set of destination Ethernet switches are not muted, but data transmission is disabled by the circuit switches connected to the secondary transmitting uplink ports. In a further embodiment, the transmitting uplink ports on one or more of the secondary Ethernet switches are enabled and employed in separate multicast or broadcast communications. The plurality of optical nodes can be communicably coupled on an optical ring network, such that one of the destination Ethernet switches is the source Ethernet switch, and an outbound signal from an uplink of the source Ethernet switch is routed through the network, for example, by routing the outbound signal around the ring so that it connects back on the source Ethernet switch to establish the duplex connection. For example, in a physical ring network, a duplex connection can be established from the source Ethernet switch uplink port to itself (using the circuit switch), and the outbound signal can be dropped at a plurality of intermediate Ethernet switches to establish multicast or broadcast simplex communications from the source Ethernet switch to the destination Ethernet switches.

Figure 7A:
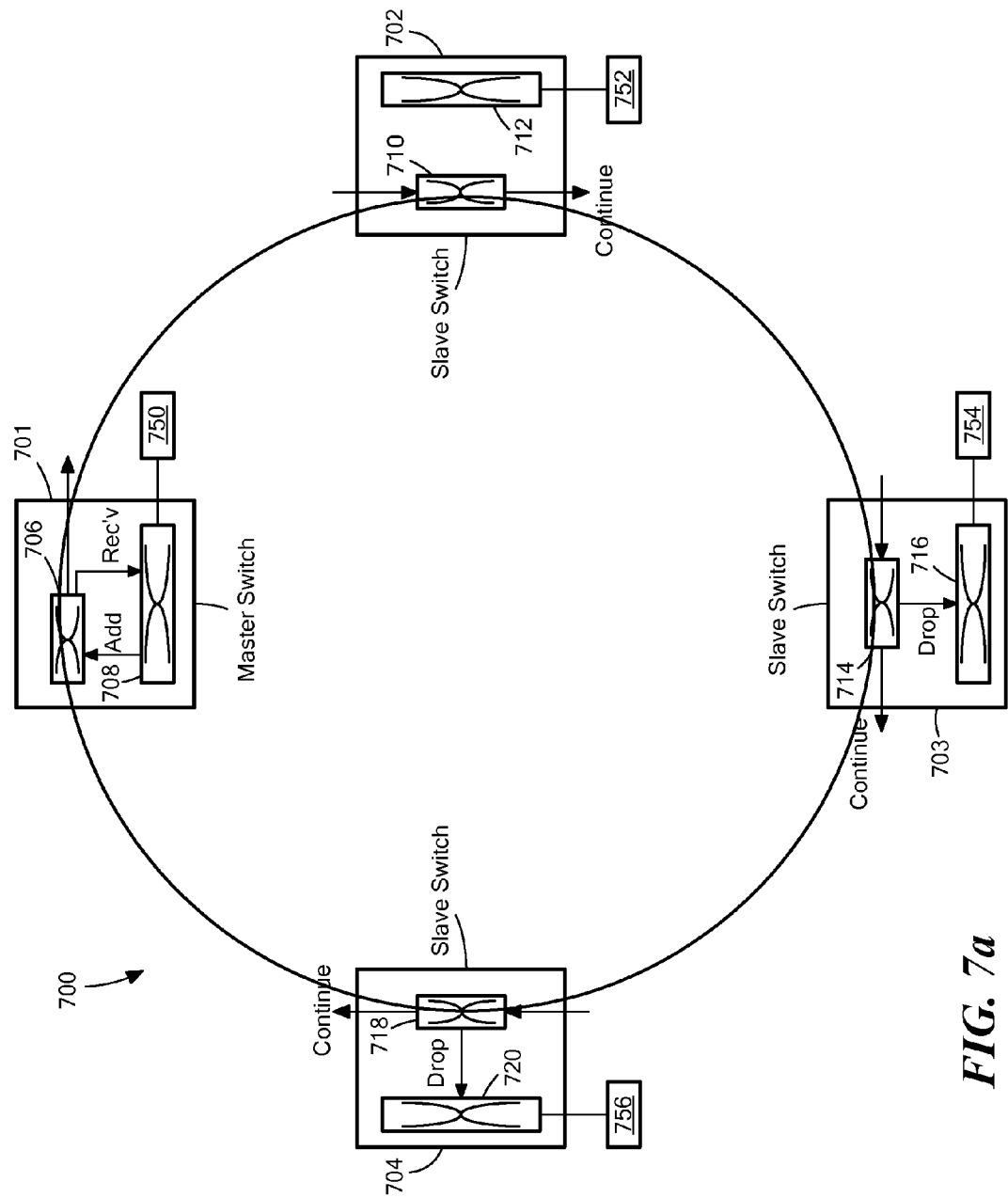
FIG. 7a is a block diagram of an exemplary optical ring network, including a plurality of optical nodes configured to support a low latency multicast data channel on the optical ring network.

FIG. 7a depicts an exemplary optical ring network 700, including a plurality of optical nodes 701, 702, 703, 704 configured to support a low latency multicast data channel on the optical ring network 700. As shown in FIG. 7a, optical node 701 includes a circuit switch 706 and a packet switch 708, optical node 702 includes a circuit switch 710 and a packet switch 712, optical node 703 includes a circuit switch 714 and a packet switch 716, and optical node 704 includes a circuit switch 718 and a packet switch 720. For example, each of the circuit switches 706, 710, 714, 718 can operate in accordance with the exemplary functionality of the circuit switches 648 (see FIG. 6), and therefore the circuit switches 706, 710, 714, 718 can each be configured with integrated CDR capability. Further, each of the packet switches 708, 712, 716, 720 can operate in accordance with the exemplary functionality of the packet switch 646 (see FIG. 6). With reference to FIG. 7a, one of the optical nodes, such as optical node 701, can be designated as a multicast master node, and some or all of the remaining optical nodes, such as optical nodes 702, 703, 704, can each be designated as a slave node. To achieve the desired low latency multicast/broadcast functionality, one or more of the designated slave nodes (e.g., optical nodes 702, 703, and/or 704) can be communicably coupled to the designated multicast master node (e.g., optical node 701). In addition, optical (multicast master) node 701 and optical (slave) nodes 702, 703, 704 are communicably coupled to external computerized devices 750, 752, 754, 756, respectively. Some of the external computerized devices, such as the external computerized devices 754, 756, can each be designated as a multicast/broadcast subscriber.

The multicast master node, such as optical node 701, can be configured to include a loopback interface to assure that there is always at least one active interface, and that link has been established on the multicast master node. More specifically, in order for a transmitter port of the optical (multicast master) node 701 to be able to transmit in an Ethernet switched network, link must first be established. The term "link" in this context means that the receive side of the port is receiving valid information from the transmitter, and the requirements of the physical (phy) level are met. The transmitter may be on the multicast master (e.g., in loopback) or any other paired port. If another paired port is used to establish link with the multicast master, then that port must also establish link by having valid data transmitted to its receiver required to establish link. For example, this data may correspond to the output of the multicast master.

It is noted that the data from the multicast master is unidirectional in nature. If a port other than a port on the multicast master is used to establish link with the multicast master port, then this does not imply that there cannot be bidirectional traffic between the multicast master and the other port. In this case, all other receivers will be only receiving the data, and not participating in bidirectional communication. It is further noted that the data received at the multicast master is primarily used to establish link, but this does not preclude other uses.

In a static configuration (e.g., standard Ethernet protocol), for example, spanning tree protocol could be disabled on multicast master ports, and any bridge loops would have to be prevented. The forwarding table of the packet switch hosting the multicast master may be populated with destination MAC addresses, source MAC addresses, incoming port information, VLAN information, multicast addresses, or any other suitable information, which are to be forwarded to the multicast master port, typically using a command line interface (CLI). These destination MAC addresses may be unicast, multicast, or broadcast. On the packet switch(es) hosting the receiver port, the receiver port is physically connected to the multicast master. The forwarding table, on the receiving packet switch, may be populated with destination MAC addresses, source MAC addresses, incoming port information, VLAN information, multicast addresses, or any other suitable information, for forwarding the received Ethernet frames to any, many, or all of the other ports on the packet switch. It is noted that the Ethernet frames include packet header fields that can be used to generate an output port mapping. In one embodiment, the packet switch 708 on the multicast master corresponds to the transmitter, and the packet switches 712, 716, 720, configured by the circuit switches 710, 714, 718, respectively, correspond to the receivers. Further, the circuit switch 706 on the multicast master is configured to loopback to the receiver port of the multicast master to establish link.

Accordingly, to achieve a low latency multicast data channel on the optical ring network 700 (see FIG. 7a), the packet switch 708 included in optical (multicast master) node 701 can provide one or more signals, in electrical form, to the circuit switch 706 within optical (multicast master) node 701, for subsequent conversion to optical form and addition to the multicast data channel. Optical (multicast master) node 701 can then send the signals on the multicast data channel in the East (clockwise) direction along the optical ring network 700, allowing the signals to be received at the circuit switch 710 included in optical (slave) node 702. Because, in this example, the external computerized device 752 coupled to optical (slave) node 702 is not a multicast subscriber, optical (slave) node 702 can be regarded as not being an intended recipient of the signals. Optical (slave) node 702 forwards the signals, with low latency, on the multicast data channel in the East (clockwise) direction for receipt at the circuit switch 714 included in optical (slave) node 703, and blocks the signals from reaching the packet switch 712. Because, in this example, the external computerized device 754 coupled to optical (slave) node 703 is a multicast subscriber, optical (slave) node 703 can be regarded as an intended recipient of the signals. The circuit switch 714 provides the signals, separated from the multicast data channel, to the packet switch 716 within optical (slave) node 703 for subsequent forwarding to the external computerized (subscriber) device 754. Optical (slave) node 703 also forwards the signals, with low latency, on the multicast data channel in the East (clockwise) direction for receipt at the circuit switch 718 included in optical (slave) node 704. Because, in this example, the external computerized device 756 coupled to optical (slave) node 704 is also a multicast subscriber, optical (slave) node 704 can likewise be regarded as an intended recipient of the signals. The circuit switch 718 provides the signals, separated from the multicast data channel, to the packet switch 720 within optical (slave) node 704 for subsequent forwarding to the external computerized (subscriber) device 756. Optical (slave) node 704 then forwards the signals, with low latency, on the multicast data channel in the East (clockwise) direction for receipt at the circuit switch 706 included in optical (multicast master) node 701. It is noted that optical (slave) nodes 702, 703, 704 can each forward the optical signals on the multicast data channel to a downstream node on the optical ring network 700, without first requiring the signals to pass through the packet switch included in the respective optical node. For example, following optical-to-electrical (O-E) conversion of the optical signals, optical (slave) nodes 702, 703, 704 can prevent the electrical signals from reaching the packet switches 712, 716, 720, respectively. It is further noted that the plurality of optical nodes 701, 702, 703, 704 can be configured to support such a low latency multicast data channel for sending optical signals in the West (counter clockwise) direction along the optical ring network 700.

Figure 7B:
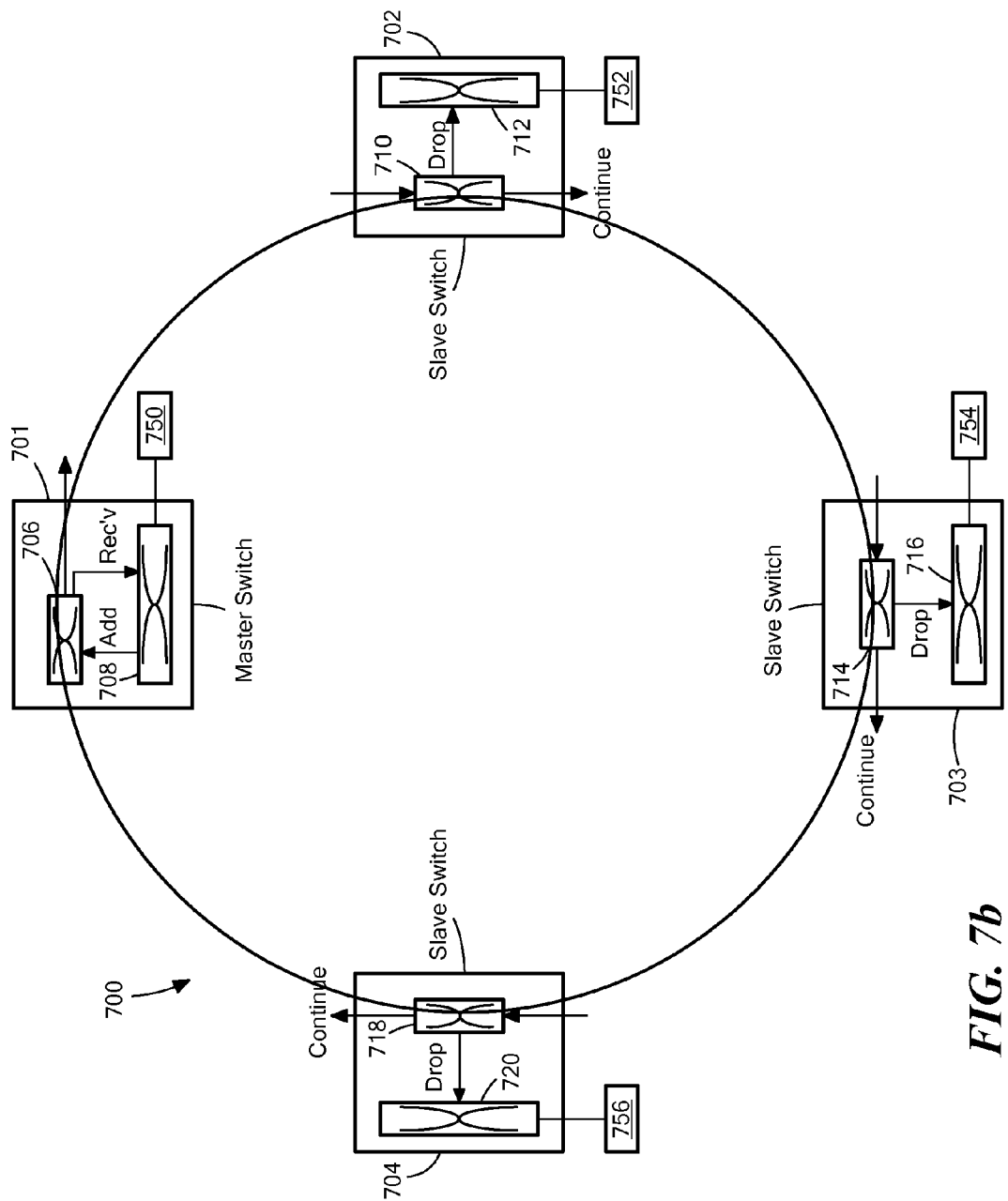
FIG. 7b is a block diagram of the optical ring network of FIG. 7a, in which the plurality of optical nodes are configured to support a low latency broadcast data channel on the optical ring network.

FIG. 7b depicts the optical ring network 700 that includes the plurality of optical nodes 701, 702, 703, 704, which are configured to support a low latency broadcast data channel on the optical ring network 700. With reference to FIG. 7b, optical node 701 is again designated as a multicast master node, and optical nodes 702, 703, 704 are again designated as respective slave nodes. Further, the external computerized devices 750, 752, 754, 756 are each designated as a broadcast subscriber. To achieve a low latency broadcast data channel on the optical ring network 700 (see FIG. 7b), the packet switch 708 included in optical (multicast master) node 701 can provide one or more signals, in electrical form, to the circuit switch 706 within optical (multicast master) node 701, for subsequent conversion to optical form and addition to the broadcast data channel. Optical (multicast master) node 701 can then send the signals on the broadcast data channel in the East (clockwise) direction along the optical ring network 700, allowing the signals to be received at the circuit switch 710 included in optical (slave) node 702. The circuit switch 710 provides the signals, separated from the broadcast data channel, to the packet switch 712 within optical (slave) node 702 for subsequent forwarding to the external computerized (subscriber) device 752. Further, optical (slave) node 702 forwards the signals, with low latency, on the broadcast data channel in the East (clockwise) direction for receipt at the circuit switch 714 included in optical (slave) node 703. The circuit switch 714 provides the signals, separated from the broadcast data channel, to the packet switch 716 within optical (slave) node 703 for subsequent forwarding to the external computerized (subscriber) device 754. Optical (slave) node 703 also forwards the signals, with low latency, on the broadcast data channel in the East (clockwise) direction for receipt at the circuit switch 718 included in optical (slave) node 704. The circuit switch 718 provides the signals, separated from the broadcast data channel, to the packet switch 720 within optical (slave) node 704 for subsequent forwarding to the external computerized (subscriber) device 756. Optical (slave) node 704 then forwards the signals, with low latency, on the broadcast data channel in the East (clockwise) direction for receipt at the circuit switch 706 included in optical (multicast master) node 701. It is noted that optical (slave) nodes 702, 703, 704 can each forward the signals on the broadcast data channel to a downstream node on the optical ring network 700, without first requiring the signals to pass through the packet switch included in the respective optical node. It is further noted that the plurality of optical nodes 701, 702, 703, 704 can be configured to support such a low latency broadcast data channel for sending optical signals in the West (counter clockwise) direction along the optical ring network 700.

Figure 7C:
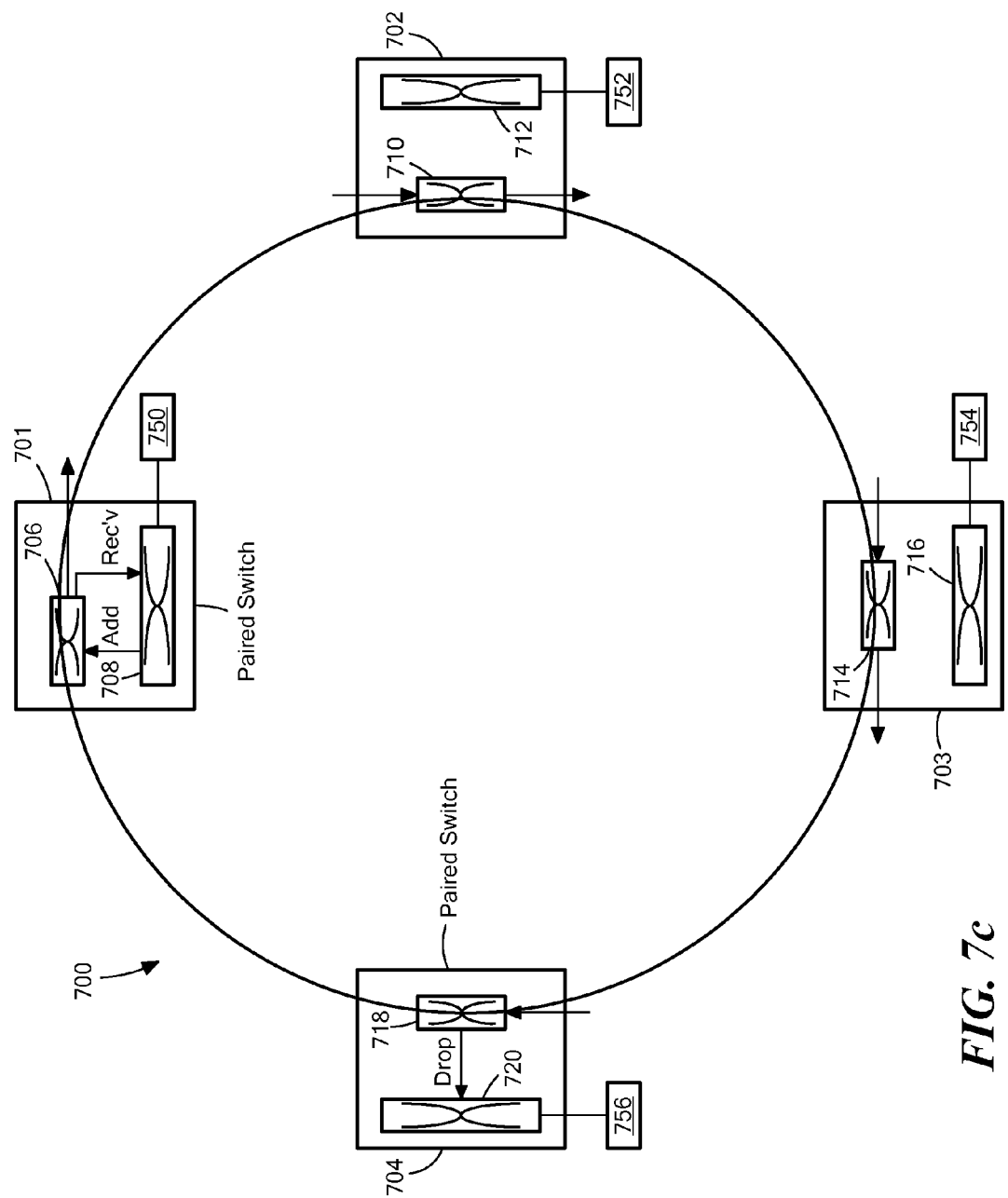
FIG. 7c is a block diagram of the optical ring network of FIG. 7a, in which the plurality of optical nodes are configured to support a flyway channel on the optical ring network.

FIG. 7c depicts the optical ring network 700 that includes the plurality of optical nodes 701, 702, 703, 704, which are configured to support what is referred to herein as a "flyway channel" between a selected pair of optical nodes on the optical ring network 700. With reference to FIG. 7c, optical nodes 701 and 704 are designated as paired optical nodes. It is noted that any other pair of optical nodes on the optical ring network 700 may alternatively be designated as paired optical nodes. To employ a flyway channel on the optical ring network 700 (see FIG. 7c), the packet switch 708 included in optical (paired) node 701 can provide one or more signals, in electrical form, to the circuit switch 706 within optical (paired) node 701, for subsequent conversion to optical form and addition to the flyway channel. Optical (paired) node 701 can then send the signals on the flyway channel in the East (clockwise) direction along the optical ring network 700, allowing the signals to be received at the circuit switch 710 included in optical node 702. Because optical node 702 is not one of the paired optical nodes, optical node 702 can be regarded as not being an intended recipient of the signals. Optical node 702 forwards the signals, with low latency, on the flyway channel in the East (clockwise) direction for receipt at the circuit switch 714 included in optical node 703, and blocks the signals from reaching the packet switch 712. Because optical node 703 is also not one of the paired optical nodes, optical node 703 can likewise be regarded as not being an intended recipient of the signals. Optical node 703 forwards the signals, with low latency, on the flyway channel in the East (clockwise) direction for receipt at the circuit switch 718 included in optical (paired) node 704, and blocks the signals from reaching the packet switch 716. Because optical node 704 is designated as one of the paired optical nodes, it can be regarded as an intended recipient of the signals. The circuit switch 718 provides the signals, separated from the flyway channel, to the packet switch 720 within optical (paired) node 704 for subsequent forwarding to the external computerized device 756, or, alternatively, the signal may be provided to a user connection port that is configured for direct attach. It is noted that optical nodes 702, 703 can each forward the signals on the flyway channel to a downstream node on the optical ring network 700, without first requiring the signals to pass through the packet switch included in the respective optical node. It is further noted that the plurality of optical nodes 701, 702, 703, 704 can be configured to support such a flyway channel for sending optical signals in the West (counter clockwise) direction along the optical ring network 700.

Figure 8:
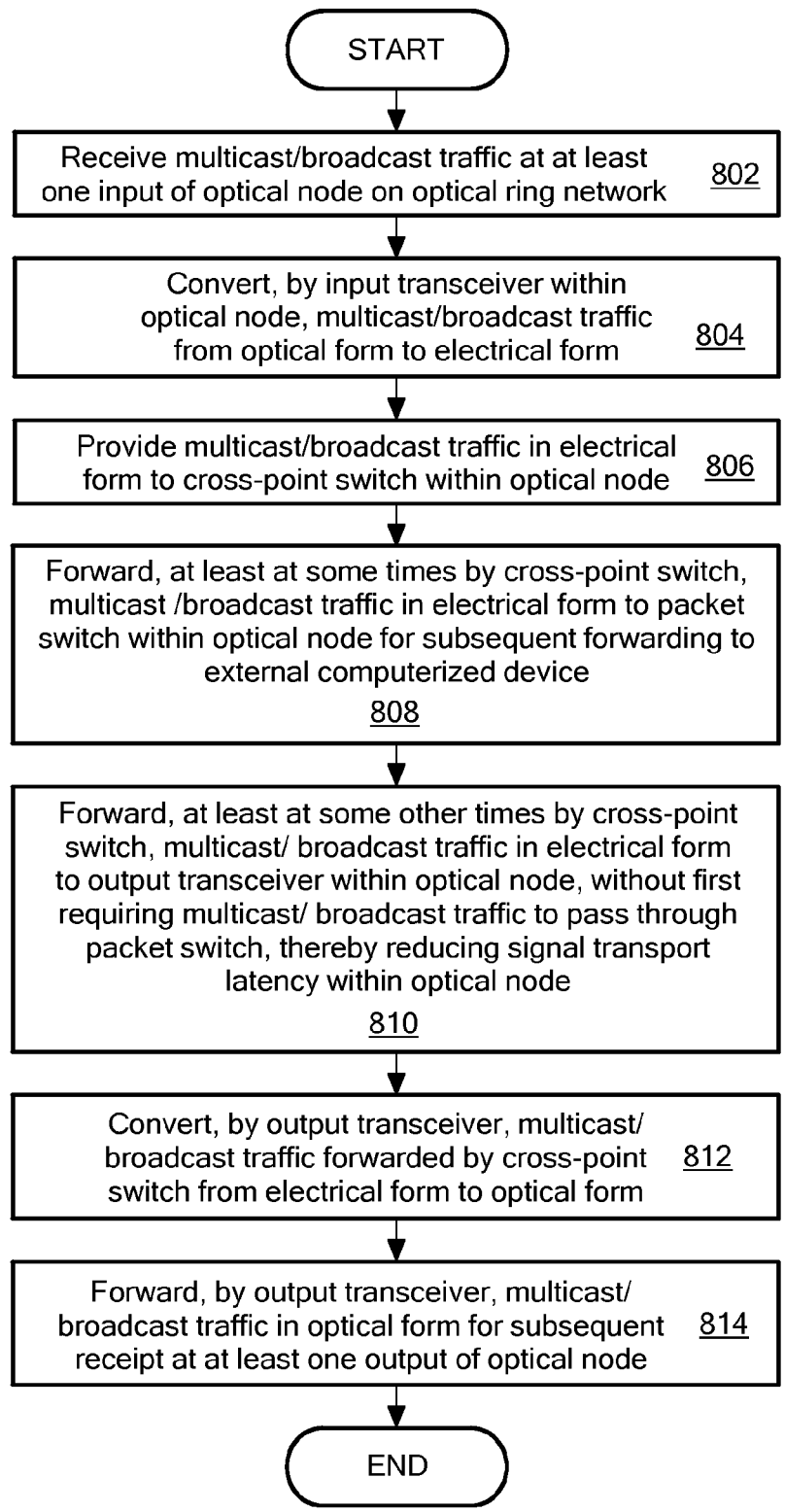
FIG. 8 is a flow diagram of an exemplary method of operating the optical node of FIG. 2 for achieving low signal transport latency within the optical node.

An illustrative method of providing low latency multicast/broadcast functionality on an optical ring network is described below with reference to FIG. 8. As depicted in step 802, multicast/broadcast traffic is received at at least one input of an optical node on the optical ring network. As depicted in step 804, the multicast/broadcast traffic is converted, by an input transceiver within the optical node, from optical form to electrical form. As depicted in step 806, the multicast/broadcast traffic, in electrical form, is provided, by the input transceiver, to a circuit switch within the optical node. As depicted in step 808, the multicast/broadcast traffic, in electrical form, is forwarded, at least at some times by the circuit switch, to a packet switch within the optical node for subsequent forwarding to an external computerized device. As depicted in step 810, the multicast/broadcast traffic, in electrical form, is forwarded, at least at some other times by the circuit switch, to an output transceiver within the optical node, without first requiring the multicast/broadcast traffic to pass through the packet switch, thereby reducing signal transport latency within the optical node. As depicted in step 812, the multicast/broadcast traffic forwarded to the output transceiver is converted, by the output transceiver, from electrical form to optical form. As depicted in step 814, the multicast/broadcast traffic is forwarded, in optical form by the output transceiver, for subsequent receipt at an optical output of the optical node on the optical ring network. Because, in accordance with the illustrative method of FIG. 8, the optical node can provide such multicast/broadcast traffic, via the circuit switch, to a downstream node on the optical ring network, without first requiring the multicast/broadcast traffic to pass through the packet switch, the optical node can support a multicast and/or broadcast data channel on the optical ring network with low latency. It is noted that the optical node can provide such data traffic on a multicast data channel, or a flyway channel, to a downstream node via optical connection paths communicably coupling respective inputs and respective outputs of the optical node, without first requiring the data traffic to pass through the circuit switch or the packet switch within the optical node, thereby further reducing latency within the optical ring network.

Having described the above illustrative embodiments of the presently disclosed data center network architectures, systems, and methods, other embodiments or variations may be made. For example, it was described above that an optical ring network can be provided that includes a plurality of optical nodes interconnected by one or more multi-fiber ribbon cables, in which some or all of the optical nodes are each configured in accordance with optical node 1 of FIG. 2. Such optical nodes can also be employed to implement any other suitable logical optical network topology.

Figure 9A:
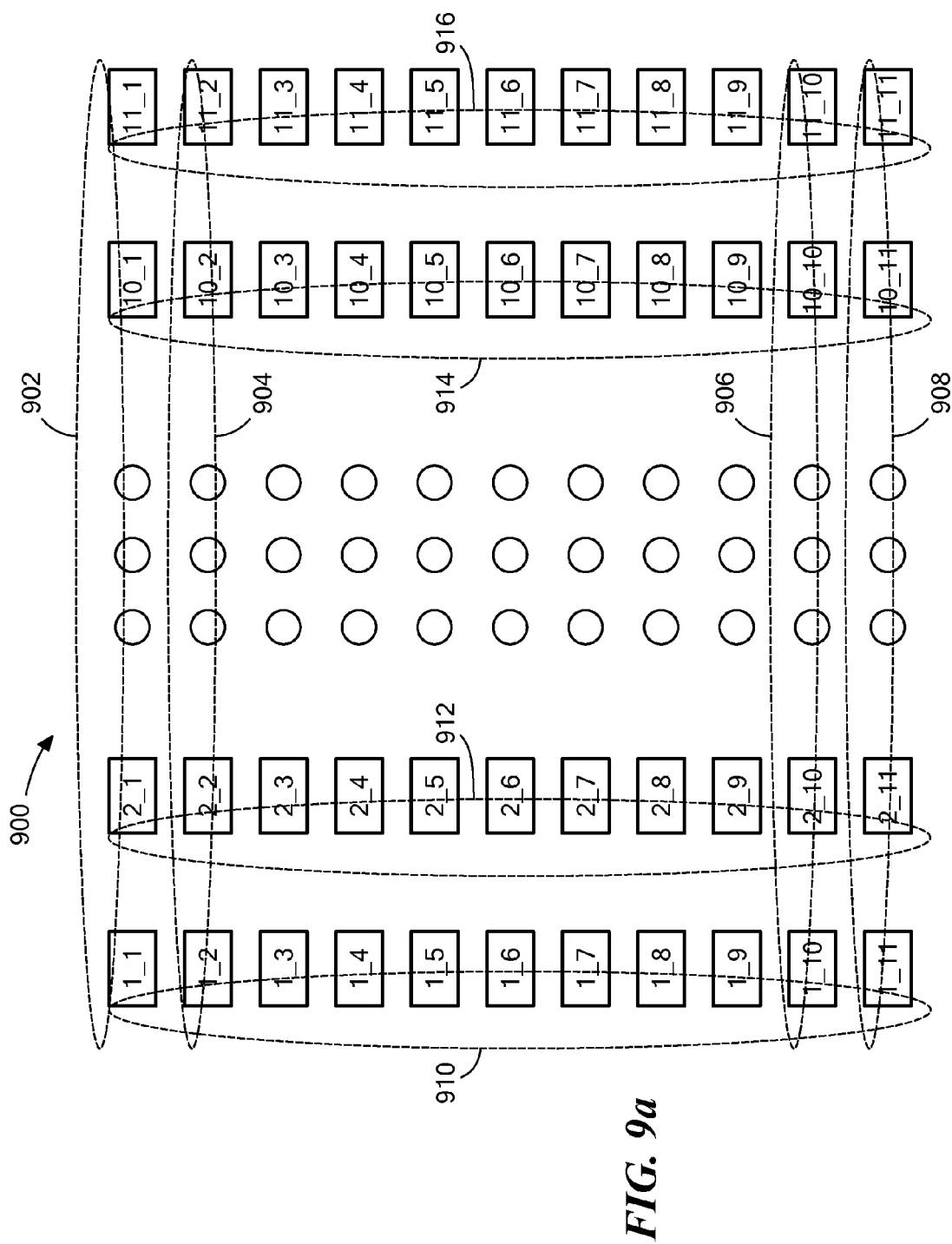
FIG. 9a is a block diagram of an exemplary optical torus network that includes a plurality of optical nodes of degree-4, configured in accordance with the optical node of FIG. 2.

FIG. 9a depicts an illustrative embodiment of an optical torus network 900 that includes a plurality of optical nodes 1_1 through 1_11; 2_1 through 2_11; . . . ; and, 11_1 through 11_11. As shown in FIG. 9a, one or more multi-fiber ribbon cables may be employed as optical links to interconnect the eleven (11) optical nodes in each row of the optical torus network 900, thereby forming eleven (11) optical ring networks corresponding to the respective rows, such as optical ring networks 902, 904, 906, 908. Further, one or more multi-fiber ribbon cables may be employed to interconnect the eleven (11) optical nodes in each column of the optical torus network 900, thereby forming eleven (11) optical ring networks corresponding to the respective columns, such as optical ring networks 910, 912, 914, 916. It is noted that the respective rows and the respective columns of the optical torus network 900 may alternatively include any other suitable number of optical nodes.

Figure 9B:
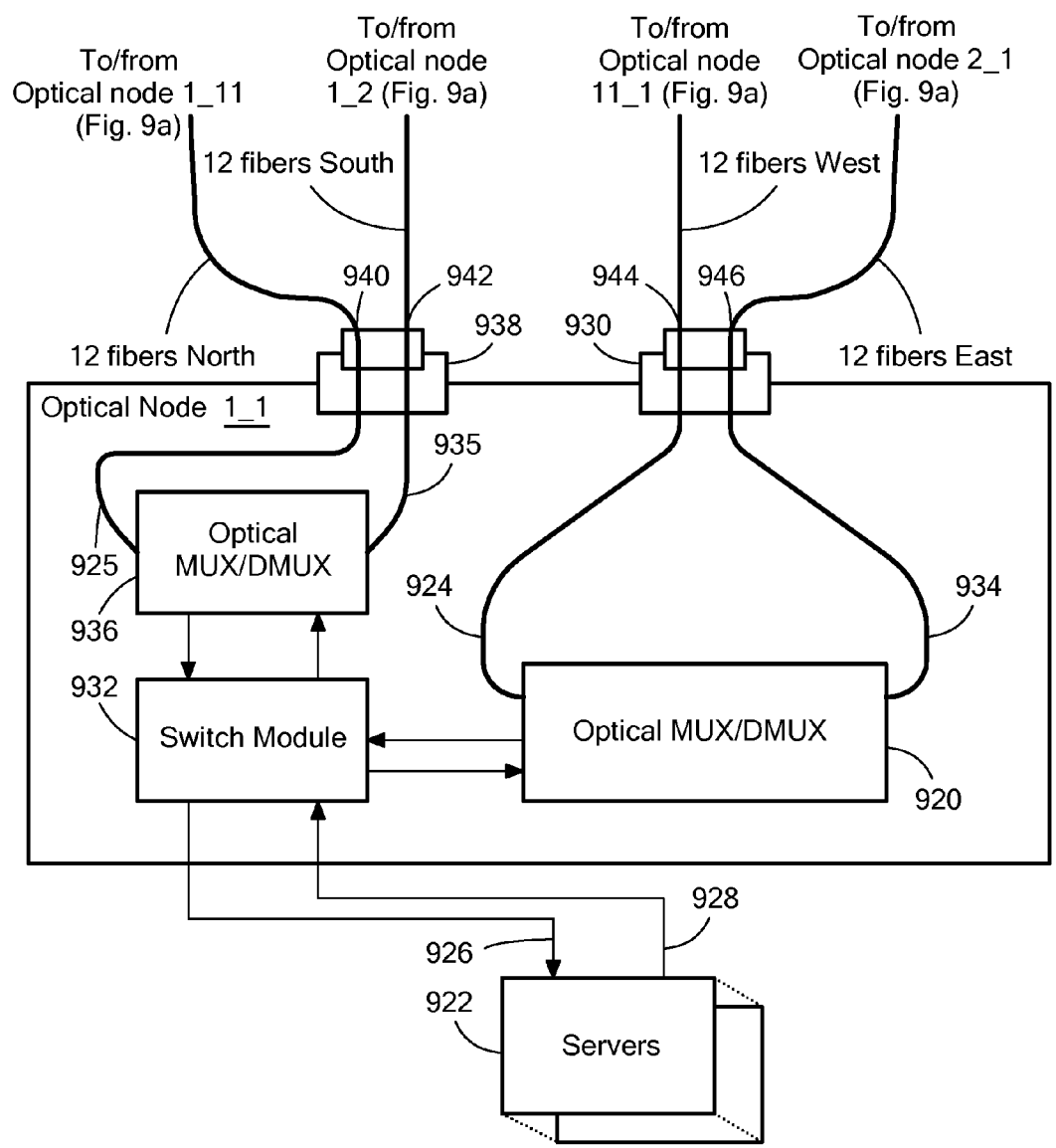

FIG. 9b depicts an exemplary configuration of optical node 1_1 on the optical torus network 900 (see FIG. 9a). It is noted that the other optical nodes 1_2 through 1_11; 2_1 through 2_11; . . . ; and, 11_1 through 11_11 on the optical torus network 900 can have a configuration like that of optical node 1_1. As shown in FIG. 9b, optical node 1_1 is an optical node of degree-4 that includes two paired optical ports 946, 944 referred to herein as the East port 946 and the West port 944, and two paired optical ports 940, 942 referred to herein as the North port 940 and the South port 942. Optical node 1_1 also includes an optical MUX/DMUX module 920, an optical MUX/DMUX module 936, a switch module 932, and an optical backplane with a twenty-four (24) fiber connector 930 and a twenty-four (24) fiber connector 938, such as HBMT™ connectors or any other suitable connectors. Optical node 1_1 further includes a first bundle 934 of 12 optical fibers connected between the optical MUX/DMUX module 920 and the connector 930 in the East direction (e.g., from optical node 1_1 toward optical node 2_1; see FIG. 9a), a second bundle 924 of 12 optical fibers connected between the optical MUX/DMUX module 920 and the connector 930 in the West direction (e.g., from optical node 1_1 toward optical node 11_1; see FIG. 9a), a third bundle 925 of 12 optical fibers connected between the optical MUX/DMUX module 936 and the connector 938 in the North direction (e.g., from optical node 1_1 toward optical node 1_11; see FIG. 9a), and a fourth bundle 935 of 12 optical fibers connected between the optical MUX/DMUX module 936 and the connector 938 in the South direction (e.g., from optical node 1_1 toward optical node 1_2; see FIG. 9a). It is noted that the optical MUX/DMUX modules 920, 936 can each include optical filter configurations that implement a hybrid SDM/WDM shifting channel plan like that implemented by the optical filter configurations 301, 303 (see FIGS. 3a-3c) included in the optical MUX/DMUX module 202 (see FIG. 2). It is noted that each of the remaining optical nodes included in the optical torus network 900 can be configured to provide input/output capabilities like those provided by optical node 1_1. Further, multi-fiber ribbon cables including twelve (12) optical fibers (e.g., Fibers #1-#12; see FIGS. 3a-3c), or any other suitable number of fibers, can be used to link the optical nodes on the respective optical ring networks (e.g., the optical ring networks 902, 904, 906, 908, 910, 912, 914, 916) of FIG. 9a.

The optical ring networks corresponding to the respective rows and columns of the optical torus network 900 (see FIG. 9a) form a topology that allows up to three (3) hop connection(s) from any external computerized device connected to optical nodes 1_1 through 1_11; 2_1 through 2_11; . . . ; and, 11_1 through 11_11, to any other external computerized device connected to optical nodes 1_1 through 1_11; 2_1 through 2_11; . . . ; and, 11_1 through 11_11, so long as sufficient bandwidth is available on the optical links interconnecting the respective optical nodes, without requiring the use of flyways or dedicated flyways. It is further noted that the topology can be extended to achieve higher dimensions by increasing the number of optical connection paths within the optical nodes to accommodate an increased number of optical fibers in the multi-fiber ribbon cables. In general, "n" optical connection paths within the respective optical nodes, accommodating "n" optical fibers in the respective multi-fiber ribbon cables, can be used to achieve an n-dimensional topology. To obtain full logical mesh connectivity along the rows and columns of such an n-dimensional topology, a total of $m^n$ optical nodes may be employed, in which "m" corresponds to the chordal diameter in each dimension (e.g., m=11; see FIG. 9).

Figure 9C:
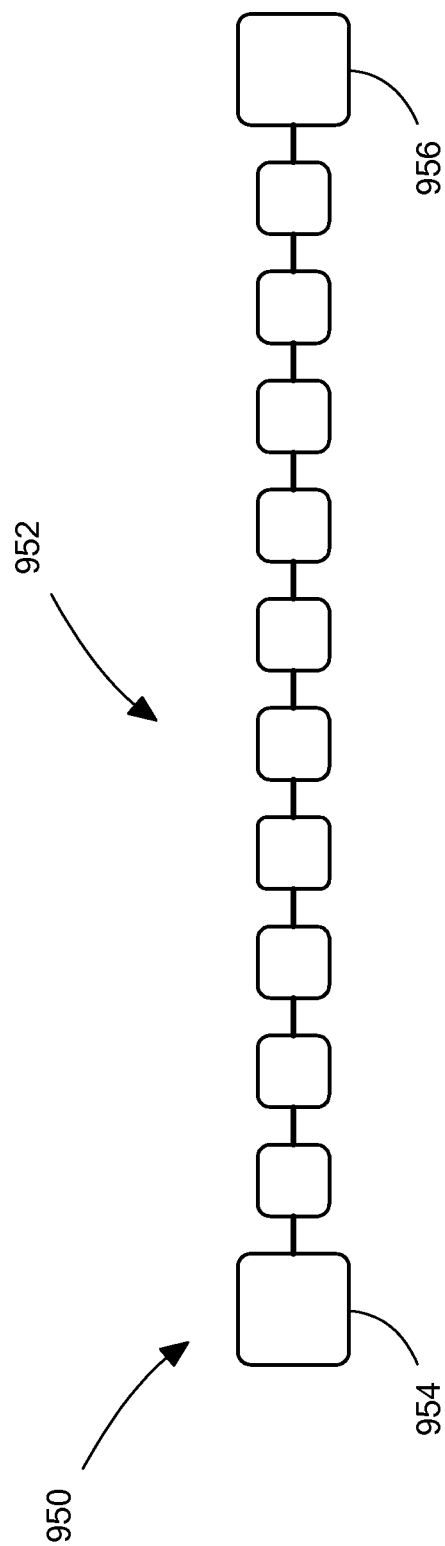
FIG. 9c is a block diagram of an exemplary chordal path network that includes a plurality of optical nodes of degree-2, and a plurality of optical nodes of degree-1.

FIG. 9c depicts an illustrative embodiment of a chordal path 950 formed by a plurality of optical nodes 952 of degree-2 connected to one another in a line between a pair of optical nodes 954, 956 of degree-1. It is noted that the physical topology of the chordal path 950 is a path, whereas the switching topology of the chordal path 950 is a chordal path network. As shown in FIG. 9c, the optical nodes 954, 956 of degree-1 form the endpoints of the chordal path 950. Each of the optical nodes 954, 956 of degree-1 can terminate, on its sole optical port, each optical fiber interconnecting the optical node of degree-1 with its neighboring optical node of degree-2 on the chordal path 950.

Figure 9D:
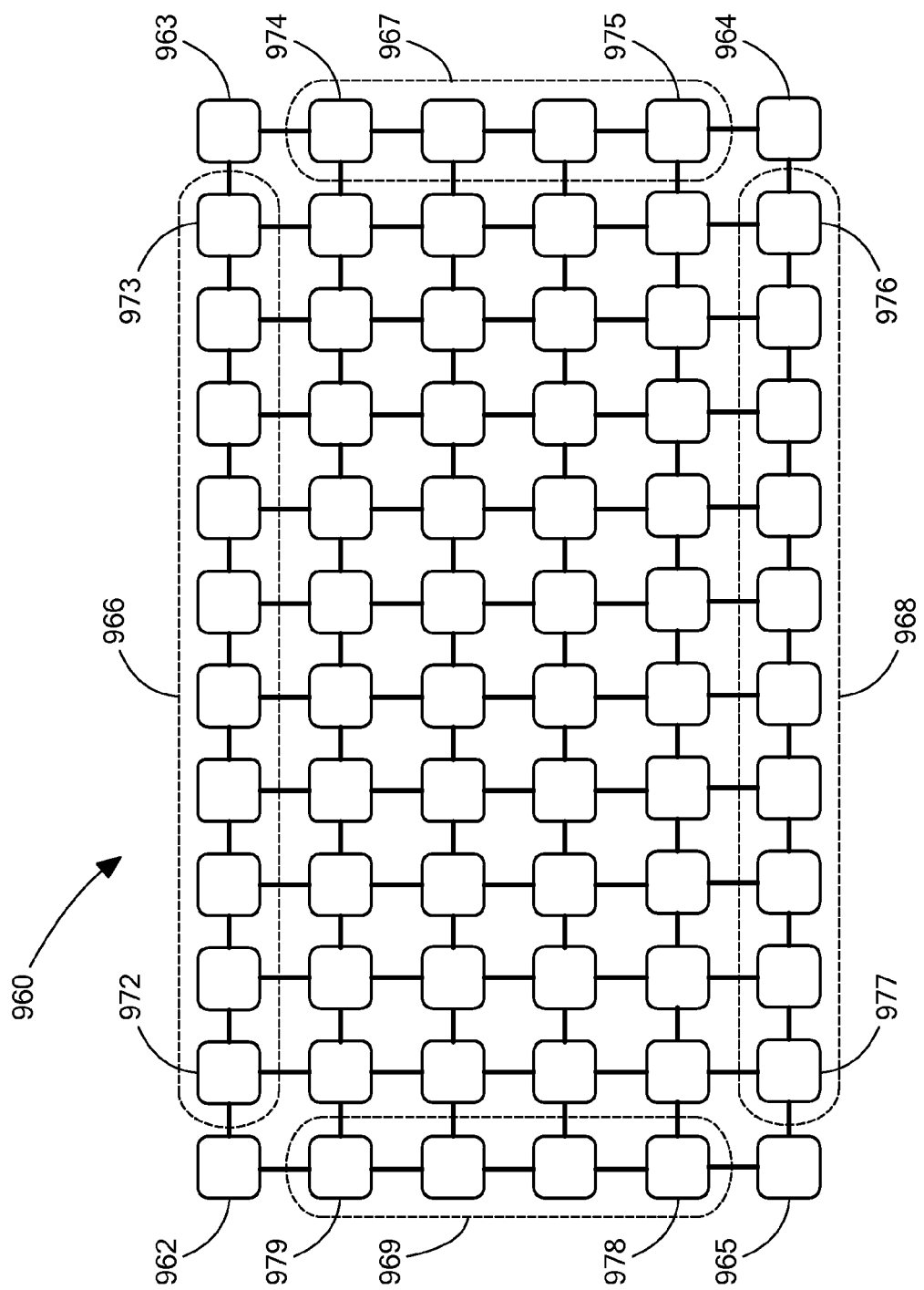
FIG. 9d is a block diagram of an exemplary Manhattan Street physical topology that includes a plurality of optical nodes of degree-2, a plurality of optical nodes of degree-3, and a plurality of optical nodes of degree-4.

FIG. 9d depicts an illustrative embodiment of a Manhattan Street physical topology 960 that includes a plurality of optical nodes 962, 963, 964, 965 of degree-2, a plurality of optical nodes 966 of degree-3 connected along the row between optical nodes 962, 963, a plurality of optical nodes 967 of degree-3 connected along the column between optical nodes 963, 964, a plurality of optical nodes 968 of degree-3 connected along the row between optical nodes 964, 965, and a plurality of optical nodes 969 of degree-3 connected along the column between optical nodes 965, 962. For example, such an optical node of degree-3 can have a West port and an East port that are paired optical ports, and a South port that is a terminal port for terminating all of the wavelengths on all of the fibers of a South port/North port channel plan. As illustrated in FIG. 9d, the remaining optical nodes (not numbered) in the interior of the Manhattan Street physical topology 960 are optical nodes of degree-4. The optical nodes of degree-4 are logically laid out in the Manhattan Street physical topology 960 with each optical node connected to its four neighboring optical nodes through its East, West, North, and South ports with a multitude of fibers, in which the first optical node and the last optical node in a row, and the first optical node and the last optical node in a column, have terminal ports that terminate a suitable channel plan.

More specifically, optical node 962 has an East port connected to optical node 972 and a South port connected to optical node 979, optical node 963 has a West port connected to optical node 973 and a South port connected to optical node 974, optical node 965 has an East port connected to optical node 977 and a North port connected to optical node 978, and optical node 964 has a West port connected to optical node 976 and a North port connected to optical node 975. Further, optical nodes 966 each have paired East and West ports connected to their neighboring optical nodes in the East and West directions, respectively, and a South port connected to their neighboring optical nodes in the South direction, optical nodes 967 each have paired North and South ports connected to their neighboring optical nodes in the North and South directions, respectively, and a West port connected to their neighboring optical nodes in the West direction, optical nodes 968 each have paired East and West ports connected to their neighboring optical nodes in the East and West directions, respectively, and a North port connected to their neighboring optical nodes in the North direction, and optical nodes 969 each have paired North and South ports connected to their neighboring optical nodes in the North and South directions, respectively, and an East port connected to their neighboring optical nodes in the East direction. All of the remaining optical nodes (not numbered) in the interior of the Manhattan Street physical topology 960 have paired East and West ports connected to their neighboring optical nodes in the East and West directions, respectively, and paired North and South ports connected to their neighboring optical nodes in the North and South directions, respectively.

It was also described above that the pair of optical configurations 301, 303 (see FIGS. 3a, 3b, 3c) included in the optical MUX/DMUX module 202 may be employed to implement a hybrid SDM/WDM shifting channel plan. To increase the bandwidth of the optical connection paths between optical nodes, without requiring an increased number of wavelength channels, exemplary optical configurations 1001, 1003 (see FIGS. 10a, 10b) may be employed in place of the optical configurations 301, 303, respectively, within the optical MUX/DMUX module 202.

Figure 10A:
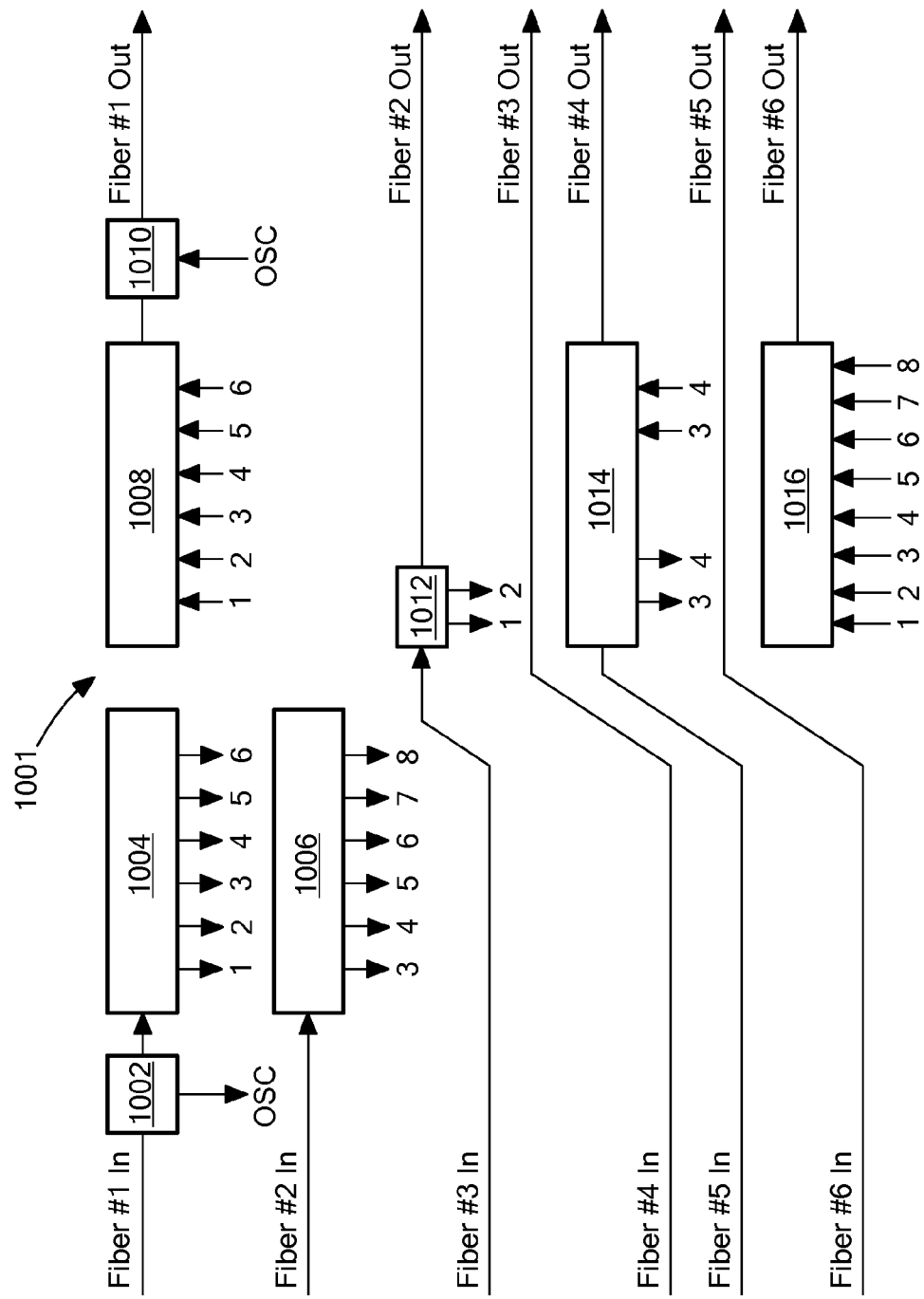
FIGS. 10a-10b are schematic diagrams of an exemplary alternative embodiment of the optical MUX/DMUX module of FIGS. 3b-3c.
Figure 10B:
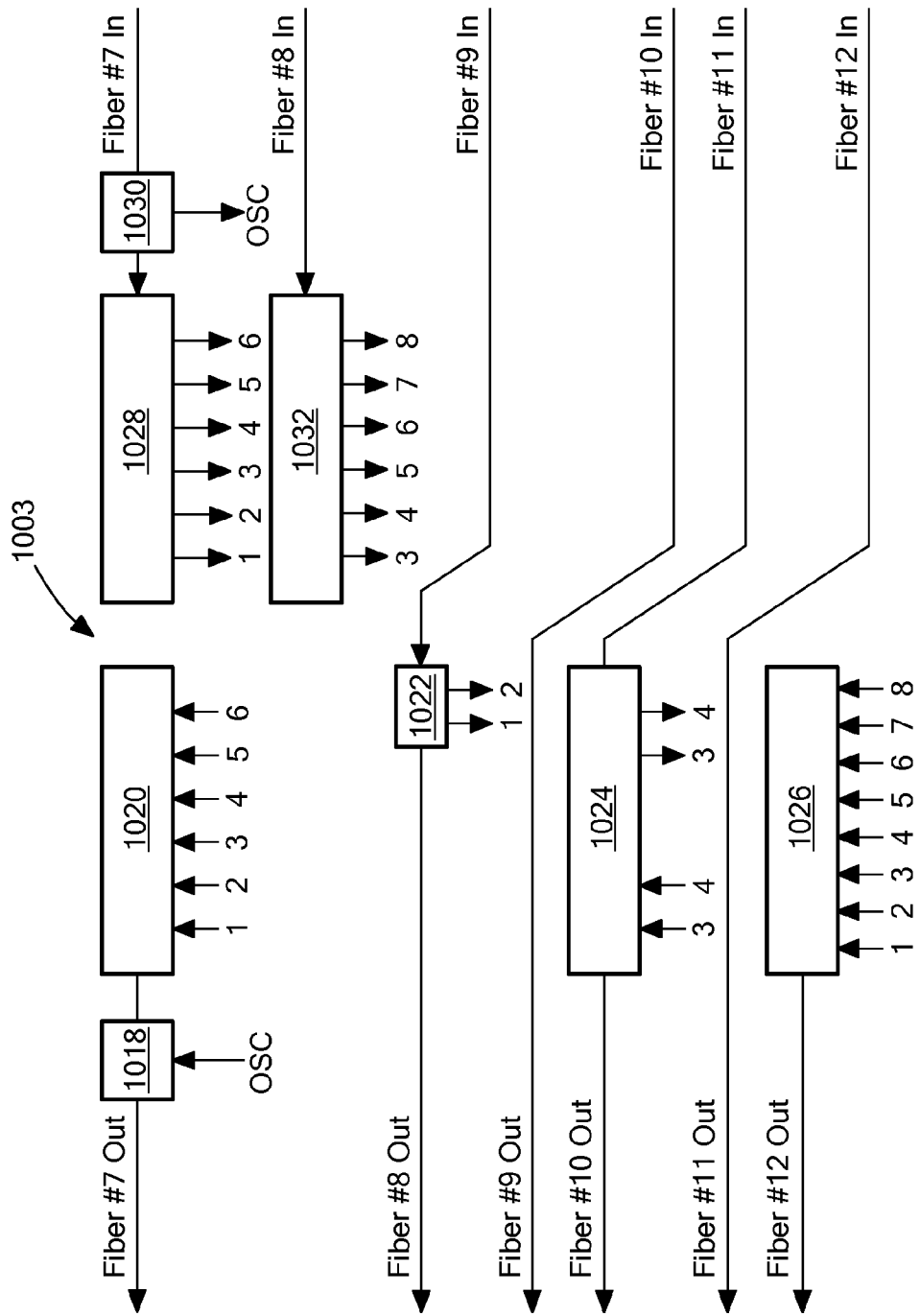

With regard to the optical configuration 1001 of FIG. 10a, fiber #1 (in) can be used in conjunction with fiber #1 (out) to implement an OSC channel corresponding to a drop module 1002 and an add module 1010. Fiber #1 (in) and fiber #1 (out) (see FIG. 10a) can also be used in conjunction with a drop module 1004 (such as a 6-channel DMUX filter) and an add module 1008 (such as a 6-channel MUX filter), respectively, to implement one (1) hop connection(s) for wavelength channels 1, 2, 3, 4, 5, 6 (see FIG. 10a). Similarly, as shown in FIG. 10b, fiber #7 (in) can be used in conjunction with fiber #7 (out) to implement an OSC channel corresponding to a drop module 1030 and an add module 1018. Fiber #7 (in) and fiber #7 (out) (see FIG. 10b) can also be used in conjunction with a drop module 1028 (such as a 6-channel DMUX filter) and an add module 1020 (such as a 6-channel MUX filter), respectively, to implement the one (1) hop connection(s) for the wavelength channels 1, 2, 3, 4, 5, 6 (see FIG. 10b).

In addition, fiber #2 (in) (see FIG. 10a) can be used in conjunction with a drop module 1006 (such as a 6-channel DMUX filter) to implement one (1) hop connection(s) for wavelength channels 3, 4, 5, 6, 7, 8, and fiber #8 (in) (see FIG. 10b) can be used in conjunction with a drop module 1032 (such as an 6-channel DMUX filter) to implement the one (1) hop connection(s) for the wavelength channels 3, 4, 5, 6, 7, 8. The remaining fibers can be routed within the respective optical configurations 1001, 1003, as follows:

(1) fiber can be routed from position #3 (i.e., fiber #3 (in)) to position #2 (i.e., fiber #2 (out)) of the multi-fiber ribbon cable through a drop module 1012 (such as a 2-channel DMUX filter) for use with the wavelength channels 1, 2 (see FIG. 10a);

(2) fiber can be routed from position #4 (i.e., fiber #4 (in)) to position #3 (i.e., fiber #3 (out)) of the multi-fiber ribbon cable (see FIG. 10a);

(3) fiber can be routed from position #5 (i.e., fiber #5 (in)) to position #4 (i.e., fiber #4 (out)) of the multi-fiber ribbon cable through a drop/add module 1014 (such as a 2-channel DMUX filter/2-channel MUX filter) for use with the wavelength channels 3, 4 (see FIG. 10a);

(4) fiber can be routed from position #6 (i.e., fiber #6 (in)) to position #5 (i.e., fiber #5 (out)) of the multi-fiber ribbon cable (see FIG. 10a);

(5) fiber can be routed from position #6 (i.e., fiber #6 (out)) of the multi-fiber ribbon cable to an add module 1016 (such as an 8-channel MUX filter) for use with the wavelength channels 1, 2, 3, 4, 5, 6, 7, 8 (see FIG. 10a);

(6) fiber can be routed from position #9 (i.e., fiber #9 (in)) to position #8 (i.e., fiber #8 (out)) of the multi-fiber ribbon cable through a drop module 1022 (such as a 2-channel drop module) for use with the wavelength channels 1, 2 (see FIG. 10b);

(7) fiber can be routed from position #10 (i.e., fiber #10 (in)) to position #9 (i.e., fiber #9 (out)) of the multi-fiber ribbon cable (see FIG. 10b);

(8) fiber can be routed from position #11 (i.e., fiber #11 (in)) to position #10 (i.e., fiber #10 (out)) of the multi-fiber ribbon cable through a drop/add module 1024 (such as a 2-channel DMUX filter/2-channel MUX filter) for use with the wavelength channels 3, 4 (see FIG. 10b);

(9) fiber can be routed from position #12 (i.e., fiber #12 (in)) to position #11 (i.e., fiber #11 (out)) of the multi-fiber ribbon cable (see FIG. 10b); and

(10) fiber can be routed from position #12 (i.e., fiber #12 (out)) of the multi-fiber ribbon cable to an add module 1026 (such as a 8-channel MUX filter) for use with the wavelength channels 1, 2, 3, 4, 5, 6, 7, 8 (see FIG. 10b).

It is noted that, in the optical configurations 1001, 1003, the respective MUX and DMUX filters can be implemented as active or passive components.

Figure 11:
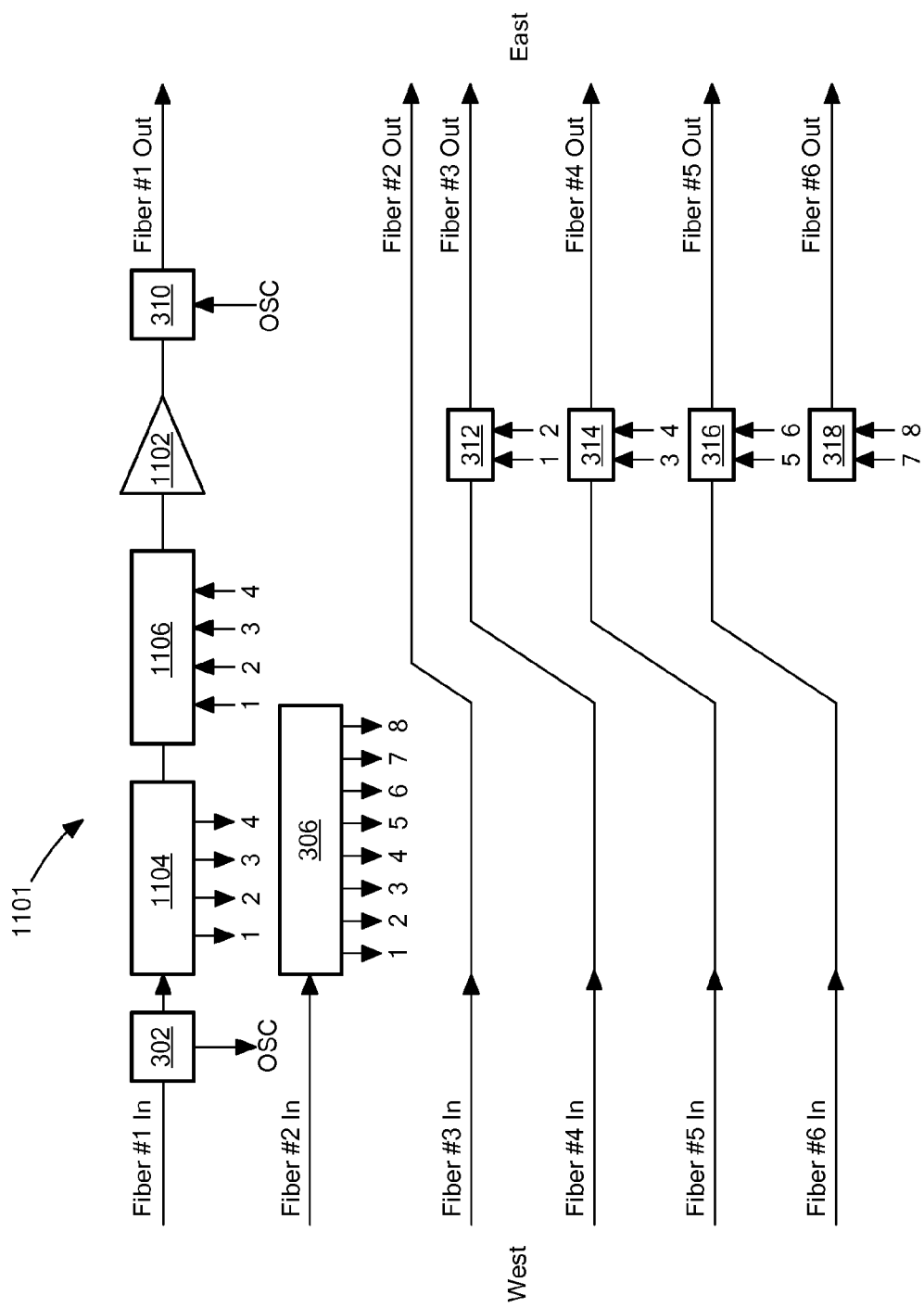
FIG. 11 is a schematic diagram of a further exemplary alternative embodiment of the optical MUX/DMUX module of FIG. 3b.

It was further described above with regard to the optical filter configuration 301 (see FIG. 3a, 3b) that fiber #1 (in) can be used in conjunction with the drop module 304, and fiber #1 (out) can be used in conjunction with the add module 308, to implement one (1) hop connection(s) for the wavelength channels 1, 2, 3, 4, but without providing a direct connection between fiber #1 (in) and fiber #1 (out) within the optical MUX/DMUX module 202 (see FIGS. 2, 3a). To provide such a direct connection between fiber #1 (in) and fiber #1 (out) within the optical MUX/DMUX module 202, an optical filter configuration 1101 (see FIG. 11) may be employed in place of the optical filter configuration 301. As shown in FIG. 11, the optical filter configuration 1101 is like the optical filter configuration 301, with the exceptions that a tunable filter 1104 is operatively coupled between the drop module 302 and a tunable laser (transceiver) 1106, and an optical amplifier 1102, such as an EDFA (erbium-doped fiber amplifier) optical amplifier, is operatively coupled between the tunable laser (transceiver) 1106 and the add module 310, thereby providing the direct connection between fiber #1 (in) and fiber #1 (out) within the optical MUX/DMUX module 202. It is noted that an EDFA optical amplifier, a tunable filter, and a tunable laser (transceiver) may be operatively coupled in an analogous fashion in the optical filter configuration 303 (see FIG. 3c) to provide a direct connection between fiber #7 (in) and fiber #7 (out) within the optical MUX/DMUX module 202.

Figure 12A:
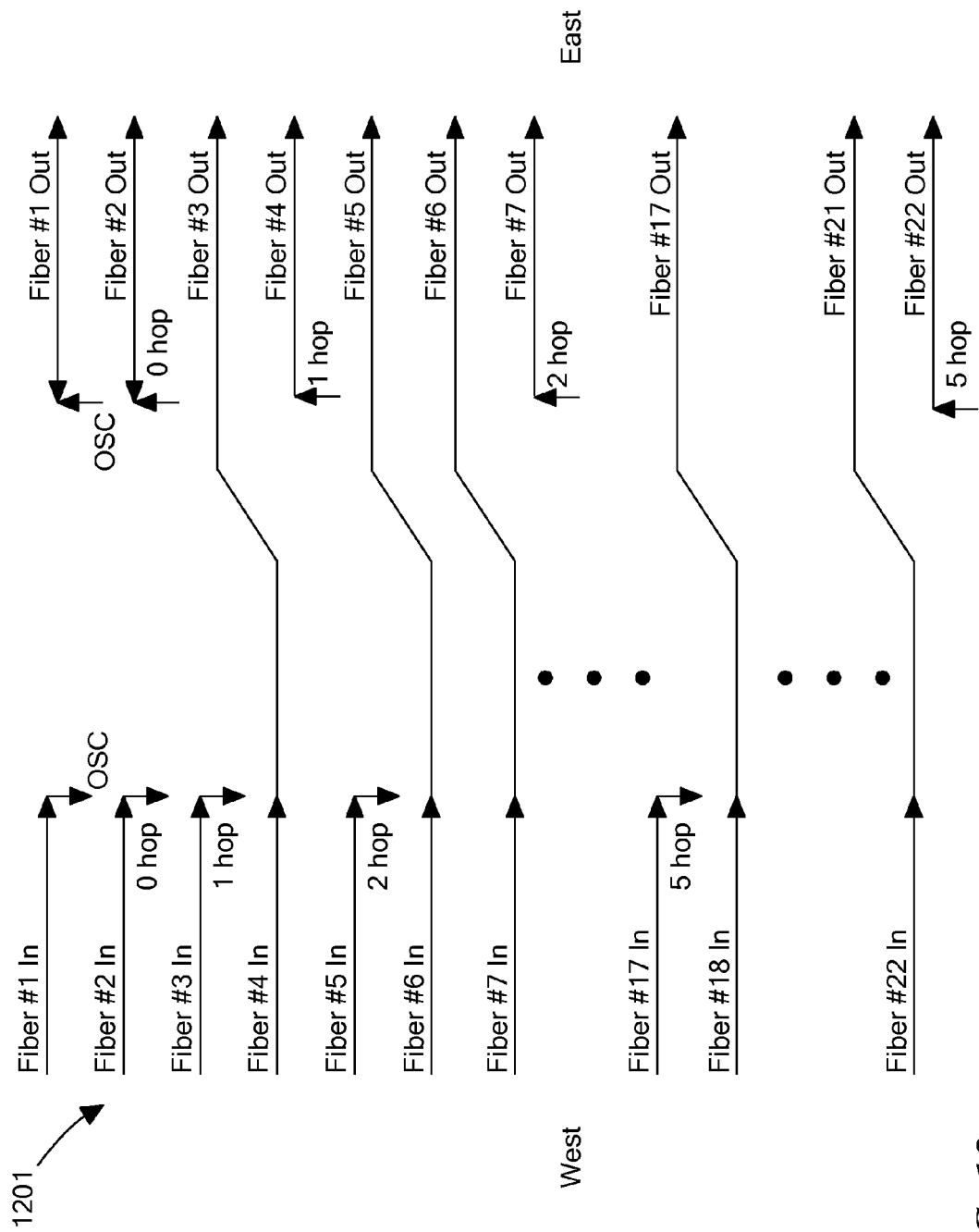
FIGS. 12a-12b are schematic diagrams of another exemplary alternative embodiment of the optical MUX/DMUX module of FIGS. 3b-3c.
Figure 12B:
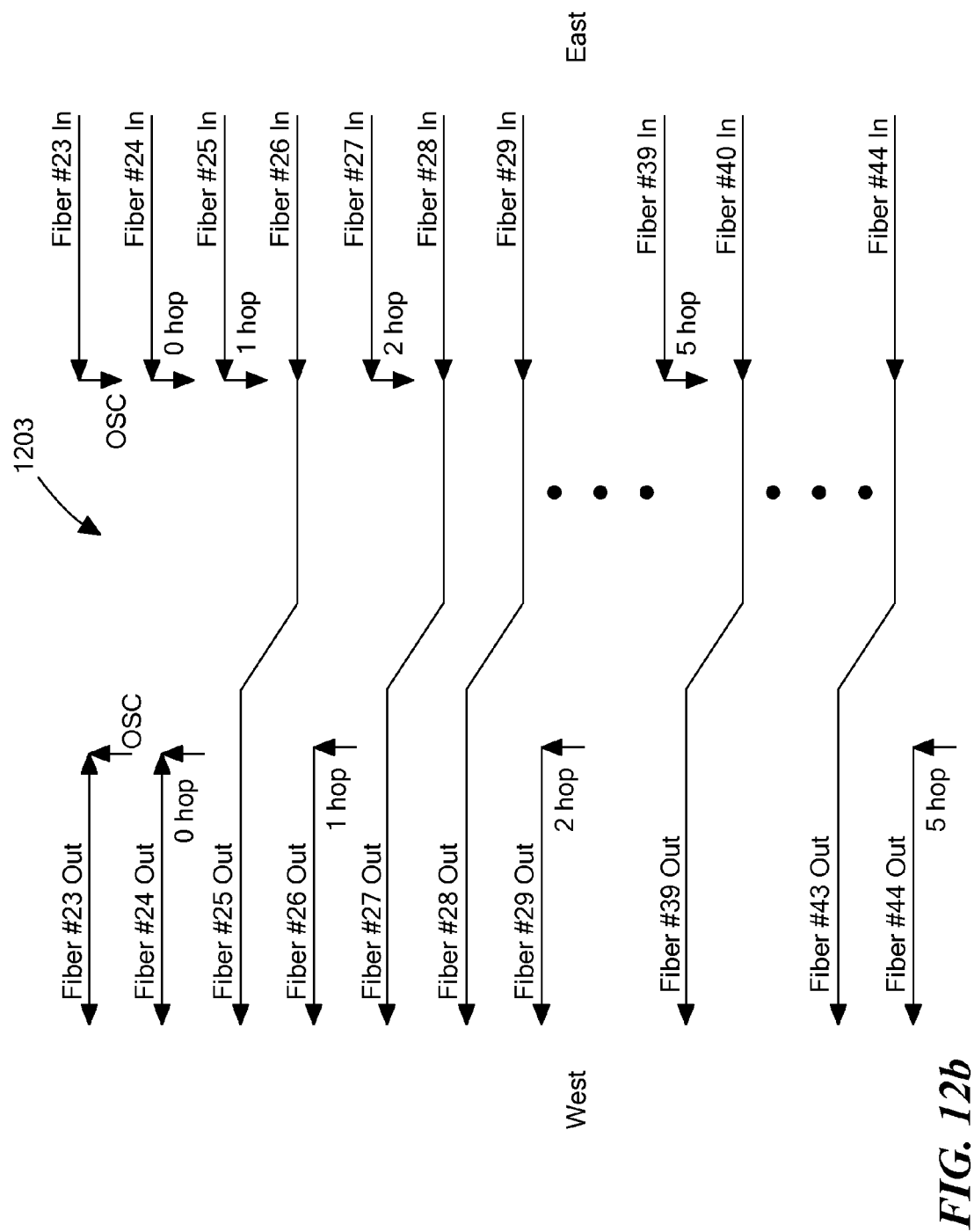

It was also described above that the plurality of optical connection paths of the optical filter configuration 301 (see FIGS. 3a, 3b), such as the optical connection paths 388-391, as well as the plurality of optical connection paths of the optical filter configuration 303 (see FIGS. 3a, 3c), such as the optical connection paths 392-395, can be configured to provide one or more WDM (CWDM, or DWDM) wavelength channels between optical nodes 1-11 on the optical ring network 100 (see FIG. 1). To implement the respective optical connection paths of the optical filter configurations without requiring the use of WDM optics, exemplary optical configurations 1201, 1203 (see FIGS. 12a, 12b) may be employed in place of the optical filter configurations 301, 303, respectively, within the optical MUX/DMUX module 202 (see FIG. 2, 3a). It is noted, however, that, whereas the optical filter configurations 301, 303 require the use of multi-fiber ribbon cables having at least twelve (12) fibers (e.g., fiber #1 through fiber #12; see FIGS. 3b, 3c), the optical configurations 1201, 1203 require the use of multi-fiber ribbon cables having at least forty-four (44) fibers (e.g., fiber #1 through fiber #44; see FIGS. 12a, 12b). Further, whereas the optical filter configurations 301, 303 can support up to at least four (4) WDM wavelength channels between optical nodes 1-11 on the optical ring network 100, the optical configurations 1201, 1203 can support a single channel between such optical nodes.

With regard to the optical configuration 1201 (see FIG. 12*a*), fiber #1 (in) can be used in conjunction with fiber #1 (out) to implement a connection through at least the circuit switch 348 (see FIG. 3*a*) for an OSC channel. Further, fiber #2 (in) can be used in conjunction with fiber #2 (out) to implement a point-to-point connection through at least the circuit switch 348 (see FIG. 3*a*). Single and multi-hop connection paths can also be implemented using the optical configuration 1201 (see FIG. 12*a*) for optical signal transmission in the "West In"/"East Out" direction, as follows:

(1) fiber #3 (in) can be used in conjunction with fiber #4 (out) to implement a one (1) hop connection through at least the circuit switch 348 (see FIG. 3*a*);

(2) fiber #5 (in) can be used in conjunction with fiber #7 (out) to implement a two (2) hop connection through at least the circuit switch 348 (see FIG. 3*a*);

(3) fiber #8 (in) can be used in conjunction with fiber #11 (out) to implement a two (3) hop connection through at least the circuit switch 348 (see FIG. 3*a*);

(4) fiber #12 (in) can be used in conjunction with fiber #16 (out) to implement a two (4) hop connection through at least the circuit switch 348 (see FIG. 3*a*); and (5) fiber #17 (in) can be used in conjunction with fiber #22 (out) to implement a two (5) hop connection through at least the circuit switch 348 (see FIG. 3*a*).

With regard to the optical configuration 1203 (see FIG. 12*b*), fiber #23 (in) can be used in conjunction with fiber #23 (out) to implement a connection through at least the circuit switch 348 (see FIG. 3*a*) for an OSC channel. Further, fiber #24 (in) can be used in conjunction with fiber #24 (out) to implement a point-to-point connection through at least the circuit switch 348 (see FIG. 3*a*). Single and multi-hop connections can also be implemented using the optical configuration 1203 (see FIG. 12*b*) for optical signal transmission in the "East In"/"West Out" direction, as follows:

(1) fiber #25 (in) can be used in conjunction with fiber #26 (out) to implement a one (1) hop connection through at least the circuit switch 348 (see FIG. 3*a*);

(2) fiber #27 (in) can be used in conjunction with fiber #29 (out) to implement a two (2) hop connection through at least the circuit switch 348 (see FIG. 3*a*);

(3) fiber #30 (in) can be used in conjunction with fiber #33 (out) to implement a two (3) hop connection through at least the circuit switch 348 (see FIG. 3*a*);

(4) fiber #34 (in) can be used in conjunction with fiber #38 (out) to implement a two (4) hop connection through at least the circuit switch 348 (see FIG. 3*a*); and (5) fiber #39 (in) can be used in conjunction with fiber #44 (out) to implement a two (5) hop connection through at least the circuit switch 348 (see FIG. 3*a*).

It was further described above that the links interconnecting optical nodes 1-11 on the optical ring network 100 (see FIG. 1) can be implemented using a single optical fiber pair configuration, or multi-fiber pair configurations including, e.g., one or more multi-fiber ribbon cables. Such links interconnecting optical nodes 1-11 on the optical ring network 100 can also be implemented using multi-core optical fiber.

Figure 13B:
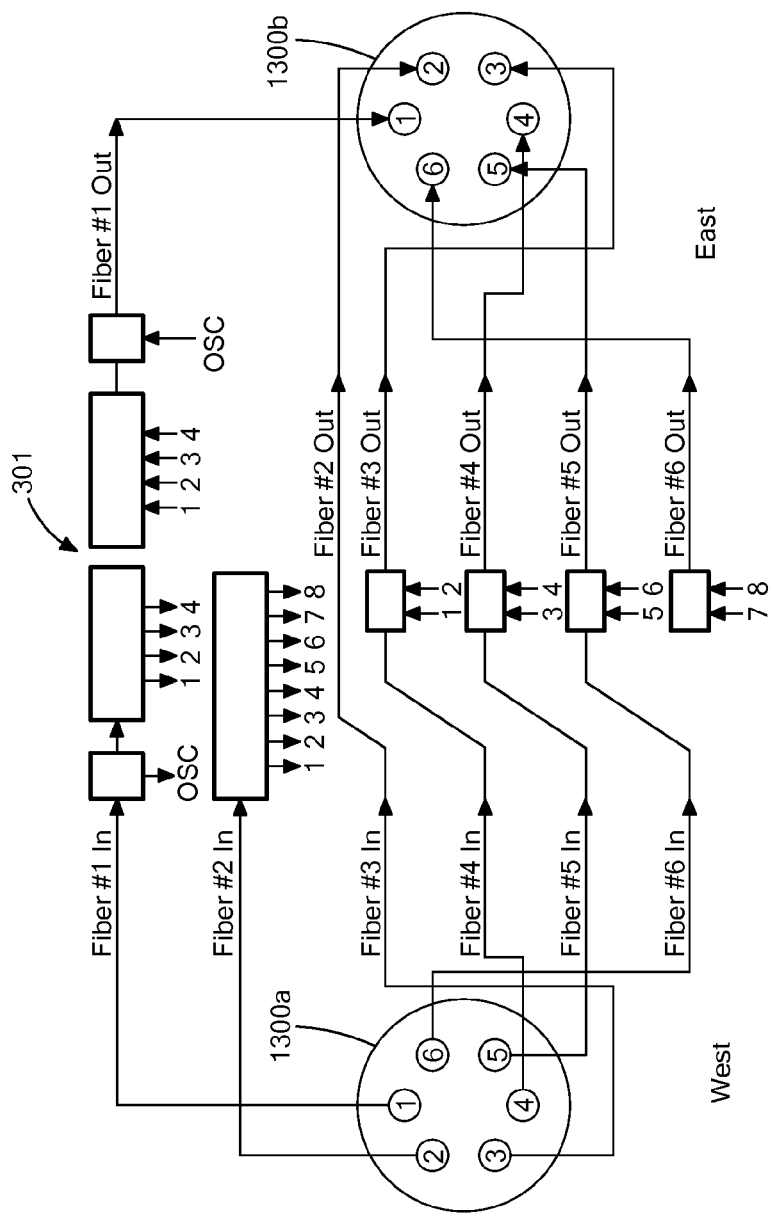
Figure 13A:
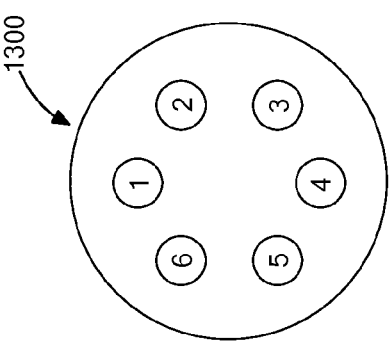
FIG. 13a is a diagram of an exemplary multi-core optical fiber that may be employed in conjunction with the optical MUX/DMUX module of FIGS. 3b-3c.

FIG. 13*a* depicts an exemplary multi-core optical fiber 1300 that may be employed in conjunction with the optical MUX/DMUX module 202 (see FIGS. 2, 3*a*). As shown in FIG. 13*a*, the multi-core optical fiber 1300 includes a plurality of cores 1 through 6, in which each core 1-6 is operative to carry an independent optical signal. FIG. 13*b* depicts how such multi-core optical fiber may be employed in conjunction with the optical filter configuration 301 (see FIGS. 3*a*, 3*b*) included in the optical MUX/DMUX module 202. With regard to the optical filter configuration 301, a multi-core optical fiber 1300*a* can be provided that has a plurality of cores 1-6, which can correspond to fibers #1-#6, respectively, in the "West In" direction along the optical ring network 100 (see FIG. 1). With further regard to the optical filter configuration 301, a multi-core optical fiber 1300*b* can be provided that has a plurality of cores 1-6, which can correspond to fibers #1-#6, respectively, in the "East Out" direction along the optical ring network 100 (see FIG. 1). It is noted that, with regard to the optical filter configuration 303 (see FIGS. 3*a*, 3*c*), multi-core optical fibers can be provided with pluralities of cores corresponding to the respective fibers #7-#12 in the "East In" direction along the optical ring network 100 (see FIG. 1), and the respective fibers #7-#12 out the "West Out" direction along the optical ring network 100 (see FIG. 1).

Figure 14A:
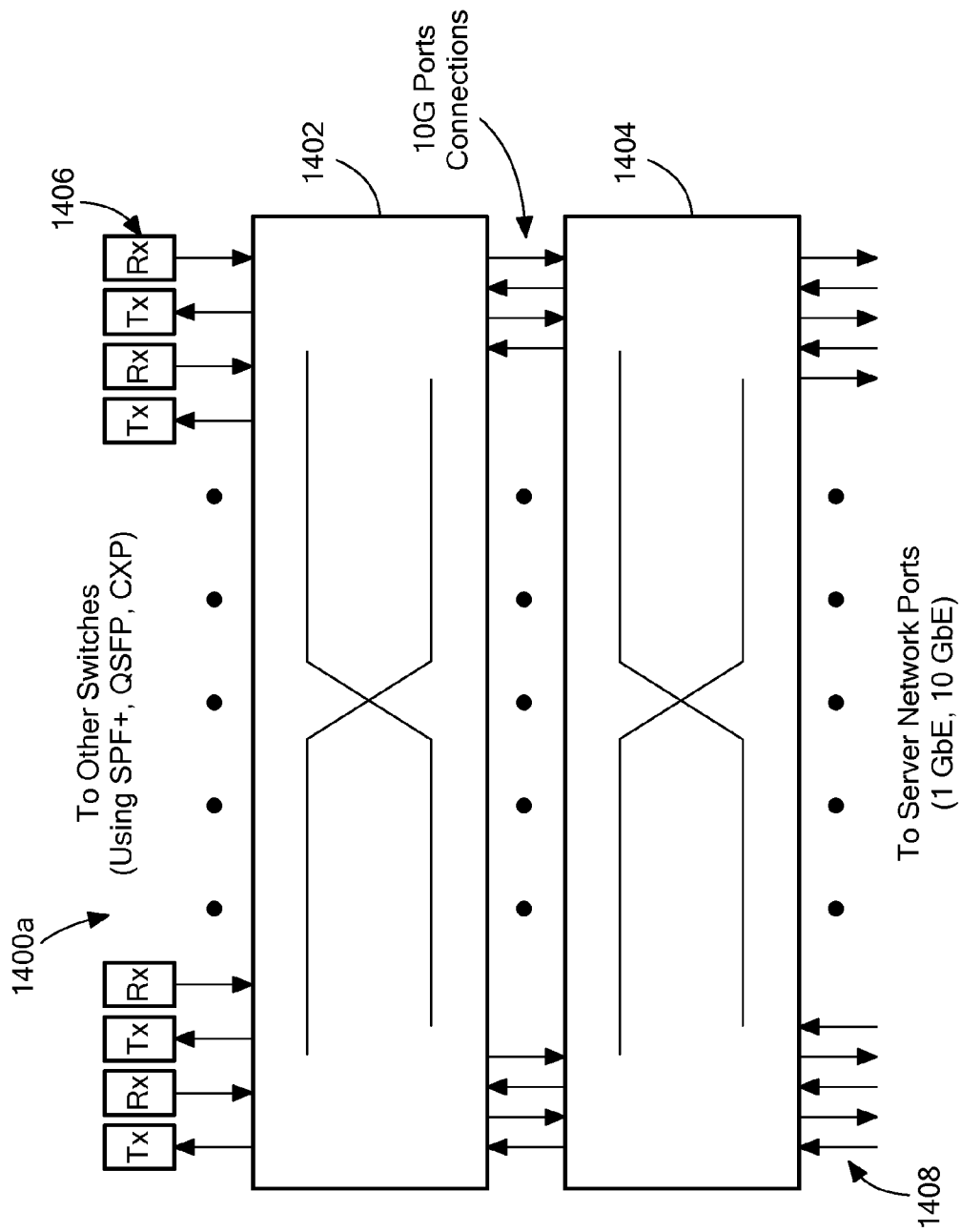

It was also described above with reference to the switch module 209 (see FIGS. 2, 3*a*) that the circuit switch 348 and the packet switch 346 can be implemented as separate switches. Such switches can also be implemented as a combined ("hybrid") switch 1400*a*, as depicted in FIG. 14*a*. For example, the hybrid switch 1400*a* can be implemented as a single integrated circuit (IC), using a field programmable gate array (FPGA), or any other suitable IC implementation technology. As shown in FIG. 14*a*, the hybrid switch 1400*a* includes a circuit switch 1402 and a packet switch 1404. The circuit switch 1402 can be connected to respective optical connection paths within the optical MUX/DMUX module 202 via a plurality of input/output transceivers 1406. Further, the packet switch 1404 can be connected to one or more servers via a plurality of downlink/downlink port connections 1408. Moreover, the circuit switch 1402 can be connected to the packet switch 1404 by a plurality of port connections, such as 10 Gb/s port connections, within the hybrid switch 1400, or a custom ASIC incorporating the circuit and packet switch functions.

Figure 14B:
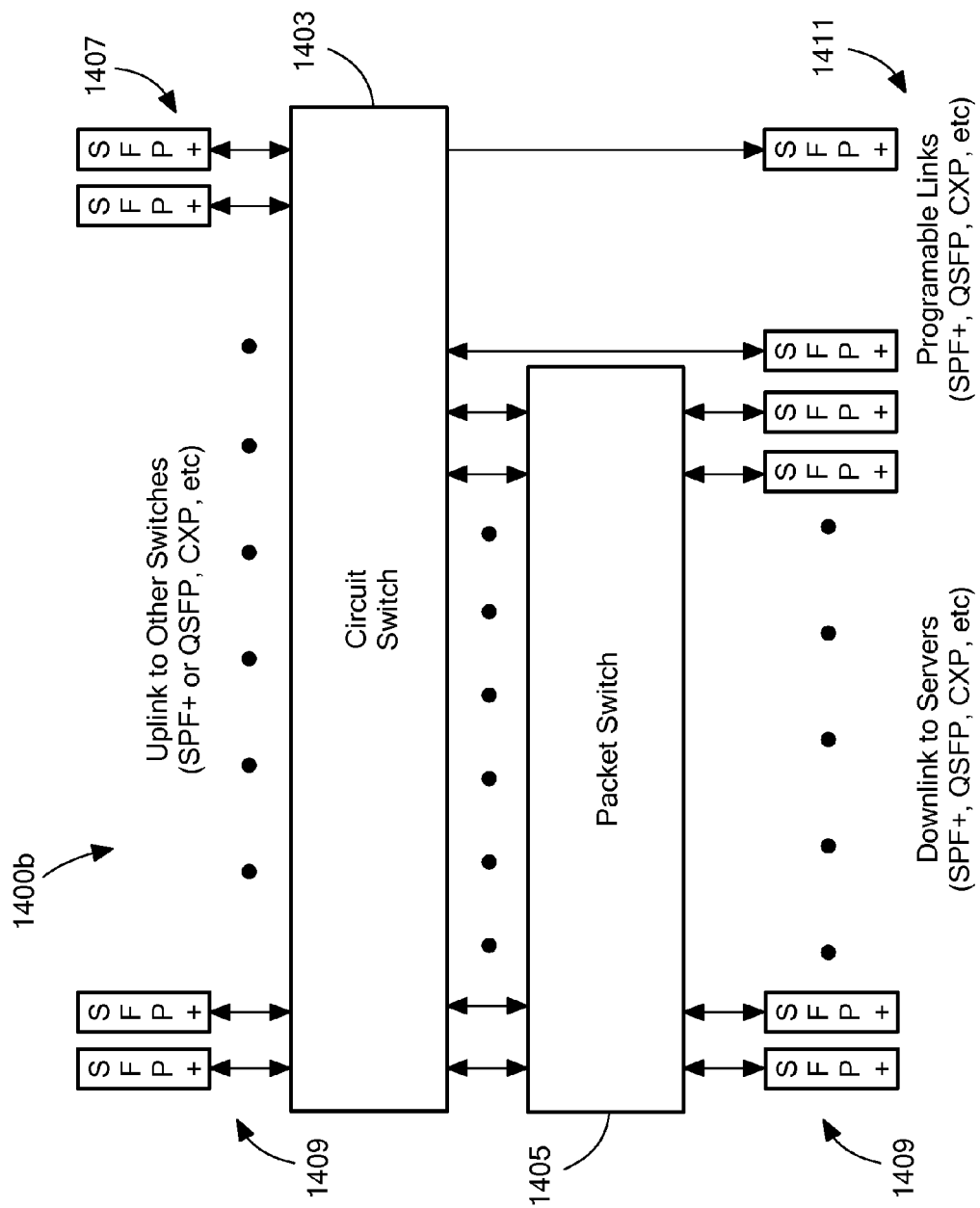

FIG. 14*b* depicts an exemplary alternative embodiment 1400*b* of the hybrid switch 1400*a* of FIG. 14*a*. As shown in FIG. 14*b*, the alternative embodiment 1400*b* includes a circuit switch 1403 and a packet switch 1405. The circuit switch 1403 can be connected to respective optical connection paths within the optical MUX/DMUX module 202 via a plurality of input/output transceivers 1407. Further, the packet switch 1405 can be connected to one or more servers via a plurality of downlink/downlink port connections 1409. Moreover, the circuit switch 1403 can be connected to the packet switch 1405 by a plurality of port connections, such as 10 Gb/s port connections. In addition, the circuit switch 1403 can be connected to one or more servers via a plurality of programmable links 1411, thereby bypassing the packet switch 1405 and providing a direct attach.

Figure 14C:
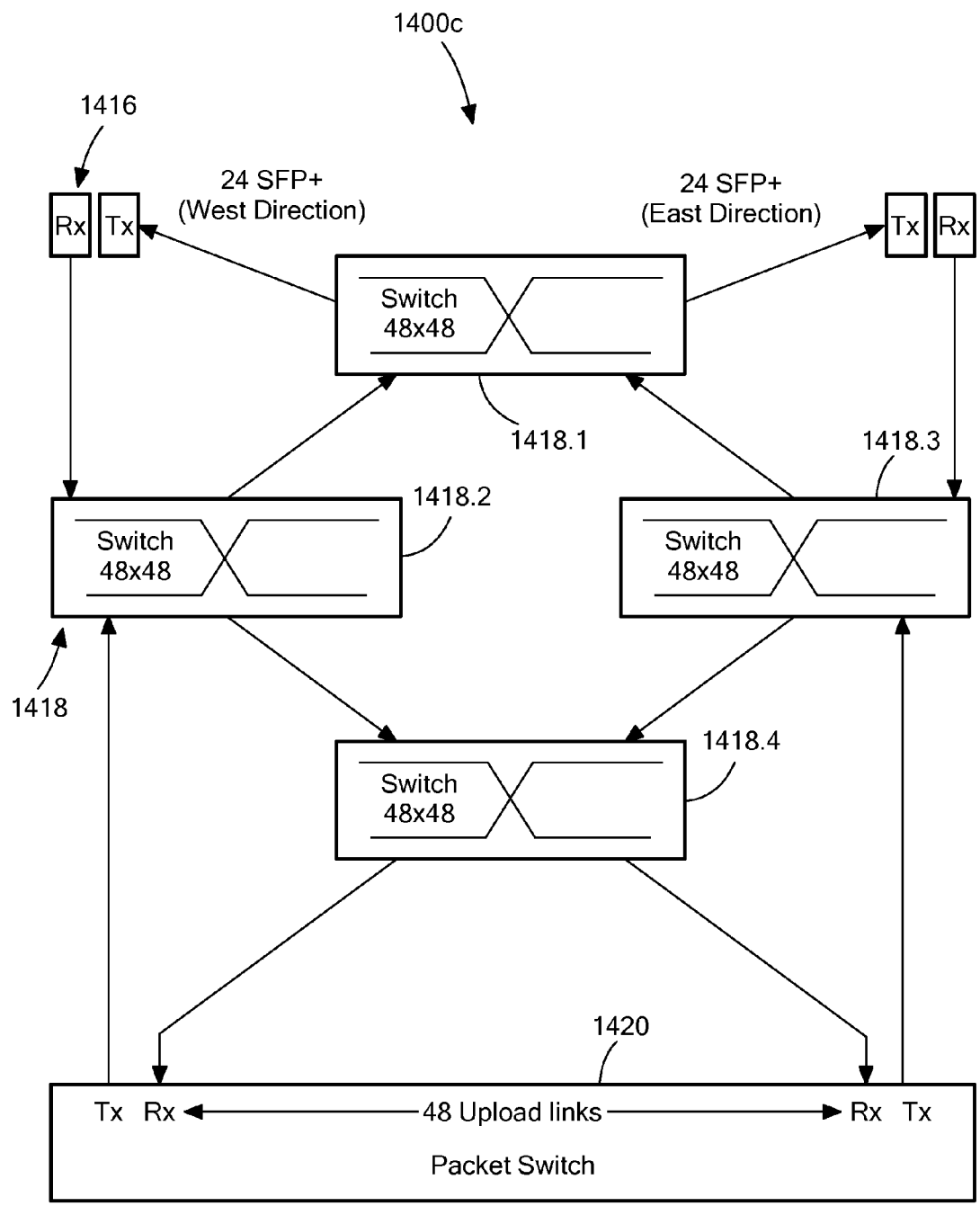

It is noted that the circuit switch 348 (see FIG. 3*a*) can be implemented using multiple circuit switches. FIG. 14*c* depicts a hybrid switch 1400*c* that includes a circuit switch 1418 and a packet switch 1420. Like the hybrid switch 1400*a* (see FIG. 14*a*), the hybrid switch 1400*c* can be implemented as a single integrated circuit (IC), using a field programmable gate array (FPGA), or any other suitable IC implementation technology. The circuit switch 1400*c* includes a plurality of circuit switches 1418.1, 1418.2, 1418.3, 1418.4 operatively connected between a plurality of input/output transceivers 1416 and the packet switch 1420. For example, if the packet switch 1420 is configured to provide up to forty-eight (48) uplink ports, then each of the plurality of circuit switches 1418.1, 1418.2, 1418.3, 1418.4 can be implemented as a 48×48 circuit switch. It is noted that, if a single circuit switch were employed in the hybrid switch 1400c in place of the plurality of circuit switches 1418.1-1418.4, then the single circuit switch may be implemented as a single 96×96 circuit switch.

Figure 15:
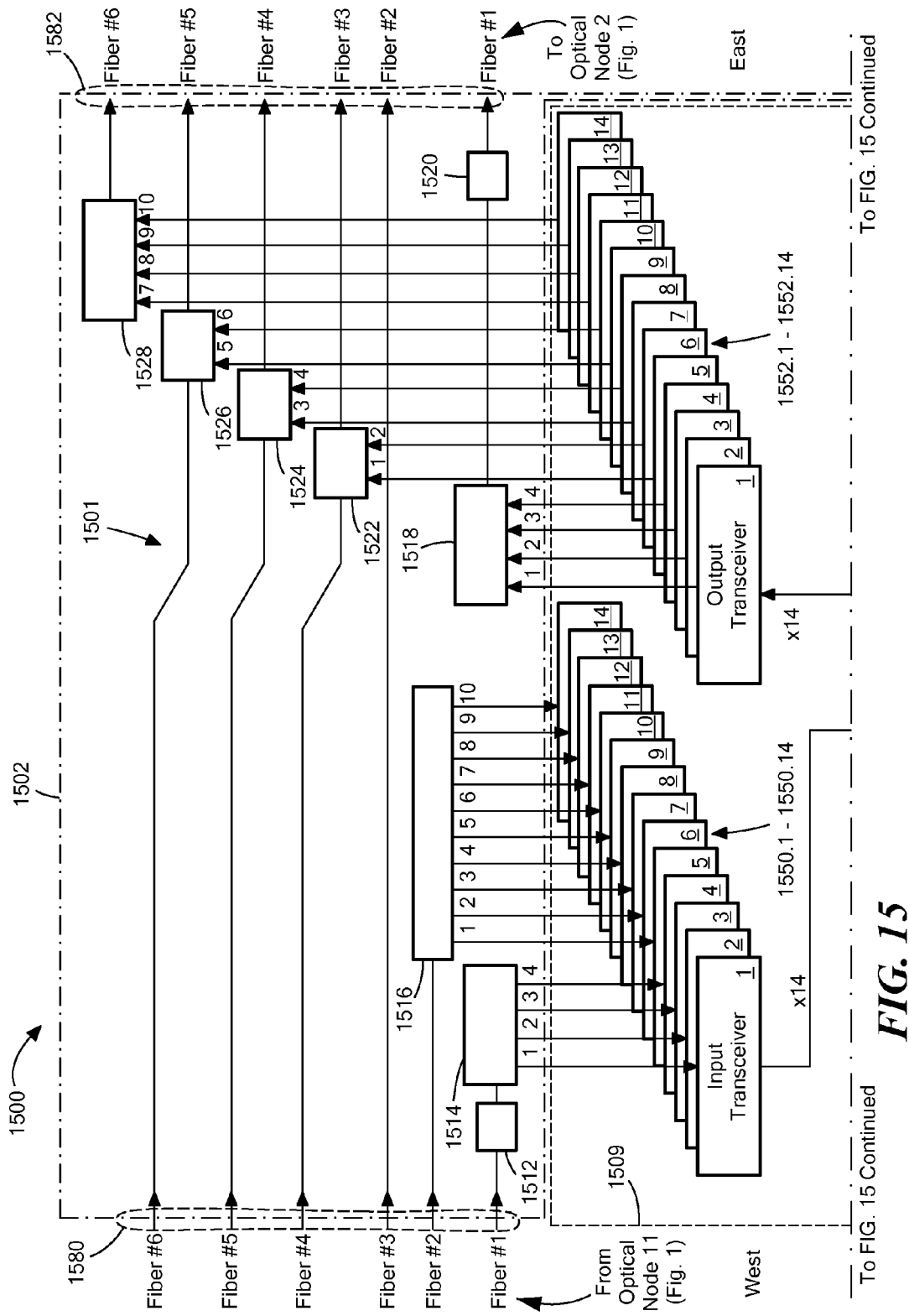
Figure 15:
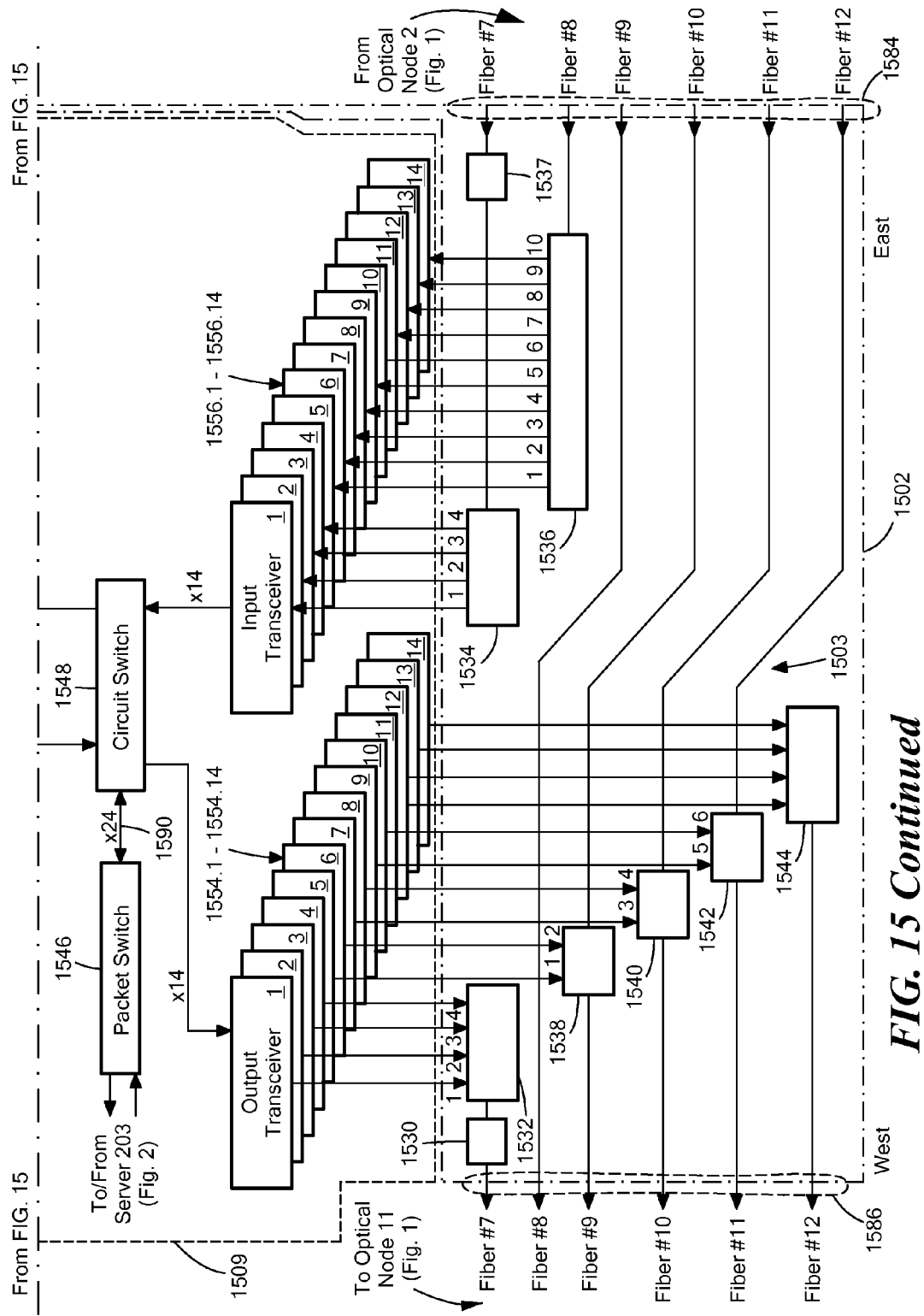

In addition, it was described above that a selected pair of optical nodes on an optical ring network can be configured to support a flyway channel. FIG. 15 depicts an alternative embodiment 1500 of optical node 1 of FIG. 3a, in which optical node 1 is configured to support one or more flyway channels on an optical ring network. Dedicated flyways exist when the number of ports connected to the optical input/output transceivers, such as the input transceivers 1550.1-1550.14, 1556.1-1556.14 and the output transceivers 1552.1-1552.14, 1554.1-1554.14, exceed the number or ports connected to the packet switch, such as the packet switch 1546, excluding any WDM/SDM channels that have been dedicated as control channels, as shown in FIG. 15. It is noted that one or more of optical nodes 2-11 can be similarly configured to support flyway channels, in accordance with the alternative embodiment 1500 of FIG. 15. As shown in FIG. 15, the alternative embodiment 1500 includes an optical MUX/DMUX module 1502 and a switch module 1509. The optical MUX/DMUX module 1502 includes a pair of optical filter configurations 1501, 1503 that can be used to implement a hybrid SDM/WDM shifting channel plan. The optical filter configuration 1501 includes a plurality of inputs (generally indicated by reference numeral 1580) operatively connected to optical fibers #1 through #6 in the West (counter clockwise) direction along an optical ring network, such as the optical ring network 100 (see FIG. 1), and a plurality of outputs (generally indicated by reference numeral 1582) operatively connected to optical fibers #1 through #6 in the East (clockwise) direction along the optical ring network 100. Likewise, the optical filter configuration 1503 includes a plurality of inputs (generally indicated by reference numeral 1584) operatively connected to optical fibers #7 through #12 in the East (clockwise) direction along the optical ring network 100, and a plurality of outputs (generally indicated by reference numeral 1586) operatively connected to optical fibers #7 through #12 in the West (counter clockwise) direction along the optical ring network 100. For example, optical fibers #1 through #12 can be implemented using one or more multi-fiber ribbon cables. It is noted that such multi-fiber ribbon cables are described herein as including twelve (12) optical fibers for purposes of illustration, and that any other suitable number of optical fibers within such multi-fiber ribbon cables may be employed.

With reference to the alternative embodiment 1500 of FIG. 15, the plurality of inputs 1580 of the optical filter configuration 1501 are operative to receive optical signals carried by the respective optical fibers #1-#6 from, e.g., optical node 11 (see FIG. 1), and the plurality of outputs 1582 of the optical filter configuration 1501 are operative to send optical signals on the respective optical fibers #1-#6 to, e.g., optical node 2 (see FIG. 1). In the East (clockwise) direction along the optical ring network 100 (see FIG. 1), the alternative embodiment 1500 of optical node 1 is therefore communicably coupled to optical node 11 by the plurality of inputs 1580, which are in a predetermined sequence corresponding to the fibers #1 through #6. Further, the alternative embodiment 1500 of optical node 1 is communicably coupled, in the East (clockwise) direction along the optical ring network 100, to optical node 2 by the plurality of outputs 1582, which are also in the predetermined sequence corresponding to the fibers #1 through #6.

The plurality of inputs 1584 of the optical filter configuration 1503 (see FIG. 15) are operative to receive optical signals carried by the respective optical fibers #7 through #12 from, e.g., optical node 2 (see FIG. 1), and the plurality of outputs 1586 of the optical filter configuration 1503 (see FIG. 15) are operative to send optical signals on the respective optical fibers #7 through #12 to, e.g., optical node 11 (see FIG. 1). In the West (counter clockwise) direction along the optical ring network 100, the alternative embodiment 1500 of optical node 1 is therefore communicably coupled to, e.g., optical node 2 (see FIG. 1), by the plurality of inputs 1584, which are in a predetermined sequence corresponding to the fibers #7 through #12. Further, the alternative embodiment 1500 of optical node 1 is coupled, in the West (counter clockwise) direction along the optical ring network 100, to, e.g., optical node 11 (see FIG. 1), by the plurality of outputs 1586, which are also in the predetermined sequence corresponding to the fibers #7 through #12.

As shown in FIG. 15, the switch module 1509 includes a packet switch 1546, and a circuit switch 1548 disposed between the packet switch 1546 and the respective optical filter configurations 1501, 1503. The circuit switch 1548 can receive, in electrical form, one or more signals sourced from one or more of the inputs 1580, 1584, and can provide one or more of the signals for subsequent forwarding as optical signals to one or more of the outputs 1582, 1586. It is noted that the switch module 1509 can further include a processor for local control and/or configuration of the packet switch 1546 and/or the circuit switch 1548. Such a processor can receive instructions for such control and/or configuration of the packet switch 1546 and/or the circuit switch 1548 from an external central processor over an optical supervisory control (OSC) channel corresponding to a drop module 1512 and an add module 1520 within the optical filter configuration 1501, and/or an OSC channel corresponding to a drop module 1537 and an add module 1530 within the optical filter configuration 1503. Such a processor can also be configured to receive instructions via a network management port. The processor for local control and/or configuration of the packet switch 1546 and/or the circuit switch 1548 has been omitted from FIG. 15 for clarity of illustration. The switch module 1509 also includes a plurality of input transceivers 1550.1-1550.14 and a plurality of output transceivers 1552.1-1552.14 disposed between the circuit switch 1548 and the optical filter configuration 1501, as well as a plurality of input transceivers 1556.1-1556.14 and a plurality of output transceivers 1554.1-1554.14 disposed between the circuit switch 1548 and the optical filter configuration 1503. It is further noted that clock and data recovery (CDR) may be implemented, as required and/or as desired, either as an integrated part of the circuit switch 1548, or externally. CDR circuits have been omitted from FIG. 15 for clarity of illustration.

As further shown in FIG. 15, the optical filter configuration 1501 includes a plurality of drop modules 1514, 1516, and a plurality of add modules 1518, 1522, 1524, 1526, 1528. Each of the drop modules 1514, 1516 is operative to separate one or more optical signals, such as WDM wavelength channel signals allocated to one or more predetermined WDM wavelength channels, from one or more optical signals received over fiber #1 (in) and/or fiber #2 (in). In addition, each of the add modules 1518, 1522, 1524, 1526, 1528 is operative to add one or more optical signals, such as WDM wavelength channel signals allocated to one or more predetermined WDM wavelength channels, to one or more optical signals for transmission over fiber #1 (out), fiber #3 (out), fiber #4 (out), fiber #5 (out), and/or fiber #6 (out). Like the optical filter configuration 1501, the optical filter configuration 1503 includes a plurality of drop modules 1534, 1536, and a plurality of add modules 1532, 1538, 1540, 1542, 1544. Each of the drop modules 1534, 1536 is operative to separate one or more optical signals, such as WDM wavelength channel signals allocated to one or more predetermined WDM wavelength channels, from one or more optical signals received over fiber #7 (in) and/or fiber #8 (in). In addition, each of the add modules 1532, 1538, 1540, 1542, 1544 is operative to add one or more optical signals, such as WDM wavelength channel signals allocated to one or more predetermined WDM wavelength channels, to one or more optical signals for transmission over fiber #7 (out), fiber #9 (out), fiber #10 (out), fiber #11 (out), and/or fiber #12 (out).

The plurality of input transceivers 1550.1-1550.14 are operative to perform optical-to-electrical (O-E) conversion of wavelength channel signals separated from the optical signals received over fiber #1 (in) and/or fiber #2 (in), and the plurality of output transceivers 1552.1-1552.14 are operative to perform electrical-to-optical (E-O) conversion of the wavelength channel signals to be added to the optical signals for transmission over fiber #1 (out), fiber #3 (out), fiber #4 (out), fiber #5 (out), and/or fiber #6 (out). Likewise, the plurality of input transceivers 1556.1-1556.14 are operative to perform optical-to-electrical (O-E) conversion of the wavelength channel signals separated from the optical signals received over fiber #7 (in) and/or fiber #8 (in), and the plurality of output transceivers 1554.1-1554.14 are operative to perform electrical-to-optical (E-O) conversion of the wavelength channel signals to be added to the optical signals for transmission over fiber #7 (out), fiber #9 (out), fiber #10 (out), fiber #11 (out), and/or fiber #12 (out).

The circuit switch 1548 is operative to receive, in electrical form from one or more of the input transceivers 1550.1-1550.14, 1556.1-1556.14, one or more wavelength channel signals via the optical filter configuration 1501 and/or the optical filter configuration 1503. The circuit switch 1548 is further operative to selectively provide one or more of the wavelength channel signals to the packet switch 1546, and/or to selectively provide one or more of the wavelength channel signals to one or more of the output transceivers 1552.1-1552.14, 1554.1-1554.14. Such wavelength channel signals can, in turn, be provided by the output transceivers 1552.1-1552.14, 1554.1-1554.14, in optical form, to one or more of the add modules 1518, 1522, 1524, 1526, 1528, 1532, 1538, 1540, 1542, 1544, for subsequent addition to one or more optical signals for transmission over fiber #1(out), one or more of fibers #3-6 (out), fiber #7 (out), and/or one or more of fibers #9-12 (out).

As described above, the alternative embodiment 1500 (see FIG. 15) of optical node 1 (see also FIG. 3a) is configured to support one or more flyway channels on an optical ring network. To that end, a predetermined number of input/output transceivers, such as the twenty-eight (e.g., p=28) input transceivers 1550.1-1550.14 and output transceivers 1552.1-1552.14, are communicably coupled between the optical filter configuration 1501 and the circuit switch 1548. Likewise, a predetermined number of input/output transceivers, such as the twenty-eight (p=28) input transceivers 1556.1-1556.14 and output transceivers 1554.1-1554.14, are communicably coupled between the optical filter configuration 1503 and the circuit switch 1548. It is noted that any other suitable number of input/output transceivers may be similarly coupled between the respective optical filter configurations 1501, 1503 and the circuit switch 1548. Further, the circuit switch 1548 can be configured to communicably couple, over a connection 1590, a predetermined number, such as twenty-four (e.g., q=24) or any other suitable number, of the twenty-eight (p=28) input/output transceivers 1550.1-1550.14, 1552.1-1552.14 or 1556.1-1556.14, 1554.1-1554.14 to the packet switch 1546. The remaining four (i.e., (p−q)=(28−24)=4) input/output transceivers among the input/output transceivers 1550.1-1550.14, 1554.1-1554.14, as well as the remaining four (i.e., (p−q)=(28−24)=4) input/output transceivers among the input/output transceivers 1556.1-1556.14, 1552.1-1552.14, may be employed to implement the flyway channels on the optical ring network.

For example, the circuit switch 1548 may be configured to communicably couple the twelve (12) input transceivers 1550.1-1550.12 and the twelve (12) output transceivers 1554.1-1554.12 to the packet switch 1546, thereby providing wavelength channel signals allocated to wavelength channels 1, 2, 3, 4, from the drop module 1514, as well as wavelength channel signals allocated to wavelength channels 1, 2, 3, 4, 5, 6, 7, 8 from the drop module 1516, to the packet switch 1546 over the connection 1590. The remaining four (4) input/output transceivers, namely, the input transceivers 1550.13, 1550.14 and the output transceivers 1552.13, 1552.14, may be employed to implement two (2) flyway channels. One such flyway channel can carry a wavelength channel signal allocated to wavelength channel 9 from fiber #2 (in), through the drop module 1516, the input transceiver 1550.13, the circuit switch 1548, the output transceiver 1552.13, and the add module 1528, to fiber #6 (out). Another such flyway channel can carry a wavelength channel signal allocated to wavelength channel 10 from fiber #2 (in), through the drop module 1516, the input transceiver 1550.14, the circuit switch 1548, the output transceiver 1552.14, and the add module 1528, to fiber #6 (out). Dedicated flyway wavelengths can be added to any other input/output pairs, provided the flyway wavelength added is dropped in a manner consistent with the WDM/SDM channel plan. In fact, any unused lightpaths between optical nodes can be used to form dedicated flyway wavelengths.

Similarly, the circuit switch 1548 may be configured to communicably couple the twelve (12) input transceivers 1556.1-1556.12 and the twelve (12) output transceivers 1552.1-1552.12 to the packet switch 1546, thereby providing wavelength channel signals allocated to wavelength channels 1, 2, 3, 4 from the drop module 1534, as well as wavelength channel signals allocated to wavelength channels 1, 2, 3, 4, 5, 6, 7, 8 from the drop module 1536, to the packet switch 1546 over the connection 1590. The remaining four (4) input/output transceivers, namely, the input transceivers 1556.13, 1556.14 and the output transceivers 1554.13, 1554.14, may be employed to implement two (2) additional dedicated flyway channels. One such dedicated flyway channel can carry a wavelength channel signal allocated to wavelength channel 9 from fiber #8 (in), through the drop module 1536, the input transceiver 1556.13, the circuit switch 1548, the output transceiver 1554.13, and the add module 1544, to fiber #12 (out). Another such dedicated flyway channel can carry a wavelength channel signal allocated to wavelength channel 10 from fiber #8 (in), through the drop module 1536, the input transceiver 1556.14, the circuit switch 1548, the output transceiver 1554.14, and the add module 1544, to fiber #12 (out). It is noted that any other input/output transceivers may be selected from among the input/output transceivers 1550.1-1550.14, 1552.1-1552.14, and from among the input/output transceivers 1556.1-1556.14, 1554.1-1554.14, to implement any other suitable number of dedicated flyway channels on an optical ring network.

It is noted that the operations depicted and/or described herein are purely exemplary. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer to perform the function of a particular machine. In particular, various general-purpose machines employing one or more processors coupled to one or more computer readable media can be used with computer programs written in accordance with the teachings disclosed herein, or it may be more convenient to construct a more specialized apparatus to perform the required operations.

Instructions for implementing the systems and methods disclosed herein can also be embodied as computer readable code on a computer readable medium. The computer readable medium is any data storage device that can store data, which can thereafter be read by a computer system. Examples of such computer readable media include magnetic and solid state hard drives, read-only memory (ROM), random-access memory (RAM), Blu-Ray™ disks, DVDs, CD-ROMs, CD-Rs, CD-RWs, magnetic tapes, and/or any other suitable optical or non-optical data storage device. The computer readable code can be stored in a single location, or stored in a distributed manner in a networked environment.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of routing a multicast frame in an optical network having a plurality of communicably interconnected optical nodes including a multicast master node and a plurality of slave nodes, the method comprising the steps of:
receiving, at a first slave node which is one of the plurality of slave nodes in the optical network, a multicast frame transmitted as a first optical signal over the optical network from the multicast master node;
converting, at an optical to electrical converter associated with the first slave node, the received first optical signal to an electrical signal corresponding to the received multicast frame;
receiving, at a first circuit switch input of a circuit switch associated with the first slave node, the electrical signal from the optical to electrical converter in unmodified form, the circuit switch further having a second circuit switch input and first and second circuit switch outputs, the circuit switch being connected to a packet switch associated with the first slave node, the packet switch having a packet switch input and a packet switch output, the second circuit switch input being coupled to the packet switch output and the second circuit switch output being coupled to the packet switch input;
forwarding the electrical signal, with low latency, directly through the circuit switch to the first circuit switch output so as to bypass the packet switch;
receiving, at an input of an electrical to optical converter associated with the first slave node, the electrical signal from the first circuit switch output;
converting, at the electrical to optical converter, the electrical signal to a second optical signal corresponding to the received multicast frame;
transmitting the received multicast frame from a first optical output of the first slave node as the second optical signal downstream on the optical network for receipt by another optical node in the optical network; and
forwarding the received multicast frame to an external computerized device coupled to the first slave node in the event that the external computerized device is a multicast subscriber, wherein the received multicast frame is forwarded to the external computerized device using one of: a path from the circuit switch through the packet switch to the external computerized device, and a path directly from the circuit switch to the external computerized device so as to bypass the packet switch.

2. The method of claim 1 wherein the first and second circuit switch outputs are the same circuit switch output.

3. The method of claim 1 further including preventing the received multicast frame from being forwarded from the first slave node to the external computerized device coupled to the first slave node in the event the external computerized device coupled to the first slave node is not a multicast subscriber.

4. The method of claim 1 wherein the multicast frame is an Ethernet frame.

5. The method of claim 1 wherein the multicast frame is a broadcast frame.

6. The method of claim 1 further including determining whether the external computerized device coupled to the first slave node is a multicast subscriber.

7. The method of claim 6 wherein the step of determining whether the external computerized device coupled to the first slave node is a multicast subscriber comprises the step of determining, in the packet switch, whether the external computerized device coupled to the first slave node is a multicast subscriber.

8. The method of claim 1 wherein the step of transmitting the second optical signal downstream on the optical network for receipt by another optical node in the optical network comprises the step of transmitting the second optical signal downstream to an adjacent slave node in the optical network.

9. The method of claim 1 wherein the step of transmitting the second optical signal downstream on the optical network for receipt by another optical node in the optical network comprises the step of transmitting the second optical signal downstream to a non-adjacent slave node in the optical network over a flyway.

10. The method of claim 1 wherein the multicast master node includes an Ethernet packet switch, the multicast frame is an Ethernet frame and the method further comprises the step of establishing link from an output port of the Ethernet packet switch of the multicast master node to an input port of the Ethernet packet switch of the multicast master.

11. The method of claim 1 wherein the step of receiving, at the first slave node which is one of the plurality of slave nodes in the optical network, the multicast frame transmitted as the first optical signal over the optical network from the multicast master node comprises the step of receiving at the first slave node the multicast frame transmitted from the multicast master node over a multicast data channel.

12. The method of claim 1 wherein the multicast master node includes a multicast master node circuit switch, a multicast master node packet switch, and a forwarding table associated with the multicast master node packet switch and the method further comprises:
 populating a header of the multicast frame with at least one of destination MAC addresses, source MAC addresses, incoming port information, VLAN information and multicast addresses;
 forwarding the multicast frame from a multicast port of the multicast master node packet switch to the multicast master node circuit switch; and
 transmitting the multicast frame onto the optical network as the first optical signal for receipt by a downstream node in the optical network.

13. The method of claim 1 wherein the optical network is an optical ring network.

14. The method of claim 1 wherein the circuit switch is a cross-point switch or a cross-bar switch.

15. A system for routing a multicast frame in an optical network comprising:
 a plurality of optical nodes including:
 a plurality of slave nodes wherein a first slave node is one of the plurality of slave nodes; and
 a multicast master node communicably coupled to the plurality of slave nodes via the optical network; and
 an external computerized device communicably coupled to the first slave node;
 the multicast master node being configured and operative to transmit the multicast frame as a first optical signal over the optical network from the multicast master node;
 the first slave node being operative to:
 receive the multicast frame as the first optical signal;
 convert, at an optical to electrical converter within the first slave node, the received first optical signal to an electrical signal corresponding to the received multicast frame;
 forward the multicast frame as the electrical signal to a circuit switch within the first slave node;
 receive, at a first circuit switch input of the circuit switch, the electrical signal from the optical to electrical converter in unmodified form, the circuit switch further having a second circuit switch input and first and second circuit switch outputs, the circuit switch being connected to a packet switch within the first slave node, the packet switch having a packet switch input and a packet switch output, the second circuit switch input being coupled to the packet switch output and the second circuit switch output being coupled to the packet switch input;
 forward the electrical signal, with low latency, directly through the circuit switch within the first slave node to the first circuit switch output so as to bypass the packet switch;
 receive, at an input of an electrical to optical converter within the first slave node, the electrical signal from the first circuit switch output;
 convert, at the electrical to optical converter, the electrical signal to a second optical signal corresponding to the received multicast frame;
 transmit the multicast frame from a first optical output of the first slave node as the second optical signal downstream on the optical network; and
 forward the received multicast frame to the external computerized device communicably coupled to the first slave node in the event the external computerized device is a multicast subscriber, wherein the received multicast frame is forwarded to the external computerized device using one of: a path from the circuit switch through the packet switch to the external computerized device, and a path directly from the circuit switch to the external computerized device so as to bypass the packet switch.

16. The system of claim 15 wherein the first and second circuit switch outputs are distinct circuit switch outputs.

17. The system of claim 15 wherein the first and second circuit switch outputs are the same circuit switch output.

18. The system of claim 15 wherein the circuit switch and the packet switch are implemented as a single integrated circuit.

19. The system of claim 15 wherein the circuit switch is implemented using multiple circuit switches.

* * * * *